US009104184B2

(12) United States Patent
Divan et al.

(10) Patent No.: US 9,104,184 B2
(45) Date of Patent: Aug. 11, 2015

(54) SYSTEMS AND METHODS FOR SWITCH-CONTROLLED VAR SOURCES COUPLED TO A POWER GRID

(71) Applicant: Varentec, Inc., San Jose, CA (US)

(72) Inventors: Deepakraj M. Divan, San Jose, CA (US); Hao Chen, San Jose, CA (US); Anish Prasai, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 341 days.

(21) Appl. No.: 13/707,560

(22) Filed: Dec. 6, 2012

(65) Prior Publication Data
US 2013/0138260 A1 May 30, 2013

Related U.S. Application Data

(63) Continuation-in-part of application No. 13/488,330, filed on Jun. 4, 2012.

(60) Provisional application No. 61/535,892, filed on Sep. 16, 2011, provisional application No. 61/567,580,
(Continued)

(51) Int. Cl.
| | |
|---|---|
| *G05D 3/12* | (2006.01) |
| *G05B 13/02* | (2006.01) |
| *H02J 3/16* | (2006.01) |
| *H02J 3/18* | (2006.01) |

(52) U.S. Cl.
CPC . *G05B 13/02* (2013.01); *H02J 3/16* (2013.01); *H02J 3/1842* (2013.01); *H02J 3/1871* (2013.01); *Y02E 40/22* (2013.01); *Y02E 40/34* (2013.01)

(58) Field of Classification Search
None
See application file for complete search history.

(56) References Cited

U.S. PATENT DOCUMENTS

| | | | |
|---|---|---|---|
| 4,365,190 A | 12/1982 | Pasternack et al. | |
| 4,916,377 A * | 4/1990 | Terada et al. | 323/210 |

(Continued)

FOREIGN PATENT DOCUMENTS

| | | |
|---|---|---|
| CN | 102082438 A1 | 6/2011 |
| WO | 2005085969 A1 | 9/2005 |

OTHER PUBLICATIONS

State Intellectual Property Office of PRC, Notification of First Office Action for CN Patent Application No. 201280056392.2, Dec. 25, 2014, pp. 1-2.
(Continued)

*Primary Examiner* — Sean Shechtman
(74) *Attorney, Agent, or Firm* — Sheppard Mullin Richter & Hampton LLP

(57) ABSTRACT

Systems and methods for switch-controlled VAR sources coupled to a power grid are described. In some embodiments, a system comprises a distribution power network coupled to a first switch-controlled VAR source. The first switch-controlled VAR source may comprise a processor, a voltage compensation component, and a switch. The first switch-controlled VAR source may be configured to obtain a first delay value, monitor a first proximate voltage, initiate a first delay duration based on the comparison of the first proximate voltage to at least one set point, the first delay duration being based on the first delay value, determine, with the processor, after the first delay duration, whether to connect the voltage compensation component based on the monitored voltage, and control, based on the determination, the switch to connect the voltage compensation component to adjust a network voltage or a network voltage component.

21 Claims, 37 Drawing Sheets

Related U.S. Application Data filed on Dec. 6, 2011, provisional application No. 61/579,610, filed on Dec. 22, 2011, provisional application No. 61/635,799, filed on Apr. 19, 2012, provisional application No. 61/635,797, filed on Apr. 19, 2012.

(56) References Cited

U.S. PATENT DOCUMENTS

| | | |
|---|---|---|
| 5,402,057 A | 3/1995 | D'Aquila et al. |
| 5,563,777 A | 10/1996 | Miki et al. |
| 5,686,766 A | 11/1997 | Tamechika |
| 6,181,113 B1 | 1/2001 | Hu et al. |
| 6,573,691 B2 | 6/2003 | Ma et al. |
| 6,643,112 B1 | 11/2003 | Carton et al. |
| 7,091,703 B2 | 8/2006 | Folts et al. |
| 7,149,605 B2 | 12/2006 | Chassin et al. |
| 2009/0024255 A1 | 1/2009 | Penzenstadler et al. |
| 2010/0198422 A1 | 8/2010 | Feng |
| 2010/0231235 A1 | 9/2010 | Cho |
| 2010/0259100 A1 | 10/2010 | Hamstra et al. |
| 2011/0074215 A1 | 3/2011 | Vartanian et al. |
| 2011/0149618 A1 | 6/2011 | Babcock et al. |
| 2011/0192838 A1 | 8/2011 | Fujita et al. |
| 2011/0205674 A1 | 8/2011 | Divan |

OTHER PUBLICATIONS

Patent Cooperation Treaty International Searching Authority, International Search Report for PCT/US2012/068316, Feb. 7, 2013, pp. 1-2.

Patent Cooperation Treaty International Searching Authority, International Search Report for PCT/US2012/068307, Feb. 14, 2013, pp. 1-2.

Wilson, Tom, "A Comparison of AdaptiVolt(TM) and Line Drop Compensation Conservation Voltage Regulation Implementation Methodologies", PCS UtiliData, Dec. 2010, pp. 1-7, Spokane, WA.

Patent Cooperation Treaty, International Search Report for PCT/US2012/055619, Dec. 3, 2012, pp. 1-2.

State Intellectual Property Office of PRC, Notification of First Office Action for CN Patent Application No. 2012800691846, Feb. 6, 2015, pp. 1-2.

European Patent Office, Extended European Search Report for EP Patent Application No. 12831757.5, Feb. 27, 2015, pp. 1-3.

* cited by examiner

SYSTEMS AND METHODS FOR SWITCH-CONTROLLED VAR SOURCES COUPLED TO A POWER GRID

CROSS-REFERENCE TO RELATED APPLICATIONS

The present application is a continuation-in-part of and claims the benefit of U.S. Nonprovisional patent application Ser. No. 13/488,330, filed Jun. 4, 2012, entitled "Systems and Methods for Edge of Network Voltage Control of a Power Grid," which claims priority to U.S. Provisional Patent Application No. 61/535,892, filed Sep. 16, 2011, entitled "Systems and Methods of a Distributed Dynamic VAR (D-DVAR) Compensator," U.S. Provisional Patent Application No. 61/567,580, filed Dec. 6, 2011, entitled "Systems and Methods for Dynamic VAR Optimization," U.S. Provisional Patent Application No. 61/579,610, filed Dec. 22, 2011, entitled "Systems and Methods for Managing Power," U.S. Provisional Patent Application No. 61/635,799, filed Apr. 19, 2012, entitled "Systems and Methods for Dynamic AC Line Voltage Regulation with Energy Saving Tracking," and U.S. Provisional Patent Application No. 61/635,797, filed Apr. 19, 2012, entitled "Systems and Methods for Fast VAR Source with Anti-Resonance Function," all of which are incorporated by reference herein.

BACKGROUND

1. Field of the Invention(s)

The present invention(s) generally relate to power distribution grid network optimization strategies. More particularly, the invention(s) relate to systems and methods for switch-controlled VAR sources coupled to a power distribution grid.

2. Description of Related Art

The conventional approach to power distribution grid voltage control is based on techniques developed about 70 years ago. In recent years, highly complex and expensive systems have been required to implement improved effective voltage control and conservation voltage reduction (CVR) based demand reduction. Under present requirements, alternating current (AC) line voltage for connected users needs to fall within a narrow band specified by ANSI C84.1 under all conditions of loading and substation voltage. Typically, utilities operate in a narrow band of 116-124 volts, even though level 'A' service allows for a range of 114-126 volts. The difficulty in adhering to a tight regulation band arises from normal fluctuations in incoming line voltage at the substation, as well as load changes along the feeder. These changes cause the line voltage to vary, with utilities required to maintain voltage for consumers within specified bounds.

The prior art volt-ampere reactive regulation devices (VAR devices) for voltage control may be split into several categories including: 1) prior art VAR devices with slow responding capacitors and electro-mechanical switches; ii) prior art VAR devices with medium response capacitors and thyristor switched capacitors; and iii) prior art VAR devices with power converter based VAR control using Static VAR sources or static synchronous condensers (STATCOMs).

It should be noted that capacitors in the prior art VAR devices are mainly used for power factor control when used by customers and for voltage control when used by utilities. For power factor control, the downstream line current must be measured. Capacitors and/or inductors may be switched on or off based on the line current to realize a desired overall power factor (e.g., typically at a value of unity). In the second case of voltage control used by utilities, capacitors are controlled based on: 1) local voltage measurements; 2) other parameters such as temperature; 3) line reactive current; and/or 4) dispatches communicatively received from a control center. The control center may dispatch decisions regarding capacitor control based on information received from multiple points in the network.

Most capacitors of prior art VAR devices are switched using electromechanical switches. The electromechanical switches are limited in switching speed and by life of the switches. Many electromechanical switches are limited to 3-4 switches per day. A response time of approximately fifteen minutes is often required to enable voltage control with prior art VAR devices. During this time, the following steps may be performed: 1) sensing voltages locally; 2) communicating the sensed voltages to a centralized control center; 3) power and/or voltage modeling of the system at the centralized control center; 4) determining to take action based on the model and perceived potential improvements; and 5) dispatching one or more commands from the centralized control center to the prior art VAR device to switch the capacitor. More advanced Volt-VAR Optimization or VVO systems are moving to such centralized implementations so they can try to optimize the profile of voltage along an entire distribution feeder and reduce infighting between prior art VAR devices.

SUMMARY

Systems and methods for an edge of network voltage control of a power grid are described. In some embodiments, a system comprises a distribution power network, a plurality of loads, and a plurality of shunt-connected, switch-controlled VAR sources. The loads may be at or near an edge of the distribution power network. Each of the loads may receive power from the distribution power network. The plurality of shunt-connected, switch-controlled VAR sources may be located at the edge or near the edge of the distribution power network where they may each detect a proximate voltage. Further, each of the VAR sources may comprise a processor and a VAR compensation component. The processor may be configured to enable the VAR source to determine, after a delay, whether to enable the VAR compensation component based on the proximate voltage and to adjust network voltampere reactive by controlling a switch to enable the VAR compensation component.

The delay of each of the plurality of shunt-connected, switch-controlled VAR sources may not be equal. The different delays of different members of the plurality of shunt-connected, switch-controlled VAR sources may prevent infighting between at least two of the different members. In various embodiments, the delay of at least two of the plurality of shunt-connected, switch-controlled VAR sources may be equal but the delay of a third of the plurality of shunt-connected, switch-controlled VAR sources may not be equal to the other two VAR sources.

The switch may comprise a semiconductor switch in series with an NTC or resistor. The semiconductor switch (in series with the NTC or resistor) may be in parallel with a relay. The semiconductor switch may be controlled by a first signal from the processor and the relay may be controlled by a second signal from the processor. The semiconductor switch may control enabling the VAR compensation component and relieves the relay of switching stress. The relay may conduct when the semiconductor switch is active thereby reducing semiconductor device conduction losses.

In various embodiments, at least two of the plurality of shunt-connected, switch-controlled VAR sources are on a low voltage side of a transformer of the power distribution network. The VAR compensation component may comprise capacitors or inductors.

In some embodiments, each of the plurality of shunt-connected, switch-controlled VAR sources includes at least one voltage set point. Each of the processors of the plurality of shunt-connected, switch-controlled VAR sources may be configured to determine whether to enable the VAR compensation component based on a comparison of the proximate voltage to the at least one voltage set point. Each of the plurality of shunt-connected, switch-controlled VAR sources may increase leading volt-ampere reactive if the at least one voltage set point is higher than the detected proximate voltage and decrease leading volt-ampere reactive if the at least one voltage set point is lower than the detected proximate voltage.

In some embodiments, each of the plurality of shunt-connected, switch-controlled VAR sources comprises a communication module configured to receive at least one voltage set point. The communication module of different shunt-connected, switch-controlled VAR sources may receive updates for the at least one voltage set point(s). The communication module may be configured to update the voltage set point and a rate of update of the voltage set point may be significantly slower than adjusting the network volt-ampere reactive by controlling the switch to enable the VAR compensation component based on the determination. In some embodiments, at least two of the plurality of shunt-connected, switch-controlled VAR sources receive different voltage set points.

In some embodiments, the processor is further configured to detect an overvoltage condition and disable the switch based on the detected overvoltage condition. In various embodiments, the system self-determines which VAR compensation components of the plurality of VAR sources are enabled and which VAR compensation components of the plurality of VAR sources are not enabled.

An exemplary method comprises detecting, by a first shunt-connected, switch-controlled VAR source at an edge or near the edge of a distribution power network proximate to a first load, a first proximate voltage, the first load configured whether to receive power from the distribution power network, the first shunt-connected, switch-controlled VAR source comprising a processor and a VAR compensation component, determining, after a first delay, by the processor of the first shunt-connected, switch-controlled VAR source, whether to enable the VAR compensation component based on the first proximate voltage, adjusting, by the VAR compensation component of the first shunt-connected, switch-controlled VAR source, a network volt ampere based on the determination.

The method may further comprise detecting, by a second shunt-connected, switch-controlled VAR source at the edge or near the edge of the distribution power network proximate to a second load, a second proximate voltage, the second shunt-connected, switch-controlled VAR source comprising a VAR compensation component and a processor, determining, after a second delay, by the processor of the second shunt-connected, switch-controlled VAR source, whether to enable the VAR compensation component based on the second proximate voltage after a second delay; adjusting, by the VAR compensation component of the second shunt-connected, switch-controlled VAR source, the network volt ampere based on the determination.

The first delay may not equal to the second delay. The different delays of different members of the plurality of shunt-connected, switch-controlled VAR sources may prevent infighting between at least two of the different members.

Another exemplary method may comprise coupling a first switch-controlled VAR source in shunt on a distribution power network, the first switch-controlled VAR source being proximate to a first load at or near an edge of the distribution power network, the first load being configured to receive power from the distribution power network, the first switch-controlled VAR source configured to detect a first proximate voltage at the edge or near the edge of the distribution power network, the first switch-controlled VAR source comprising a VAR compensation component and a processor, the processor configured to enable the first switch-controlled VAR source to determine, after a first delay, whether to enable the VAR compensation component based on the first proximate voltage and to adjust network volt-ampere reactive by controlling a switch to enable the VAR compensation component based on the determination.

The method may further comprise coupling a second switch-controlled VAR source in shunt on a distribution power network, the second switch-controlled VAR source being proximate to a second load at or near an edge of the distribution power network, the second load being configured to receive power from the distribution power network, the second switch-controlled VAR source configured to detect a second proximate voltage at the edge or near the edge of the distribution power network, the second switch-controlled VAR source comprising a VAR compensation component and a processor, the processor configured to enable the second switch-controlled VAR source to determine, after a second delay, whether to enable the VAR compensation component based on the second proximate voltage and to adjust network volt-ampere reactive by controlling a switch to enable the VAR compensation component based on the determination.

The first delay may not be equal to the second delay. The different delays of different members of the plurality of shunt-connected, switch-controlled VAR sources may prevent infighting between at least two of the different members.

In various embodiments, a system comprises a distribution power network coupled to the first switch-controlled VAR source. The first switch-controlled VAR source may comprise a processor, a voltage compensation component, and a switch.

The first switch-controlled VAR source may be configured to obtain a first delay value that is different from another delay value of another switch-controlled VAR source coupled to the distribution power network, monitor a first proximate voltage of the distribution power network, the first proximate voltage being proximate to the first switch-controlled VAR source, initiate a first delay duration based on the comparison of the first proximate voltage to at least one set point, the first delay duration being based on the first delay value, determine, with the processor, after the first delay duration, whether to connect the voltage compensation component based on the monitored voltage, the monitored voltage being possibly changed by the other switch-controlled VAR source, and control, based on the determination, the switch to connect the voltage compensation component to adjust a network voltage or a network voltage component associated with the distribution power network.

In some embodiments, the first switch-controlled VAR source configured to obtain the first delay value comprises the switch-controlled VAR source configured to generate the first delay value. The switch-controlled VAR source configured to generate the first delay value may comprise the switch-controlled VAR source configured to generate the first delay value with a randomizer (e.g., random number generator). The first switch-controlled VAR source configured to obtain the first delay value may comprise the first switch-controlled VAR source receiving, via a communication interface of the switch-controlled VAR source, the first delay value. The first switch-controlled VAR source configured to obtain the first delay value may comprise a memory of the first switch-controlled VAR source configured to store the first delay value, the memory being accessible by the processor.

In some embodiments, the first switch-controlled VAR source configured to control, based on the determination, the switch to connect the voltage compensation component to adjust the network voltage or the network voltage component associated with the distribution power network comprises the first switch-controlled VAR source configured to control, based on the determination, the switch to connect the voltage compensation component to adjust real power, reactive power, or both real and reactive power.

The system may further comprise a second switch-controlled VAR source coupled to the distribution power network. The second switch-controlled VAR source may be configured to obtain a second delay value that is different from the first delay value, monitor a second proximate voltage of the distribution power network, the second proximate voltage being proximate to the second switch-controlled VAR source, initiate a second delay duration based on the comparison of the second proximate voltage to at least one set point, the second delay duration being based on the second delay value, determine, by a processor of the second switch-controlled VAR source, after the second delay duration, whether to connect a voltage compensation component of the second switch-controlled VAR source based on the monitored second proximate voltage, the monitored second proximate voltage being changed by the first switch-controlled VAR source before the end of the second delay duration, and control, based on the determination, a switch of the second switch-controlled VAR source to connect the voltage compensation component of the second switch-controlled VAR source to adjust a network voltage or a network voltage component associated with the distribution power network.

In various embodiments, the system may further comprise a second switch-controlled VAR source coupled to the distribution power network. The second switch-controlled VAR source may be configured to obtain a second delay value that is different from the first delay value, monitor a second proximate voltage of the distribution power network, the second proximate voltage being proximate to the second switch-controlled VAR source, initiate a second delay duration based on the comparison of the second proximate voltage to at least one set point, the second delay duration being based on the second delay value, and determine, by a processor of the second switch-controlled VAR source, after the second delay duration, to not connect a voltage compensation component of the second switch-controlled VAR source based on the monitored second proximate voltage, the monitored second proximate voltage being changed by the first switch-controlled VAR source before the end of the second delay duration.

The first switch-controlled VAR source may be further configured to obtain a different delay value that is longer than the first delay value after control of the switch. In some embodiments, the switch comprises a semiconductor switch in series with an NTC or resistor, and wherein the semiconductor switch in series with the NTC or resistor is in parallel with a relay.

An exemplary method comprises obtaining, by a first switch-controlled VAR source coupled to a distribution power network, a first delay value that is different from another delay value of another switch-controlled VAR source coupled to the distribution power network, monitoring a first proximate voltage of the distribution power network, the first proximate voltage being proximate to the first switch-controlled VAR source, initiating a first delay duration based on the comparison of the first proximate voltage to at least one set point, the first delay duration being based on the first delay value, determining, with a processor of the first switch-controlled VAR source, after the first delay duration, whether to connect a voltage compensation component of the first switch-controlled VAR source based on the monitored voltage, the monitored voltage being possibly changed by the other switch-controlled VAR source, and controlling, based on the determination, a switch of the first switch-controlled VAR source to connect the voltage compensation component to adjust a network voltage or a network voltage component associated with the distribution power network.

An exemplary computer readable medium may comprise instructions executable by a processor for performing a method. The method may comprise obtaining, by a first switch-controlled VAR source coupled to a distribution power network, a first delay value that is different from another delay value of another switch-controlled VAR source coupled to the distribution power network, monitoring a first proximate voltage of the distribution power network, the first proximate voltage being proximate to the first switch-controlled VAR source, initiating a first delay duration based on the comparison of the first proximate voltage to at least one set point, the first delay duration being based on the first delay value, determining, with a processor of the first switch-controlled VAR source, after the first delay duration, whether to connect a voltage compensation component of the first switch-controlled VAR source based on the monitored voltage, the monitored voltage being possibly changed by the other switch-controlled VAR source, and controlling, based on the determination, a switch of the first switch-controlled VAR source to connect the voltage compensation component to adjust a network voltage or a network voltage component associated with the distribution power network.

BRIEF DESCRIPTION OF THE DRAWINGS

FIG. 11d-1 is an exploded schematic view of the corresponding element of FIG. 11d.

FIG. 11d-2 is an exploded schematic view of the corresponding element of FIG. 11d.

FIG. 11d-3 is an exploded schematic view of the corresponding element of FIG. 11d.

FIG. 11d-4 is an exploded schematic view of the corresponding element of FIG. 11d.

DETAILED DESCRIPTION

New requirements for distribution dynamic voltage control are emerging, driven by distribution renewable energy penetration and the need to increase grid capacity without building new lines or infrastructure. Applications such as Conservation Voltage Reduction (CVR) and Volt VAR Optimization (VVO) promise 3-5% increase in system capacity, simply by lowering and flattening the voltage profile along a distribution grid. To achieve CVR and VVO in the prior art, improvements to the power grid are slow in operation, difficult to model due to increased complexity of the overall system, require considerable back end infrastructure (e.g., modeling, and a centralized, computation and communication facility), are expensive to install in sufficient numbers to improve performance, and difficult to maintain. Further, conventional VVO schemes realize poor voltage regulation due to few control elements and poor granular response.

In various embodiments discussed herein, line voltage may be regulated at or near every customer point (i.e., at the load along a distribution power grid). For example, a utility may install a shunt-connected, switch-controlled volt-ampere reactive (VAR) source at each customer location. Each shunt-connected, switch-controlled volt-ampere reactive (VAR) source may detect a voltage proximate to the device and make a determination to enable a VAR compensation component (e.g., capacitor(s) and/or inductor(s)) to regulate voltage on the network. The plurality of shunt-connected, switch-controlled volt-ampere reactive (VAR) sources, switching independently, may operate collectively to flatten the voltage curve (e.g., voltage impact along a medium voltage distribution feeder starting from a substation) along a power network. The plurality of VAR sources may be controlled to prevent fighting between sources, while allowing connected points to reach a desired voltage set point with much higher granularity and accuracy.

If distributed VAR compensation is implemented, the utility may realize several benefits. For example, a desired voltage profile may be maintained optimally along the line even as system configuration changes, system losses may decrease, and/or system stability and reliability may be improved. New cascading grid failure mechanisms, such as Fault Induced Delayed Voltage Recovery (FIDVR) may also be avoided through the availability of distributed dynamically controllable VARs.

In various embodiments, distributed fast voltage controllers and/or compensators at or near a power network edge provides a solution that is able to act autonomously on local information with little to no infighting. This approach may remove uncertainty about the voltage variations at a range of nodes, flatten the voltage profile along the edge of the network, and allow a Load Tap Changer (LTC) to drop the voltage to the lowest level possible.

Figure 1A:
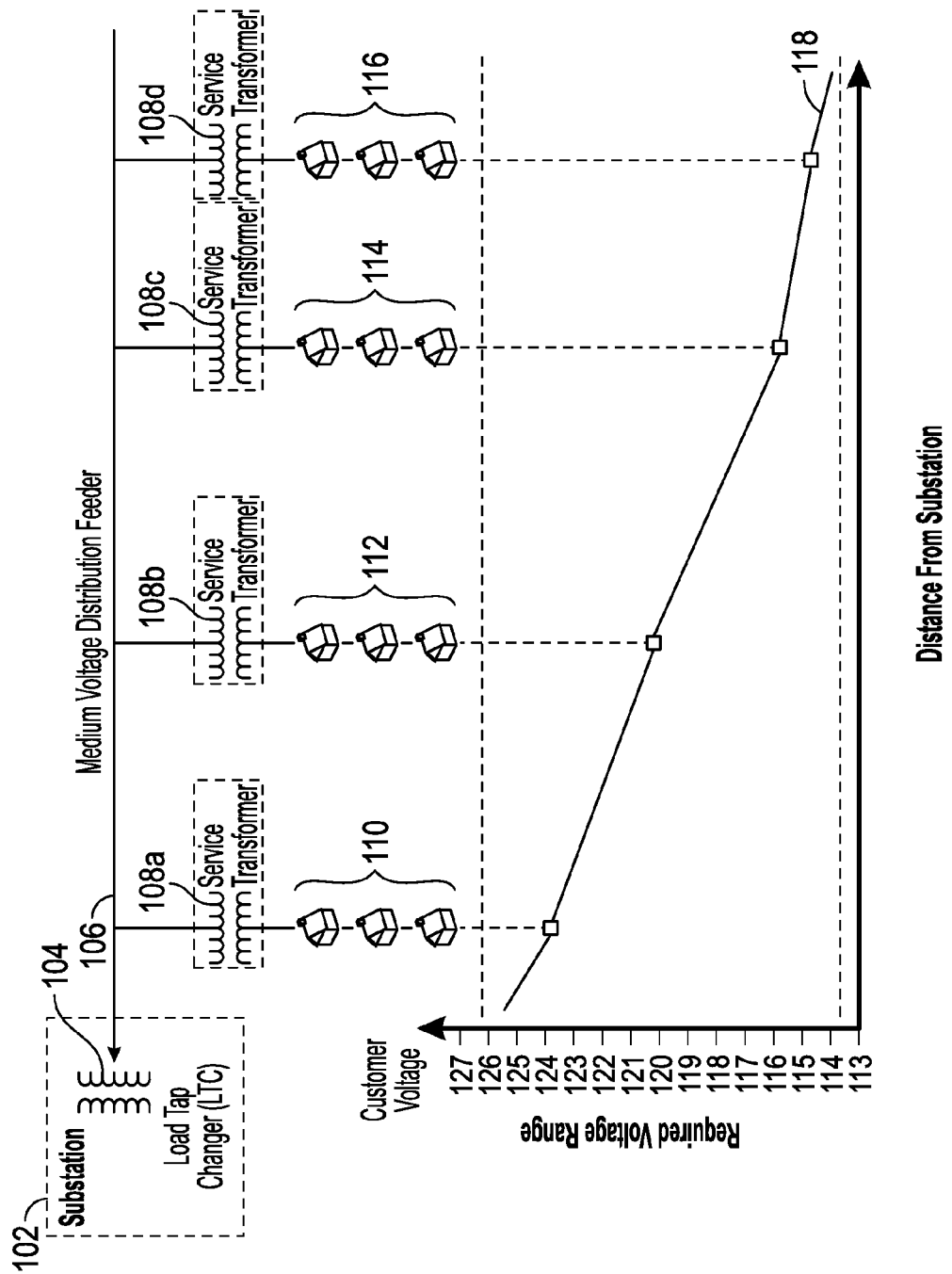
FIG. 1a depicts a typical distribution feeder fed from a single substation in some embodiments.

FIG. 1a depicts a typical distribution feeder 106 fed from a single substation 102 in some embodiments. Standard design practice involves the use of load tap changing (LTC) transformers 104 at substations 102, with fixed and switchable medium voltage capacitors on the feeder. FIG. 1 depicts a series of houses (i.e., loads) 110, 112, 114, and 116 that receive power from various distribution feeders coupled to the primary feeder 106 (e.g., distribution feeders separated from the primary feeder by transformers 108a-d). In the prior art, as the distance from the substation 102 increases, utility voltage 118 along the primary feeder (e.g., medium voltage distribution feeder 106) decreases.

In the prior art, load tap changers, slow acting capacitor banks, and line voltage regulators may be sporadically placed along one or more primary feeders 106 to improve voltage range. Without Conservation Voltage Reduction or CVR, the first houses 110 have a required utility voltage of approximately 124.2 volts. Houses 112 have a significantly reduced utility voltage of approximate 120-121 volts. Houses 114 further have a required voltage between 115 and 116 while houses 116 have a required voltage between 114 and 115.

Figure 1B:
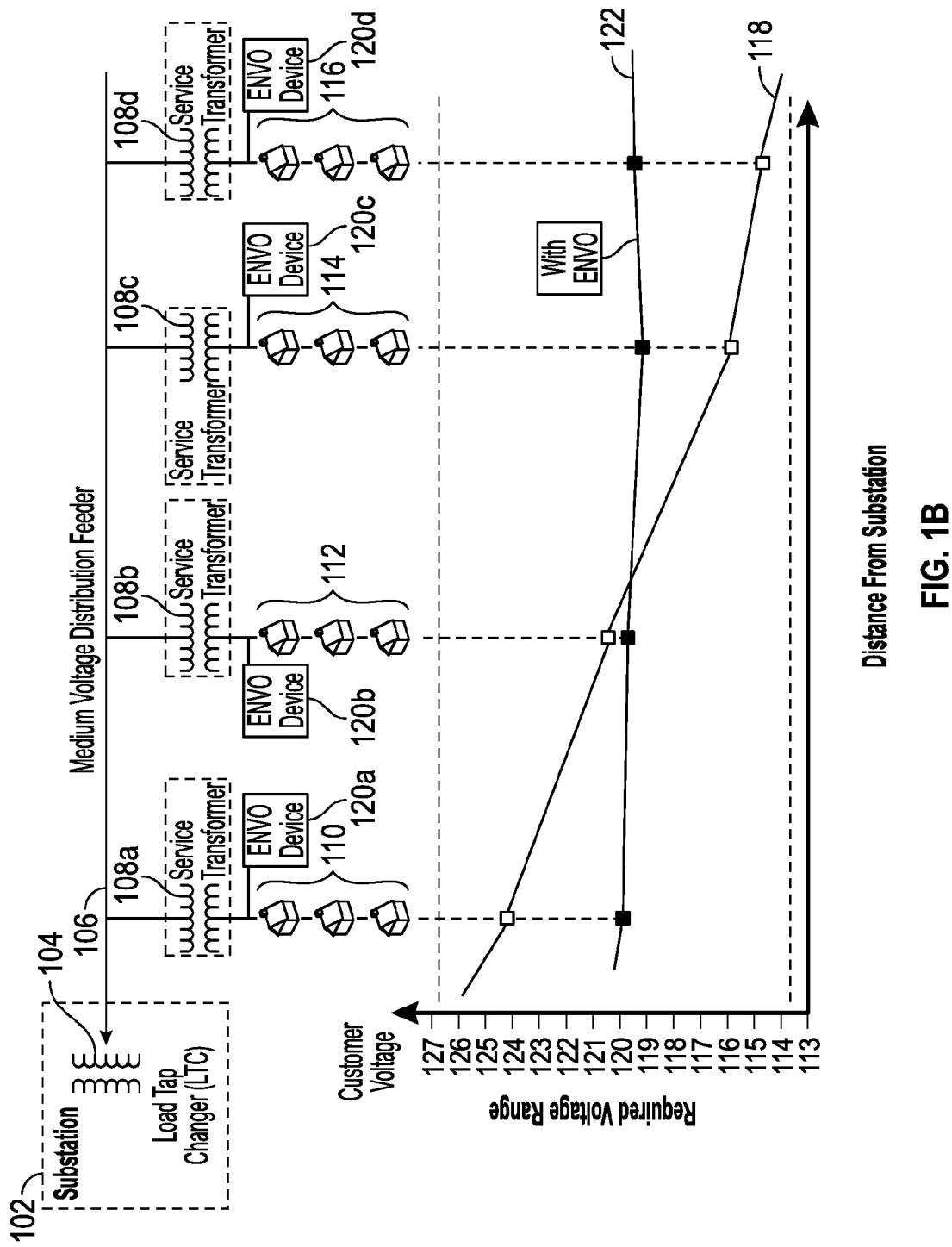
FIG. 1b depicts a distribution feeder fed from a single substation and including a plurality of edge of network voltage optimization (ENVO) devices in some embodiments.

FIG. 1b depicts a distribution feeder 106 fed from a single substation 102 and including a plurality of edge of network voltage optimization (ENVO) devices 120a-d in some embodiments. In various embodiments, VAR compensators (e.g., or any VAR source such as a PV inverter capable of VAR control), including, for example, ENVO devices 120a-d, may be placed at or near any number of the loads (e.g., houses 110, 112, 114, and 116). As a result, the overall voltage range may be flattened along the distance from the substation 102 thereby saving energy, increasing responsiveness, and improving overall control along longer distribution feeders. In order to avoid infighting between one or more VAR sources, the action of switching (e.g., the timing of switching or the point at which VAR compensation is engaged/disengaged) may be different between all or a portion of the VAR sources.

The VAR source may each act (e.g., activate or deactivate one or more VAR components such as a capacitor and/or inductor) quickly and independently, based at least on voltages proximate to the VAR sources, respectively, to improve voltage regulation and achieve Edge of Network Volt Optimization (ENVO) (see ENVO line 122). The ENVO line 122 depicts that the voltage required for houses 110 is approximately 120 volts. Houses 112, 114, and 116, may require a reasonably flat voltage range around approximately 120 volts as well. Those skilled in the art will appreciate that the ENVO line 122 achieves a desired flattening of the required voltage range while the line indicating utility voltage 118 without VAR compensation drops precipitously.

Figure 1C:
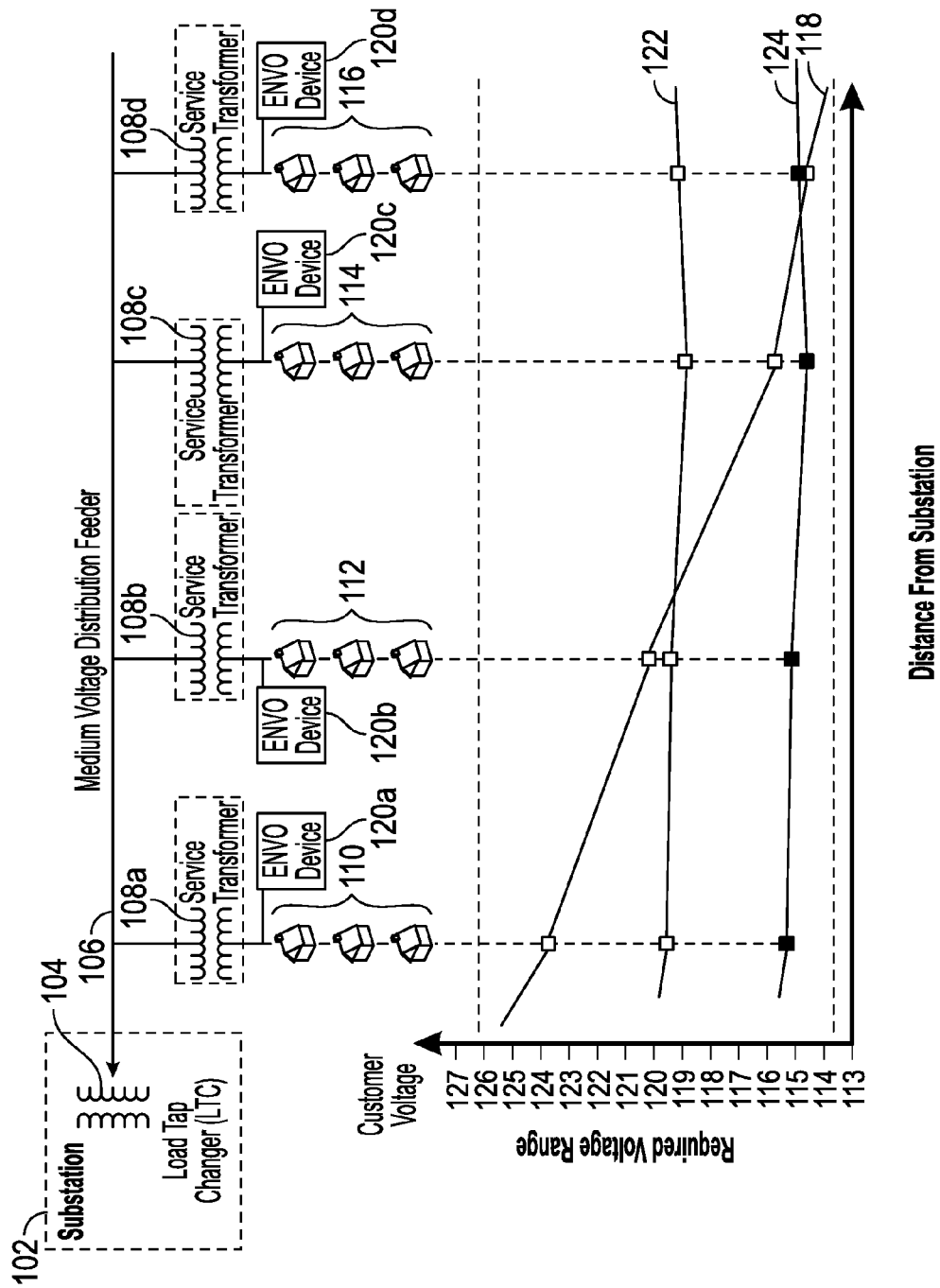
FIG. 1c depicts another distribution feeder fed from a single substation and including the plurality of ENVO devices in some embodiments.

FIG. 1c depicts another distribution feeder 106 fed from a single substation 102 and including the plurality of ENVO devices 120a-d in some embodiments. In various embodiments, the ENVO devices 120a-d may further apply Conservation Voltage Reduction (CVR) to further reduce required voltage. Line 124 represents the voltage achieved for houses 110, 112, 114, and 116 with ENVO devices 132a-b applying CVR. For example, line 124 (like ENVO line 122) is relatively flat. Houses 110 and 112 may see approximately 115.2 volts while houses 114 may see approximately 115 volts. Further, houses 116 may see 115.4 volts in this example. The need to improve system capacity utilization is driving utilities to implement peak demand reduction and capacity expansion using techniques such as Conservation Voltage Reduction (CVR) and Volt VAR Optimization (VVO) on non-ENVO devices. Utility companies currently apply CVR by receiving information from multiple points in the power grid, modeling the performance, modeling proposed improvements, and potentially coordinating activities of capacitor banks along the primary feeder on the medium voltage side of the transformers.

Poor controllability of preexisting voltage regulation devices presents severe challenges to managing voltage variations for system planners and operators. In particular, poor controllability limits the length of a distribution feeder that can be managed. Poor controllability also limits the load variability that can be handled, while keeping all voltages at end-user locations within bounds.

Further, new trends are seeing an increased use of sectionalizers with breaker/reclosers to isolate faulted segments and to restore power to other non-faulted line segments, resulting in a significant change in the network, and voltage profiles. Increased use of network reconfiguration also makes the task of placing capacitor banks and LTCs at fixed locations more problematic, as the placement has to meet the needs of multiple configurations. Moreover, the increasing use of distributed generation resources, such as roof top photovoltaic (PV) arrays can result in a reversal of power flows locally, with higher line voltages farther away from the substation, and a breakdown of any voltage regulation algorithm that was implemented.

Those skilled in the art will appreciate that VAR sources at or near the edge of the power grid may individually react and correct for higher line voltages that may be a result of PV arrays (e.g., green energy improvement such as solar panels). These VAR sources may allow both the customer and the network to enjoy the benefits of green power without significantly redesigning or altering the grid to accommodate the change. Since the voltage along the edge of the network can change due to a multitude of sources and loads that are distributed along the network, a centralized algorithm, containing a complete state of the grid including all variables that affect load and input, for slow voltage control and regulation may not be effective, and with proper operation of a distributed autonomous control algorithm, may also become unnecessary.

Figure 2:
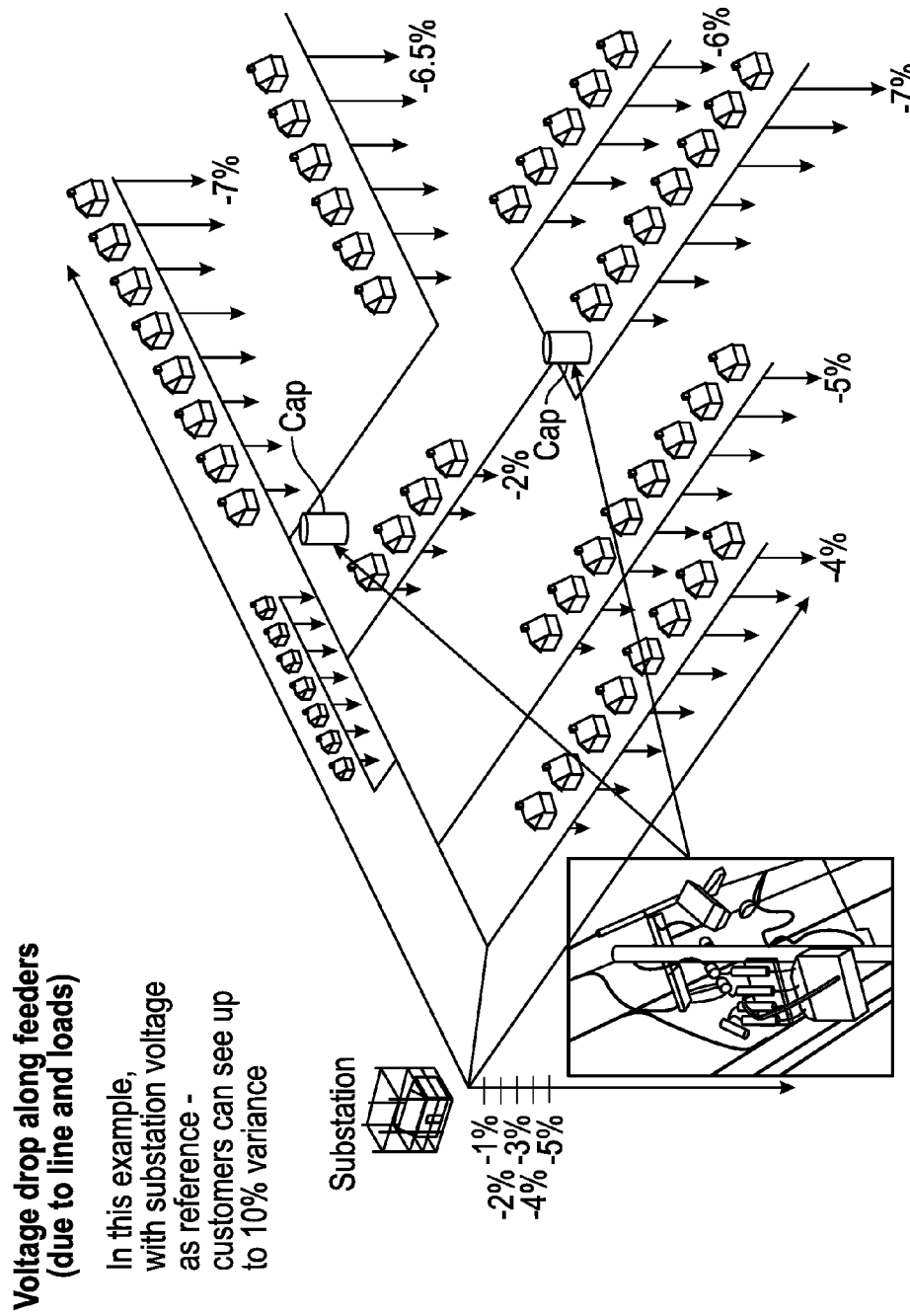
FIG. 2 is a diagram depicting voltage drop along feeders due to loads without the implementation of capacitor banks in the prior art.

FIG. 2 is a diagram depicting voltage drop along feeders due to loads without the implementation of capacitor banks in the prior art. As depicted in FIG. 2, the length of the feeder lines from the substation is limited by the voltage drop. In this example, there is a 10% variance in available voltage. In the prior art, the objective is to keep voltage within a broad band. As few control handles are available, only very course control is possible. Ideally, the voltage should be closely regulated to specifications all along the line, including in the presence of dynamic fluctuations. With few sensors, few correction points, slow communication, and a limited number of operations, prior art control is unable to meet the dynamic control requirements of the new and future distribution power grid.

By utilizing sporadically placed capacitor banks, voltage regulation may be implemented to flatten the available voltage range and reduce losses. The capacitor banks may operate based on temperature, for example, or based on commands from a centralized control facility. When based on temperature, for example, to avoid interactions and to maximize switch life of the capacitor banks, switching to activate or deactivate one or more capacitors is infrequent and slow. Capacitor banks that are operated under the control a centralized facility may be individually commanded to avoid interactions.

In spite of the attempts of controlling voltage through CVR, drops along the length of the feeder are only marginally affected by the activation of the capacitor banks. In these examples, the capacitor bank may typically be switched only three-to-four times per day. The process may be slow as well. In one example, it may take up to fifteen minutes to: 1) detect conditions; 2) provide the conditions to a centralized facility; 3) the centralized facility model conditions and make a determination to enable or disable a capacitor bank; 4) provide a command to one or more capacitor banks; and 5) receive the command and perform the switching.

Further, multiple thyristor switched capacitors, if operating independently, may fight with each other as each device attempts to compensate for a locally measured state of the power network. As the thyristor switched capacitors work at cross purposes, they tend to overcompensate and undercompensate while constantly reacting to the corrections of other thyristor switched capacitors on the power network. The traditional approach of autonomous VAR control to prevent infighting is to use of voltage droop techniques. The use of voltage droop, however, counteracts the objective of CVR which is to maintain a flat and reduced voltage at every load point. As a result, precise and rapid control of voltage at multiple points along the grid cannot be obtained with conventional techniques.

Figure 3A:
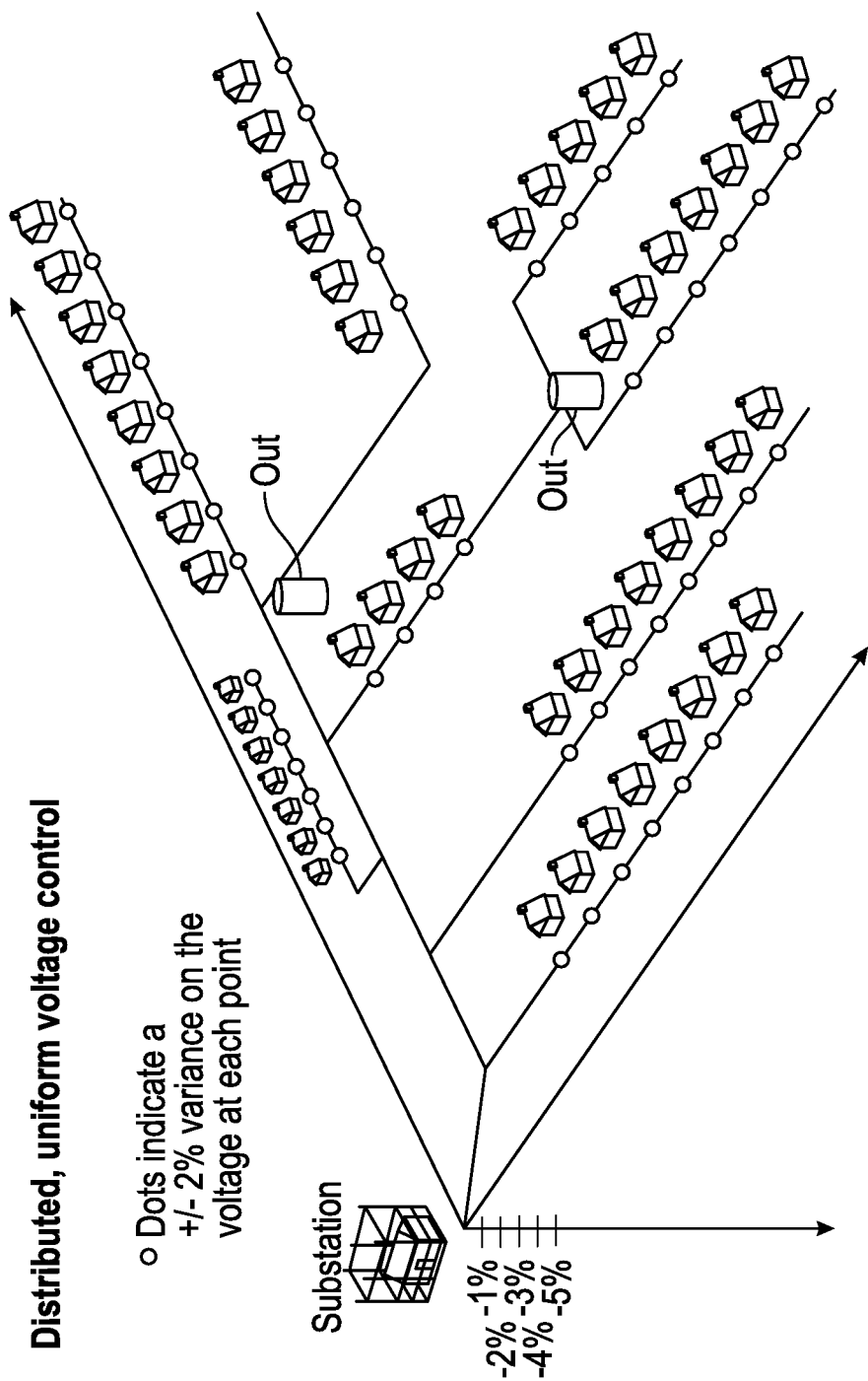
FIG. 3a is a diagram depicting a power distribution grid with shunt-connected, switch-controlled VAR sources at or near each load in some embodiments.

FIG. 3a is a diagram depicting a power distribution grid with shunt-connected, switch-controlled VAR sources at or near each load in some embodiments. Loads are depicted as houses or residences. In addition to houses or residences, those skilled in the art will appreciate that the loads can be any loads including, but not limited to, commercial or industrial establishments. A load is any component, circuit, device, piece of equipment or system on the power distribution network which consumes, dissipates, radiates or otherwise utilizes power. A power distribution grid is an electrical grid, such as an interconnected network, for delivering electricity from suppliers to consumers.

In this example, voltage may be regulated at or near the edge of the network thereby allowing edge of network volt optimization (ENVO). An edge of the network is the portion of a power distribution network that is proximate to the load that is to receive power. In one example, the load is a customer load. An edge of the network may be on the low-voltage side of a transformer. For example, the edge of the network may comprise one or more feeder lines configured to provide power to multiple customer loads (e.g., housing residences).

Figure 11A:
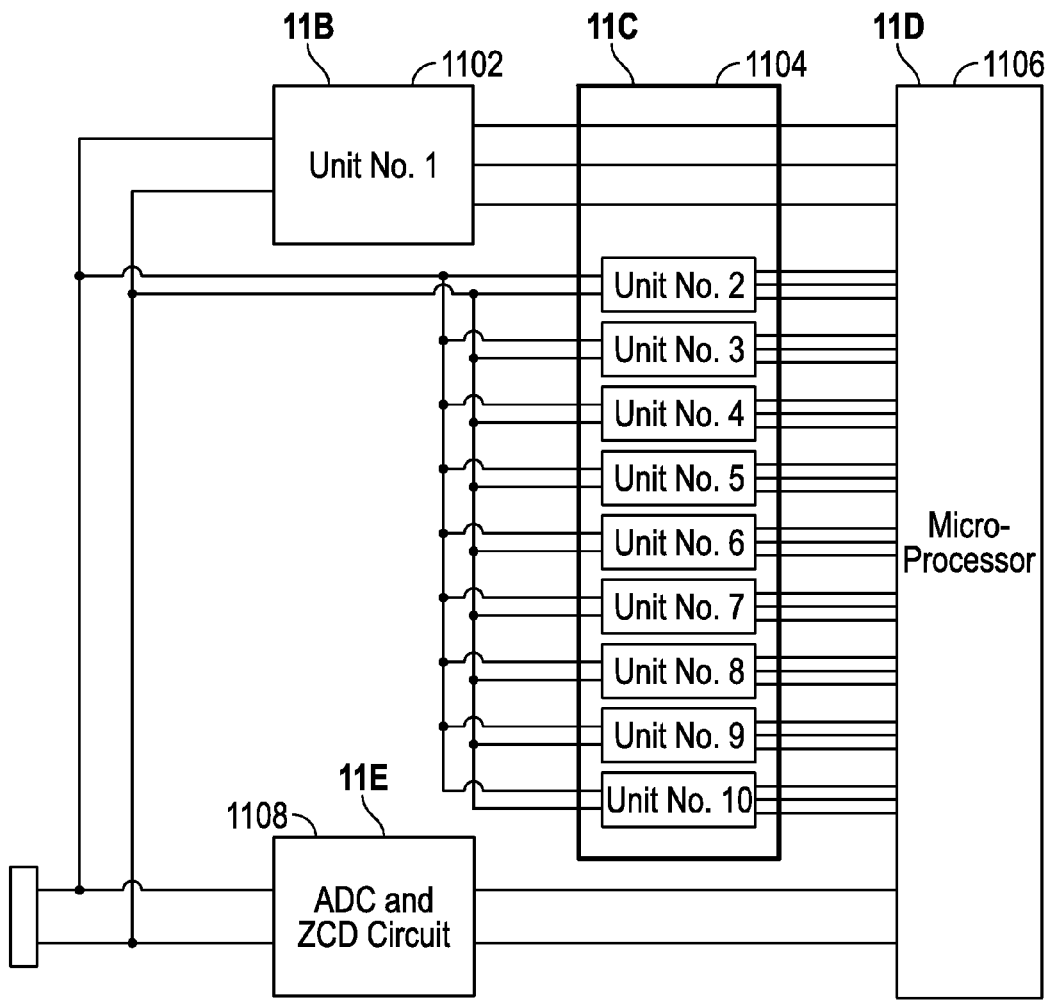
FIG. 11a is another circuit diagram of a plurality of switch-controlled VAR sources that may be within or next to a pole top transformer or any grid asset in some embodiments.
Figure 11B:
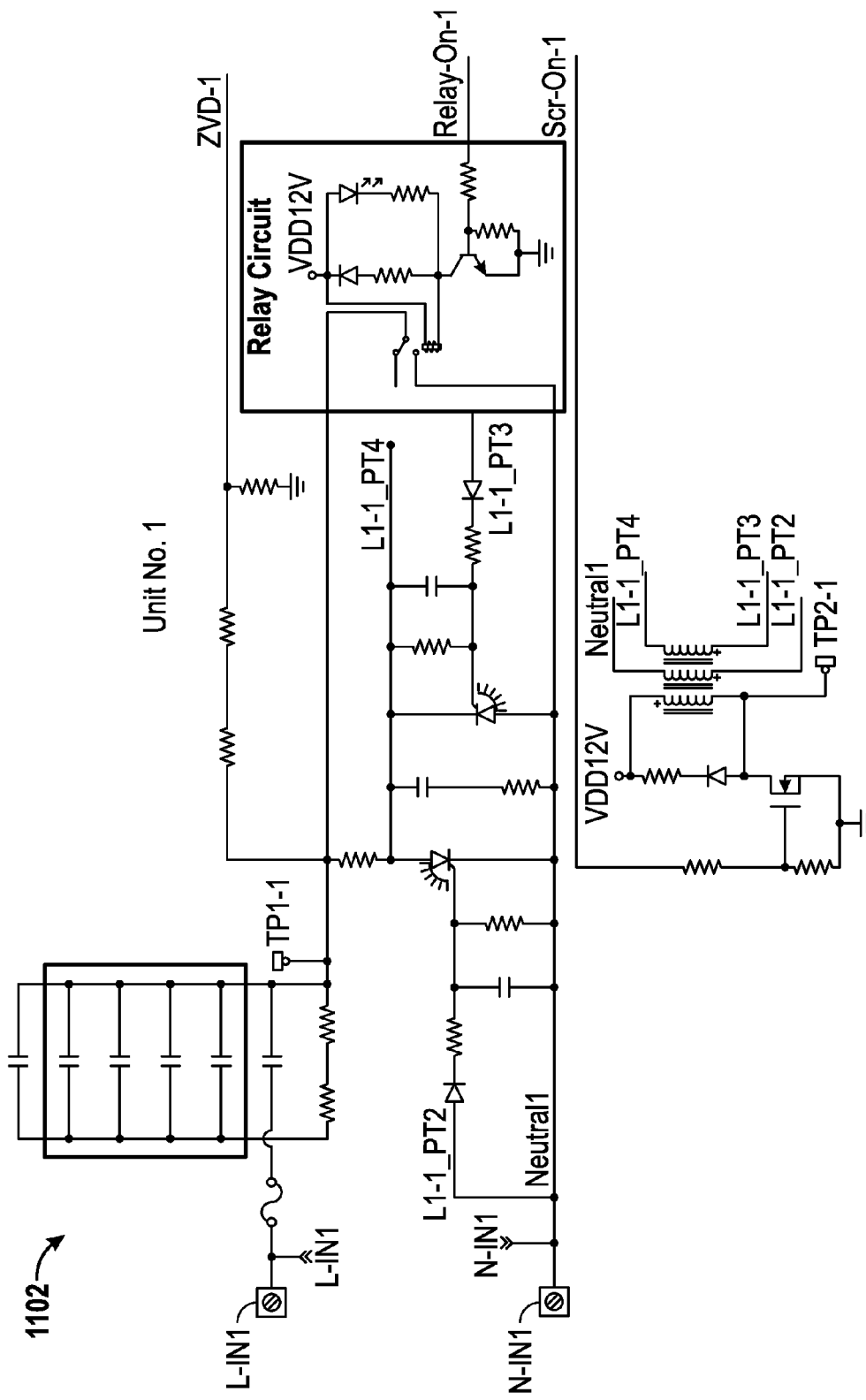
FIG. 11b depicts a switch-controlled VAR source in some embodiments.
Figure 11C:
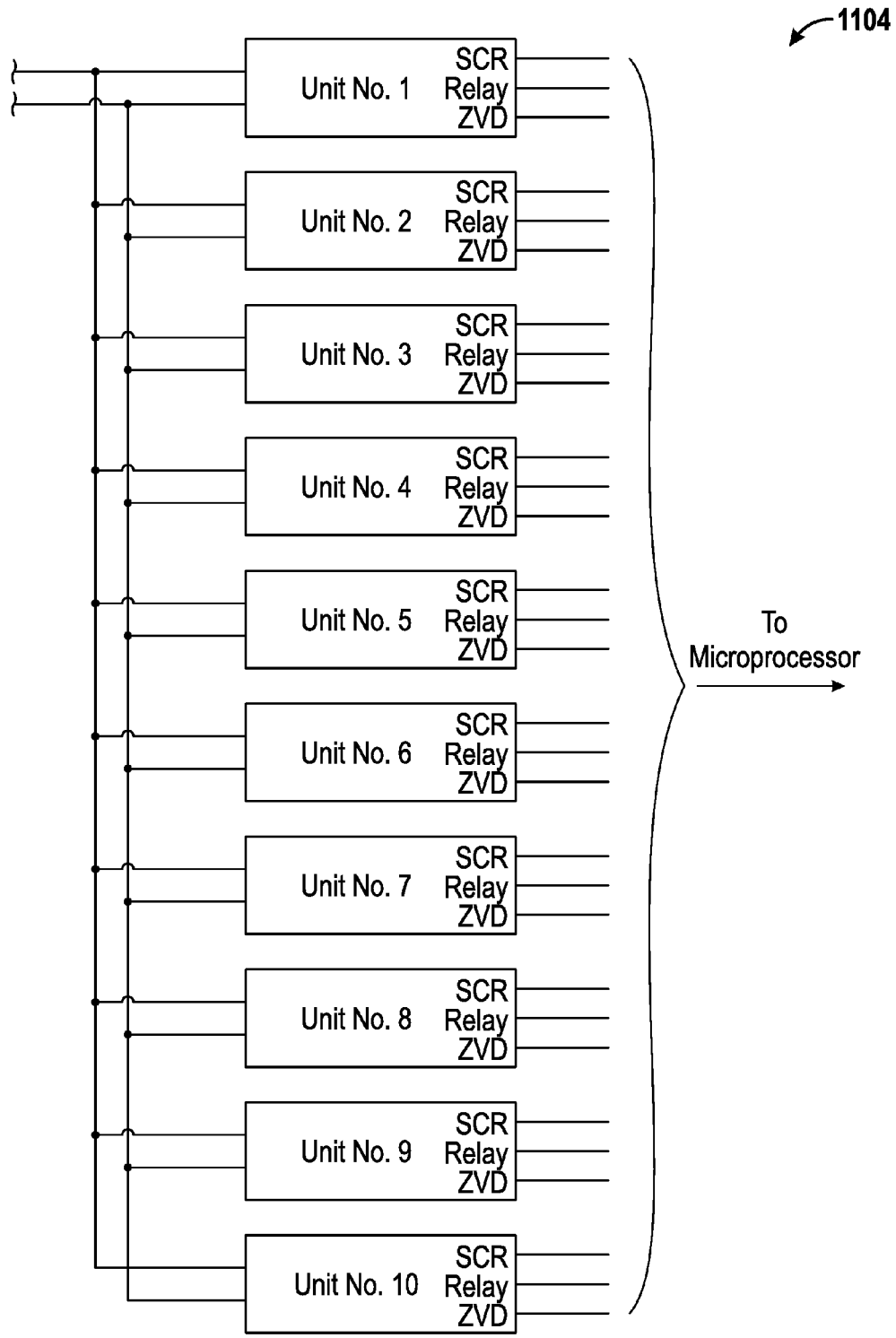
FIG. 11c depicts a plurality of switch-controlled VAR sources in some embodiments.
Figure 11D:
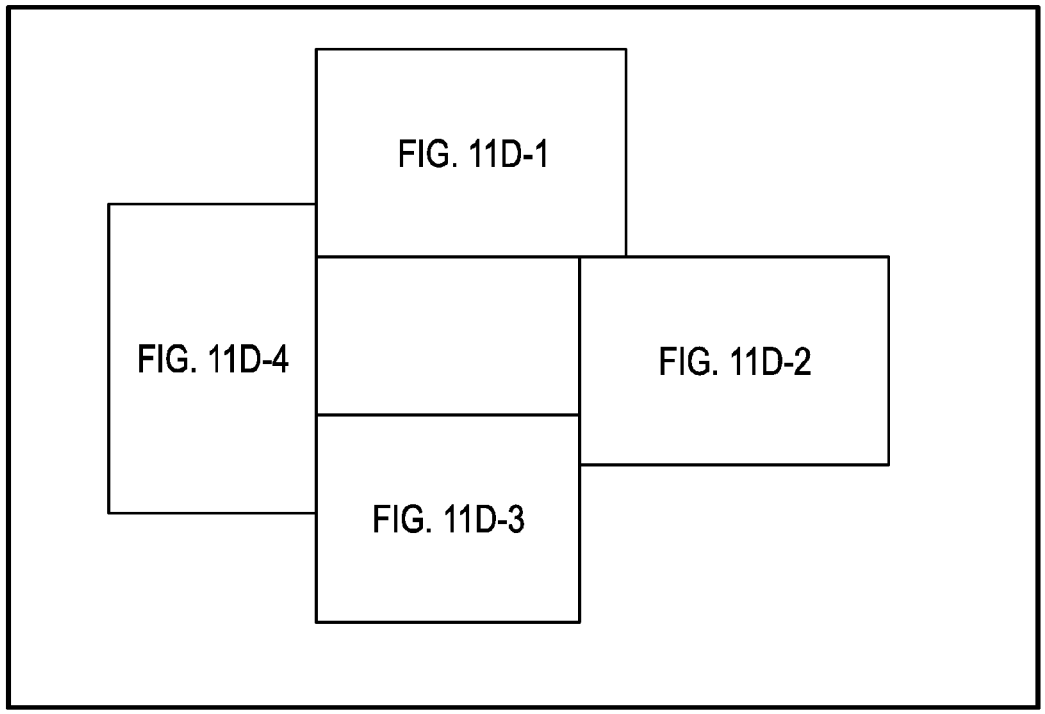
FIG. 11d depicts a controller in some embodiments.
Figures 1, 11D:
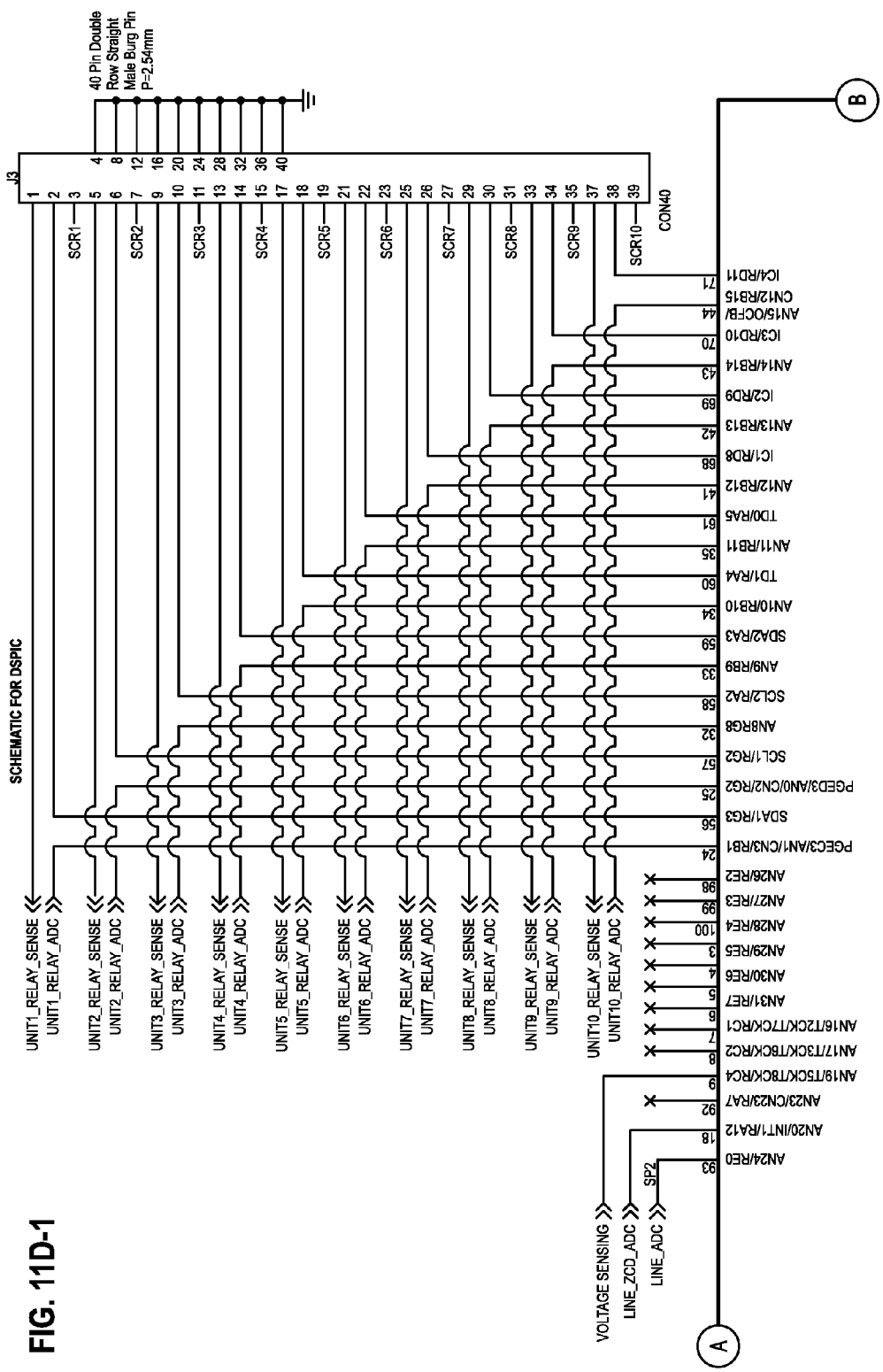
Figures 2, 11D:
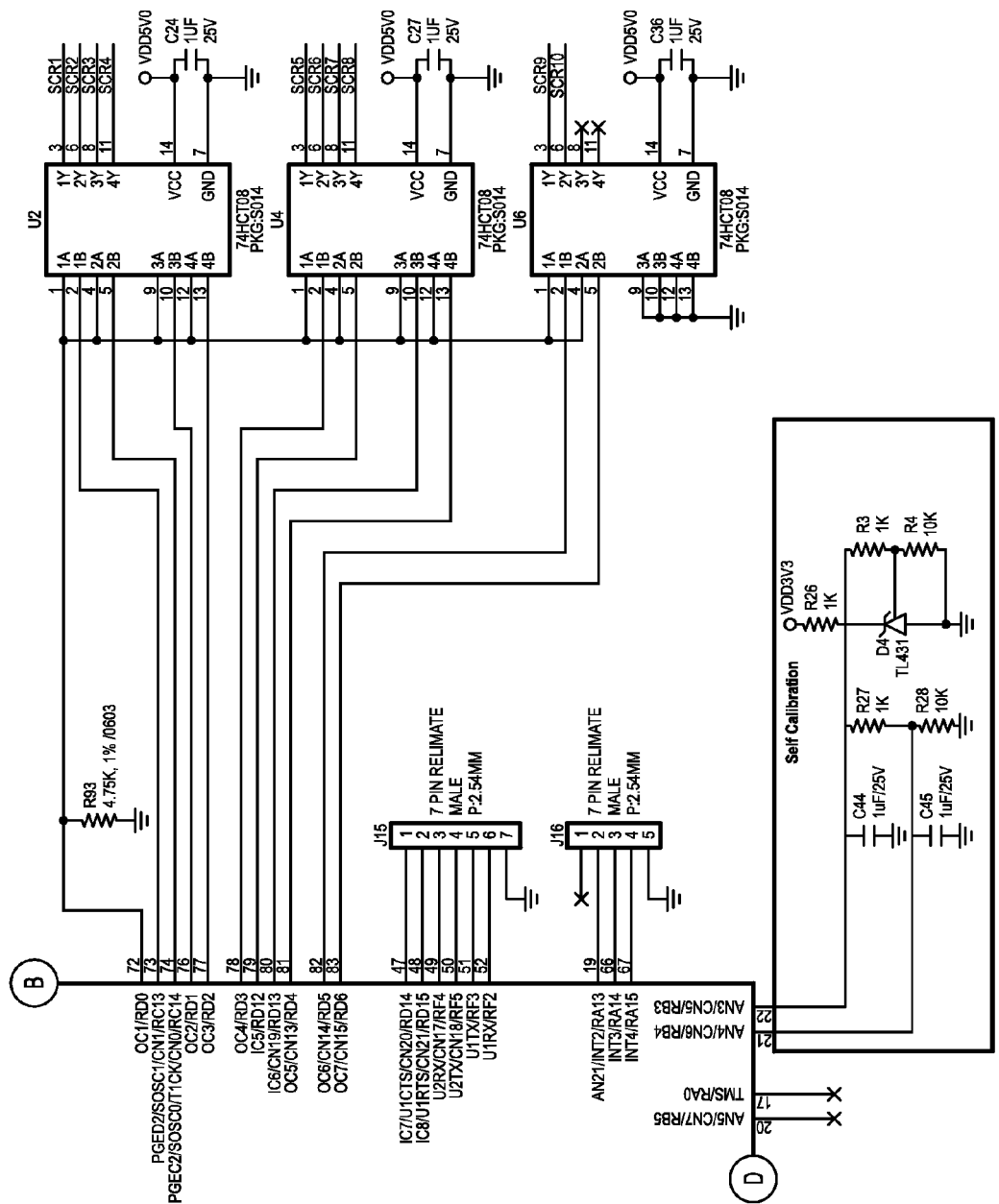
Figures 3, 11D:
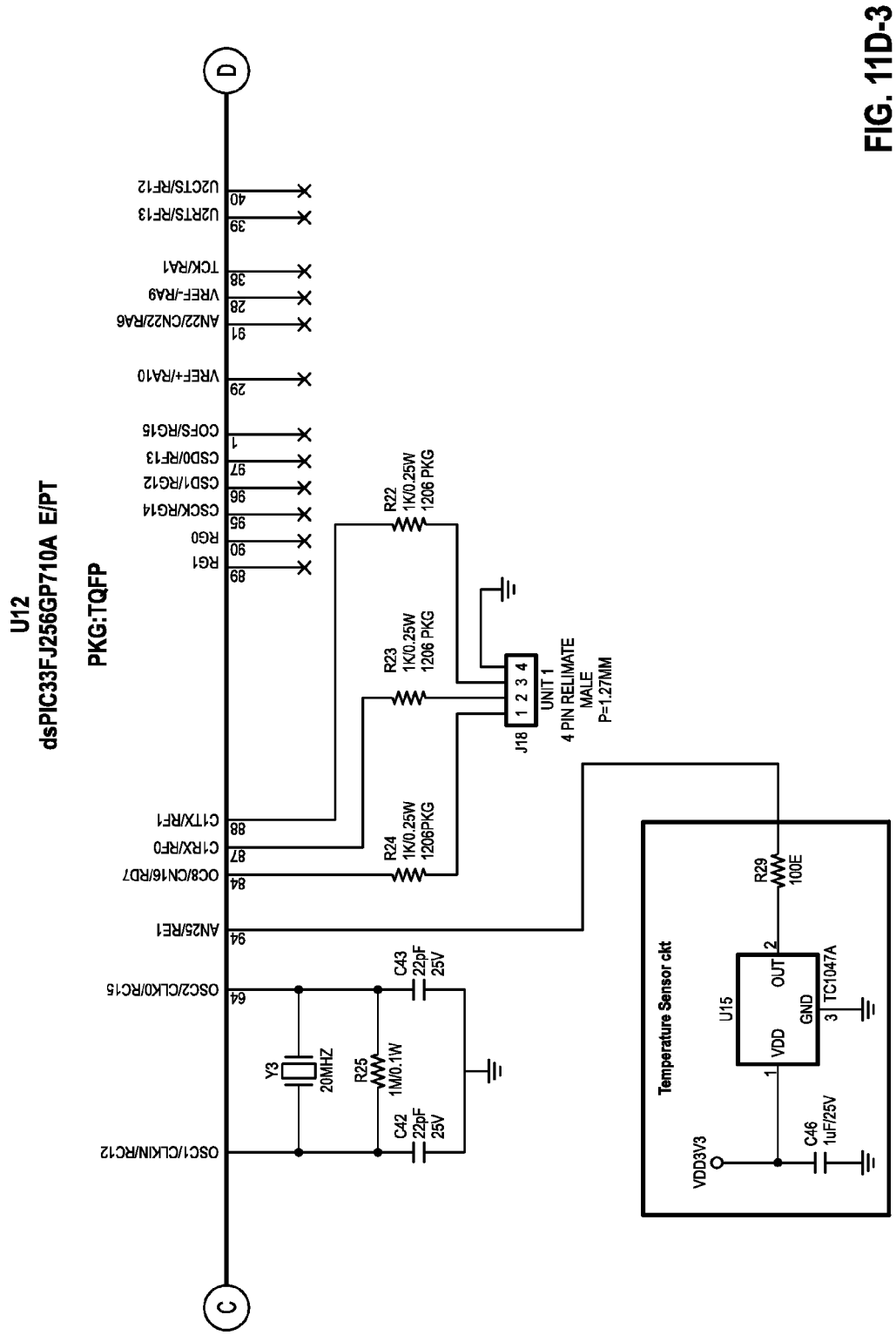
Figures 4, 11D:
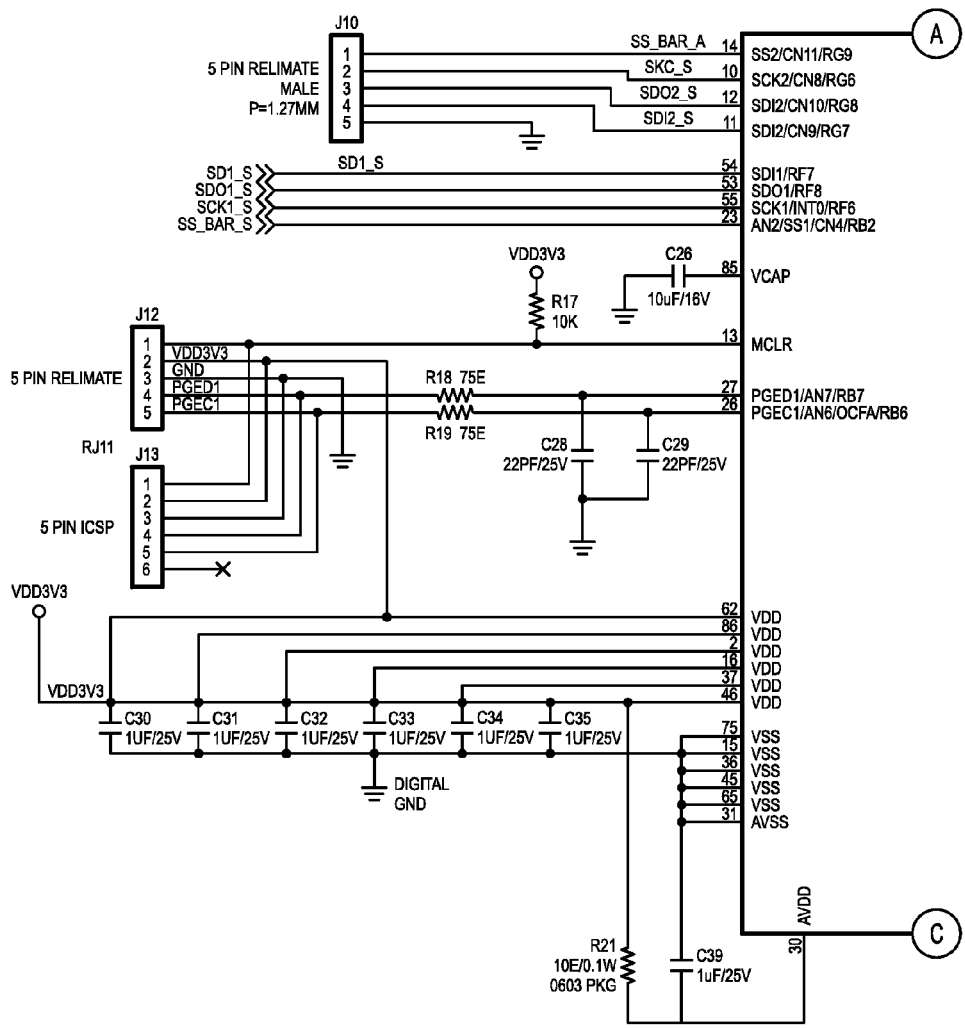

In FIG. 3, a substation provides power to residences (e.g., loads) over a series of regional distribution feeders. Each residence and shunt-connected, switch-controlled VAR source is coupled to the power distribution grid. In various embodiments, each shunt-connected, switch-controlled VAR source is configured to detect voltage and adjust network volt-ampere reactive (VARs) based on the detected voltage. In one example, the shunt-connected, switch-controlled VAR source enables a capacitor and/or an inductor to change (e.g., reduce or eliminate) the reactive power of the power distribution grid thereby regulating voltage of the network (i.e., network voltage). The change in reactive power may reduce the voltage drop along the distribution feeder.

As discussed regarding FIG. 1, shunt-connected, switch-controlled VAR sources may be placed at or near any number of the loads. As a result, the overall voltage range may be flattened along the distance from the substation thereby saving energy, increasing responsiveness, and improving overall control along longer distribution feeders. The VAR source may each act (e.g., activate or deactivate one or more VAR components such as a capacitor and/or inductor) quickly and independently, based at least on voltages proximate to the VAR sources, respectively, acting collectively to improve voltage regulation and achieve ENVO. FIG. 3 depicts that the voltage distribution drop is flatter, for example a +/−2% variance across the network depicted in FIG. 3 without the implementation of the capacitor banks.

Figure 3B:
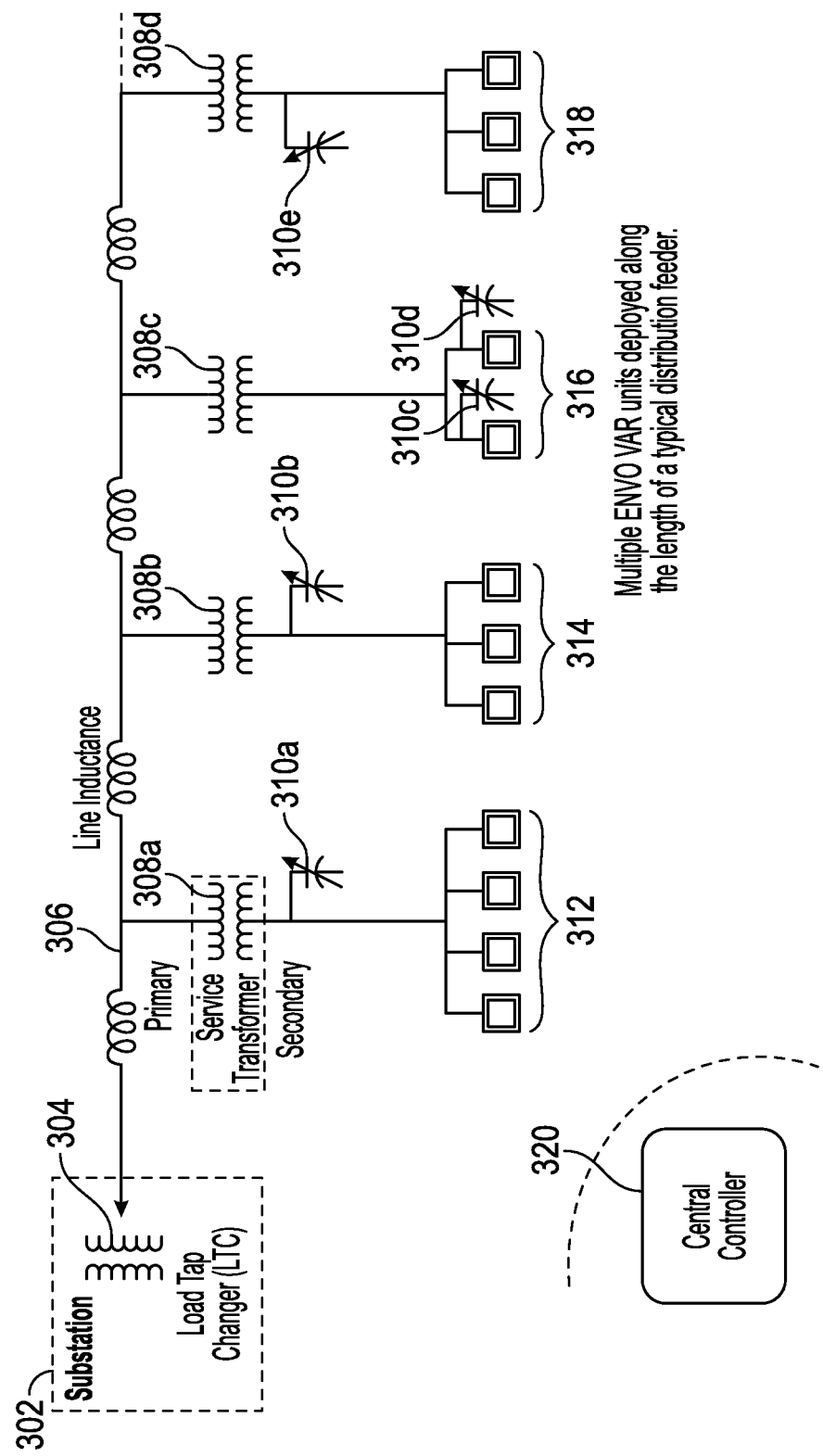
FIG. 3b is another diagram depicting a power distribution grid with shunt-connected, switch-controlled VAR sources at or near each load in some embodiments.

FIG. 3b is another diagram depicting a power distribution grid with shunt-connected, switch-controlled VAR sources at or near each load in some embodiments. In FIG. 3b, a substation 302 with a load tap changer (LTC) 304 feeds a distribution feeder 306 with line inductance and resistance throughout the distribution feeder 306. Loads 312, 314, 316, and 318 receive power from the distribution feeder 306 via transformers 310a-d respectively. Further, each subfeeder between a transformer and the loads may include on or more ENVO devices 310a-e that may be configured to act as one or more VAR compensators. In various embodiments, multiple ENVO devices (e.g., ENVO VAR units) may be deployed along the length of a typical distribution feeder to flatten the required voltage and respond to network conditions.

In various embodiments, an optional central controller 320 may communicate with one or more of the ENVO devices 310a-e to receive sensor information and/or behavior information regarding the actions of one or more ENVO devices 310a-e. In some embodiments, one or more of the ENVO devices 310 may include a communication interface configured to communicate with each other and/or the central controller 320. The central controller 320 may, in some embodiments, provide one or more set points (discussed herein) that may assist in controlling when one or more of the ENVO devices 310 become active (e.g., based on comparing one or more set points to voltage of a portion of the power distribution network. The central controller 320 is further discussed herein.

Figure 4A:
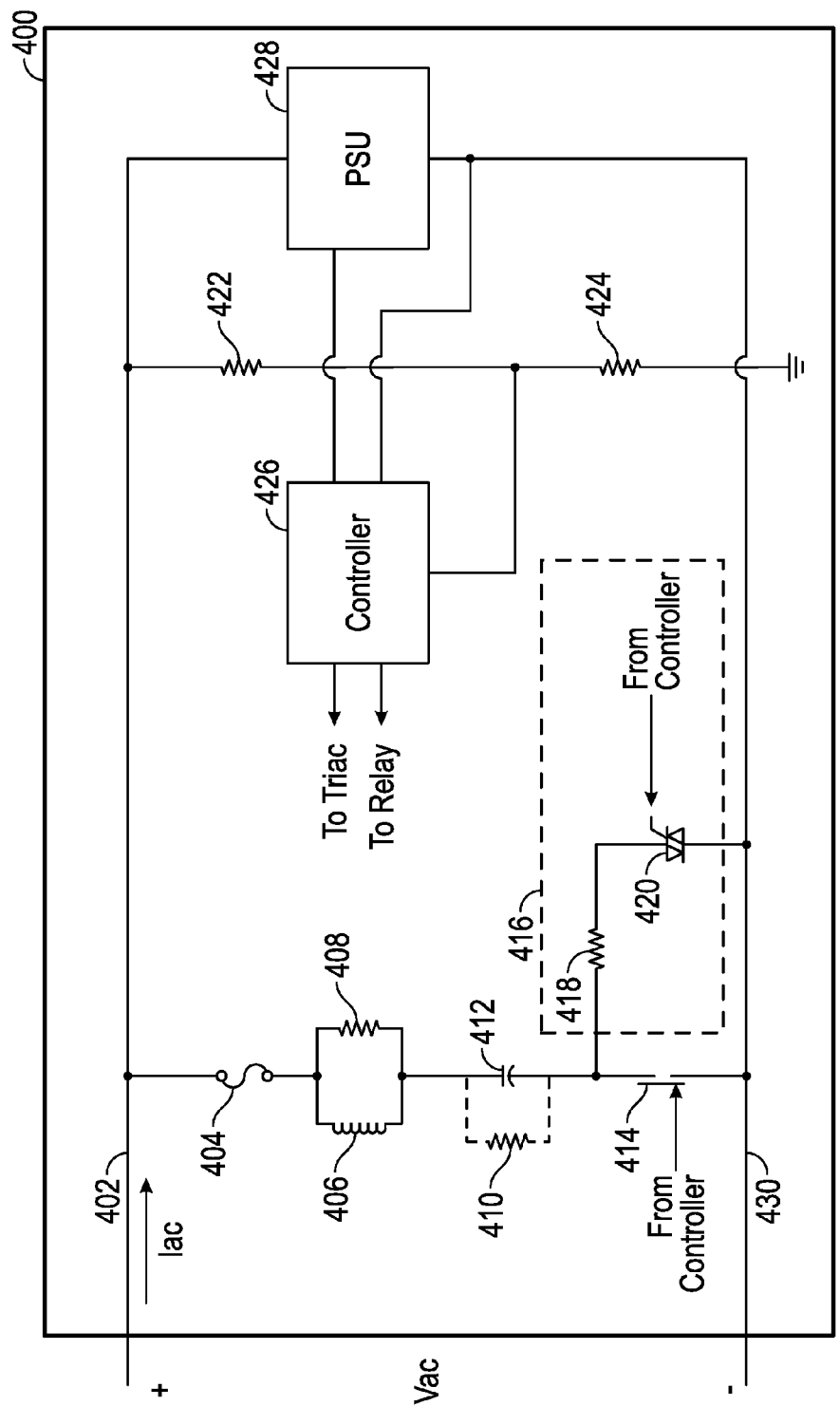
FIG. 4a is a circuit diagram of an exemplary switch-controlled VAR source which may be connected in shunt in some embodiments.

FIG. 4a is a circuit diagram of an exemplary switch-controlled VAR source 400 which may be connected in shunt in some embodiments. The switch-controlled VAR source 400 may be a part of a large number of switch-controlled VAR sources 400 at or near an edge of the power distribution grid (i.e., the power network).

At a high level, the switch-controlled VAR source 400 comprises a capacitor 412 (e.g., a VAR compensation component) that is controlled through a relay 414 in parallel with a semiconductor switch 416 (e.g., triac 420—NTC 418 is optional). A processor, such as controller 426, may control the relay 414 and semiconductor switch 416 based on voltage. For example, the controller 426 may detect voltage proximate to the switch-controlled VAR source 400 (e.g., through line 402). Based on the detected voltage, the controller 426 may enable or disable the capacitor by controlling the relay 414 and semiconductor switch 416. As discussed herein, the relay 414 and semiconductor switch 416 may work together to protect and prolong the life of various components of the switch-controlled VAR source 400 during switching operations.

The exemplary switch-controlled VAR source 400 comprises lines 402 and 430, fuse 404, an optional inductor 406, resistors 408, 410, 418, 422, and 424, capacitor 412, relay 414, a switch 416 comprising an optional NTC 418 and triac, controller 426, and power supply unit (PSU) 428. Lines 402 and 430 may be coupled to a feeder such as a feeder on the low voltage side of a transformer. In one example, lines 402 and 430 may be coupled to any line or feeder configured to provide power to one or more loads (e.g., on or at the edge of a network). In some embodiments, the switch-controlled VAR source 400 is proximate to a residential or commercial load. For example, the switch-controlled VAR source 400 may be within a smart meter, ordinary meter, or transformer within proximity to a load. Those skilled in the art will appreciate that the switch-controlled VAR source 400 may be within any grid asset.

The fuse 404 is configured to protect the switch-controlled VAR source 400 from voltage spikes, transients, excessive current, or the like. The fuse 404 may prevent excessive thermal loading of a failed component, thus allowing the grid to operate even as the VAR source is removed from the circuit. The fuse 404 may be any fuse and may be easily replaceable. In some embodiments, if the fuse 404 clears and the switch-controlled VAR source 400 is disconnected from the power distribution network, the power delivered to the residential and/or commercial loads may not be interrupted.

The optional inductor 406 and resistor 408 may act as an L-R snubber to control peak inrush currents (e.g., during startup conditions) and to manage harmonic resonances. In some embodiments, the inductor 406 and resistor 408 may prevent wear on the capacitor 412 and/or the other circuits of the switch-controlled VAR source 400 caused by changes in voltage or power received from the line 402 and/or activation or deactivation of the switch-controlled VAR source 400.

Those skilled in the art will appreciate that, in some embodiments, the inductor 406 and resistor 408 may reduce susceptibility of the capacitor 412 to harmonic resonance. In various embodiments, the switch-controlled VAR source 400 does not comprise the inductor 406 and/or the resistor 408.

The capacitor 412 may be any capacitor configured to compensate for reactive power (e.g., VARs). In various embodiments, the relay 414 and/or the semiconductor switch 416 may form a switch that completes the circuit thereby allowing the capacitor 412 to influence reactive power of the network. In one example, if the relay 414 is open and the triac 420 (of the semiconductor switch 416) is deactivated, the capacitor 412 may be a part of an open circuit may, therefore, have no effect on the power distribution gird or the load.

The resistor 410 is an optional bleed resistor. In some embodiments, when the capacitor is disabled or otherwise disconnected by the switch (e.g., via relay 414 and/or semiconductor switch 416), the resistor 410 may potentially receive energy from the capacitor 412 thereby allowing the energy state of the capacitor 412 to decrease.

The relay 414 may be used to reduce losses when the semiconductor switch 416 is active. The semiconductor switch 416 may be used to provide precise and fast response at turn on and turn off. Those skilled in the art will appreciate that any appropriately rated relay (e.g., a tested electromechanical relay) may be used.

The triac 420 of the semiconductor switch 416 is a gate-controlled thyristor in which current is able to flow in both directions. The relay 414 and/or the triac 420 may perform as one or more switches. For example, the controller 426 may open the relay 414 and deactivate the triac 420 to create an open circuit to disconnect the capacitor 412. In various embodiments, a pair of thyristor may be used in place of the triac 420.

Those skilled in the art will appreciate that any switch may be used. For example, a switch S, such as an IGBT, thyristor pair, or thyristor/diode arrangement may also be used. In another example, a mosfet or IGBT may be used with a diode in parallel to control the capacitor 412.

Those skilled in the art will appreciate that the relay 414, the triac 420, and NTCs may work together to preserve the life of all or some of the components of the switch-controlled VAR source 400. The controller 426 may be configured to control the relay 414 and the triac 420 to switch off the circuit in a manner that avoids transients or other undesired power characteristics that may impact the lifespan of the circuit. For example, the controller 426 may ensure that the relay 414 is open (e.g., instruct the relay 414 to open if the relay 414 is closed) before instructing the triac 420 to deactivate (e.g., ½ cycle later). This process may prevent sparking or arcing across the relay 414 and, further, may preserve the life of the relay 414. In some embodiments, the triac 420 may be switched on and, after a sufficient delay, the relay 414 may be closed. The controller 426 may then instruct the relay 414 to open thereby protecting the one or more components of the circuit.

In various embodiments, the switch-controlled VAR source 400 comprises the relay 414 but not the semiconductor switch 416. In one example, the controller 426 may instruct the relay 414 to open or close thereby enabling or deactivating the capacitor 412. In other embodiments, the switch-controlled VAR source 400 comprises the semiconductor switch 416 but not the relay 414. The controller 426 may similarly control the triac 420 to enable or disable the capacitor 412.

The optional resistor 418 may be a negative temperature coefficient (NTC) resistor or thermistor. The NTC resistor 418 is a type of resistor whose resistance may vary with temperature. By controlling the NTC resistor 418, the triac 420 may be activated or deactivated without waiting for a zero voltage crossing of the AC power from the line 402 allowing insertion of the VAR source with minimal delay. For example, without the NTC resistor 418, the triac 420 may only be activated when AC voltage across it crosses zero volts. The NTC resistor 418 may be configured such that the triac 420 may be activated at any point with little or no undesirable effect (e.g., minimal or reduced inrush).

Resistors 422 and 424 may attenuate the signal from the line 402 to be received by the controller 426.

The controller 426 may be configured to determine a proximate voltage based on the voltage of line 402 and may enable or disable the capacitor 412. In various embodiments, the controller 426 is a processor such as a microprocessor and/or a Peripheral Interface Controller (PIC) microcontroller may detect voltage of the feeder 402.

In some embodiments, based on the voltage, the controller 426 may control the relay 414 and/or the triac 420 to open or close the circuit thereby enabling or disabling the capacitor 412. For example, if the voltage detected is not desirable, the controller 426 may enable the capacitor 412 by commanding the triac 420 to activate and/or the relay 414 to close. The capacitor 412 may then compensate for reactive power (e.g., regulate network voltage).

Those skilled in the art will appreciate that there may be a delay in the response of relay 414 (e.g., the relay 414 may be an electromechanical relay that is slow to react when compared to the triac 420). In this example, the command to open the relay 414 may be sent in advance of the command to deactivate the triac 420. In some embodiments, a command may be sent to turn off the relay 414. Subsequently, after a time delay, the triac 420 may be turned off.

One of the most common failure mechanisms for capacitors on the grid is overvoltage. In some embodiments, the relay 414 and triac 420 may be rapidly deactivated when overvoltage is detected thereby protecting the capacitor(s).

The controller 426 may delay activation or turn off of the switch (e.g., relay 414 and semiconductor switch 416). In various embodiments, a multitude of switch-controlled VAR sources 400 which react to voltages within a power grid. In order to prevent infighting among the switch-controlled VAR sources 400, one or more of the devices may delay enabling or disabling the VAR compensation component (e.g., capacitor 412). In various embodiments, the controller of each switch-controlled VAR source 400 includes a different delay. As a result, each switch-controlled VAR source 400 may activate the switch to regulate voltage at a different time thereby giving each device time to detect voltage changes that may result from one or more switch-controlled VAR sources 400.

Those skilled in the art will appreciate that the delay may be set during manufacture of the switch-controlled VAR source 400 or may be uploaded from a centralized communication facility. The delay may be randomly set for each different switch-controlled VAR source 400.

The power supply unit (PSU) may adapt the power to be suitable to the controller 426. In some embodiments, the controller 426 is supplied from power supplied by the line 402, batteries, or any other power source. The PSU 428 may be any power supply.

Although FIG. 4a depicts the line coupled to the resistor 422 as being on the unprotected side of the fuse 404, those skilled in the art will appreciate that the fuse 404 may protect the controller 426 and PSU 428. For example, the resistor 422 may be coupled to the line 402 via the fuse 404.

In various embodiments, the switch-controlled VAR source 400 may operate both dynamically and autonomously to regulate voltage and/or compensate for grid faults. Those skilled in the art will appreciate that the switch-controlled VAR source 400 may adjust reactive power and thus the network voltage based on detected voltage without detecting or analyzing current. In some embodiments, load current information can be derived from an additional current sensor, or from the smart meter.

In some embodiments, the switch-controlled VAR source 400 may comprise an inductor which may be used to adjust voltage. For example, one or more inductors may be in place of capacitor 412. In another example, one or more inductors may be in parallel with the capacitor 412. The inductor(s) may be coupled to the fuse 404 (or a different fuse) and may be further coupled to a separate switch. For example, the inductor(s) may be coupled to a relay in parallel with a triac (or mosfet or IGBT) which may perform switching similar to the relay 414 and the semiconductor switch 416. The controller 426 may enable the inductor and disable the capacitor 412 by enabling one switch and creating an open circuit with the other. Similarly, the controller 426 may disable the inductor and enable the capacitor 412 or, alternately, disable both. Those skilled in the art will appreciate that the triac associated with the inductor may also be coupled to an NTC resistor to allow the triac to be activated at any time.

The switch-controlled VAR source 400 may be shunt-connected to the power distribution grid. In one example, the switch-controlled VAR source 400 is coupled in shunt via conductive lines 402 and 430 at or proximate to a residence or other commercial load. A shunt connection may be the connection of components within a circuit in a manner that there are multiple paths among which the current is divided, while all the components have the same applied voltage.

In one example, a feed line may extend from a transformer to one or more loads (e.g., residences). The feeder may also be coupled with a switch-controlled VAR source 400 in shunt. In some embodiments, if the switch-controlled VAR source 400 fails or was otherwise inoperative, the delivery of power by the power distribution grid is not interrupted because of the shunt connection (e.g., even if the connection to the switch-controlled VAR source 400 became an open circuit, there may be no interruption of power between the transformer and the one or more loads along the feed line).

In various embodiments, the switch-controlled VAR source 400 may be collocated inside or with a utility meter (e.g., smart meter), so that installation can be piggybacked, saving the utility in total installation and reading costs. The switch-controlled VAR source 400 may leverage a communication link inside a smart meter to communicate with the utility, take VAR dispatch or voltage set-point commands, and/or inform the utility of malfunction. Multiple switch-controlled VAR sources 400 may be collocated in a common housing and can be mounted on another grid asset, such as a pole-top or pad-mount transformer. This may allow lower cost VAR compensation, reduce the cost of a communication link, and allow additional value to be derived, such as assessing status and life expectancy of the asset.

In various embodiments, a plurality of switch-controlled VAR sources may each comprise a communication module. A communication module is any hardware configured to communicate wirelessly or by wire with one or more digital devices or other shunt-connected, switch-controlled VAR sources. The communication module may comprise a modem and/or an antenna.

One or more of the switch-controlled VAR sources may receive one or more set points with which to compare against voltage to assist in the determination to engage the VAR compensation component. A set point may be a predetermined value to improve voltage regulation. The processor of switch-controlled VAR source may determine whether to adjust voltage based on the comparison of the proximate voltage to the set points. Those skilled in the art will appreciate that the set points may be different for different switch-controlled VAR sources.

For example, the switch-controlled VAR source may compare detected voltage of a feeder (e.g., proximate voltage) to one or more set points to make the determination of whether to activate the capacitor based on the comparison. For example, if the detected voltage is lower than a previously received set point, the switch-controlled VAR source may enable the capacitor to increase voltage. Alternately, if the voltage is higher than a previously received set point, the switch-controlled VAR source may disable an otherwise active capacitor in order to reduce voltage.

In some embodiments, a communication facility may dispatch and/or update one or more set points. The switch-controlled VAR sources may communicate via a cellular network, power line carrier network (e.g., via the power grid), wirelessly, via near-field communications technology, or the like. The communication facility may update set points of any number of switch-controlled VAR sources at any rate or speed. For example, the communication facility may update set points based on changes to the grid, power usage, or any other factors.

In some embodiments, one or more of the switch-controlled VAR sources may both receive and provide information. For example, one or more of the switch-controlled VAR sources may provide VARs provided, device status, voltage information, current information, harmonic information, and/or any other information to one or more communications facilities (e.g., digital devices).

The information detected, received, or otherwise processed by one or more of the switch-controlled VAR sources may be tracked and assessed. For example, voltage and/or other power information may be tracked by the VAR source or a centralized facility to determine usage rates and identify inconsistent usage. The energy usage at an aggregation point, such as at a transformer where the VAR source is located, may be compared with usage recorded by all the meters connected downstream to identify potential energy theft. A history of expected usage may be developed and compared to updated information to identify changes that may indicate theft, failure of one or more grid components, or deteriorating equipment. In some embodiments, one or more switch-controlled VAR sources may provide information to monitor aging equipment. When changes to voltage or other information indicates deterioration or degradation, changes, updates, or maintenance may be planned and executed in advance of failure.

Those skilled in the art will appreciate that the controller of the switch-controlled VAR source may enable or disable an inductor. In some embodiments, as discussed herein, the switch-controlled VAR source may comprise an inductor and a capacitor in parallel. In some examples, based on the comparison of the detected voltage to one or more received set points, the controller of the shunt-connected, switch-controlled VAR source may enable or disable the inductor and the capacitor independently.

In various embodiments, a resistor and/or an NTC may be in series with the relay 414 which may further protect the circuit and/or extend the life of the relay 414. For example, a second NTC in series with the relay may prevent current inrush. As a result, the second NTC may prevent contact erosion and life degradation for the relay.

Figure 4B:
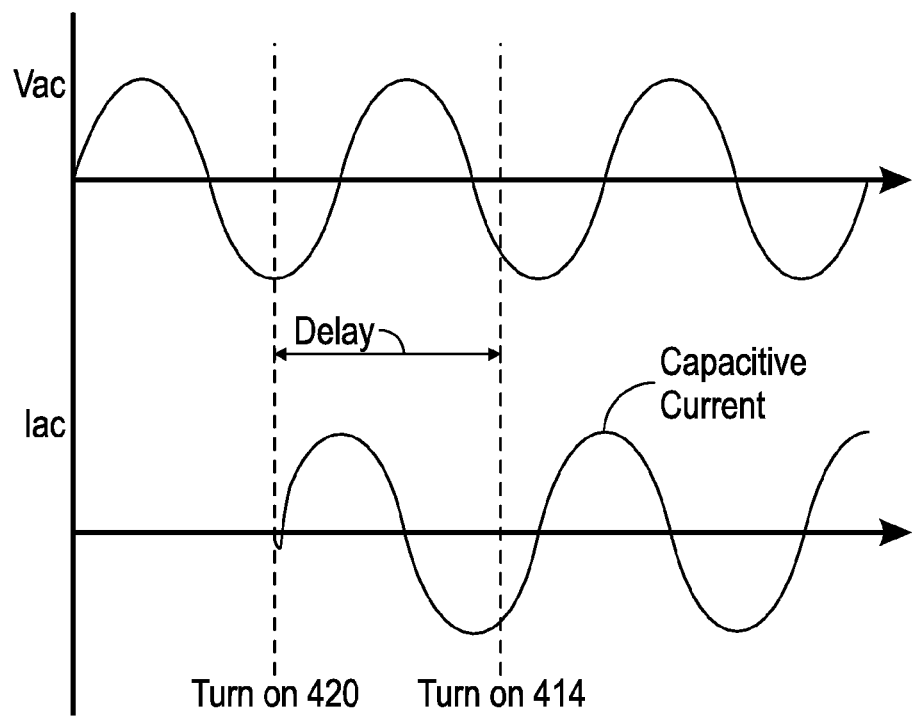
FIG. 4b is a graph that depicts activating the semiconductor switch relative to the relay to engage VAR compensation in some embodiments.

FIG. 4b is a graph that depicts activating the semiconductor switch relative to the relay to engage VAR compensation in some embodiments. As discussed herein, when activating the switch-controlled VAR source 400, the controller 426 may be configured to activate the triac 420 prior to activating the relay 414. In some embodiments, the controller 426 may activate the relay 414 following a predetermined delay. The delay may be any delay. In one example, the controller 426 may receive a predetermined delay (e.g., as software or firmware) during calibration or installation either before or after manufacture of the switch-controlled VAR source 400.

As depicted in FIG. 4b, the triac 420 may be activated at any time. Triac 420 turn-on may cause current to flow through the capacitor 412, and the NTC 418 limits the current value to a safe and/or desirable level. If the NTC 418 is warm, a condition that may be determined by the controller 426, turn on of the triac 420 may be initiated at the time when voltage across it is nearly zero. This would prevent a potentially damaging current inrush event. After a delay which may be, for example, approximately a cycle, the relay 414 may be closed. As discussed herein, a second NTC in series with the relay may prevent current inrush, thus preventing contact erosion and life degradation for the relay. Those skilled in the art will appreciate that, with the NTC resistor 418, the triac 420 may be activated at any time. Further, the relay 414 may be closed at any time after the triac 420 is active (i.e., the delay may be any length of time).

Figure 4C:
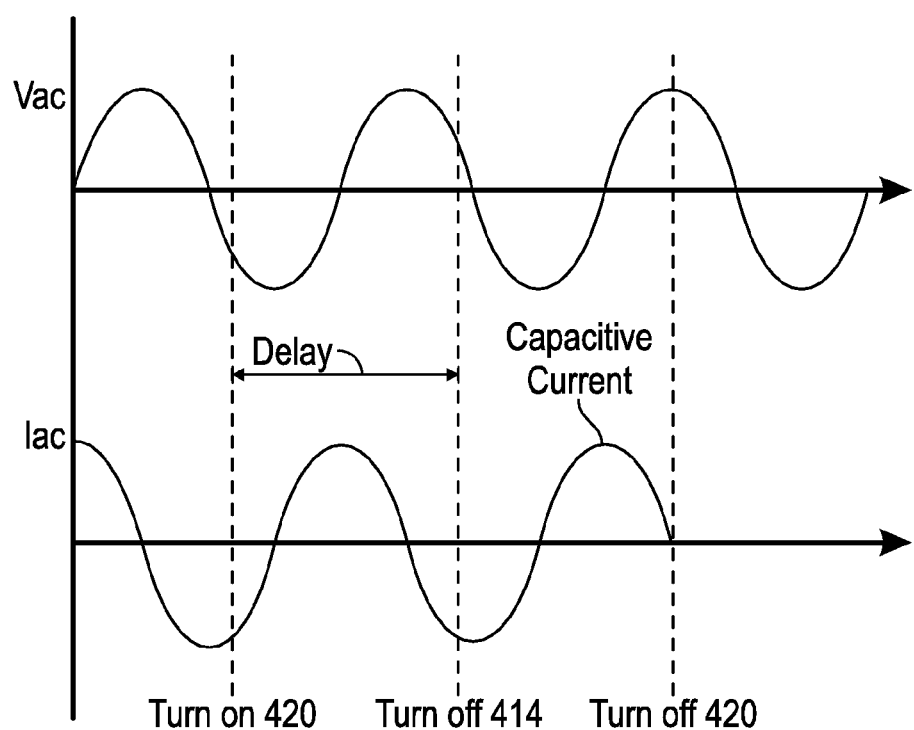
FIG. 4c is a graph that depicts deactivating the semiconductor switch relative to the relay to disengage VAR compensation in some embodiments.

FIG. 4c is a graph that depicts deactivating the semiconductor switch relative to the relay 414 to disengage VAR compensation in some embodiments. As discussed herein, when deactivating the switch-controlled VAR source 400, the controller 426 may be configured to ensure that the relay 420 is closed prior to deactivating the triac 420. The controller 426 may subsequently deactivate (open) the relay 420. In some embodiments, the controller 426 may deactivate the relay triac 414 following a predetermined delay. The delay may be any delay which may be software or firmware received during calibration or installation.

As depicted in FIG. 4c, the relay 420 may be closed at any time. In some embodiments, the controller 426 confirms that the relay 420 is closed. If the relay 420 is open, the controller 426 may control the relay 420 to close. After a delay (e.g., after approximately a cycle or any time), the controller 426 may deactivate the triac 420. Those skilled in the art will appreciate that the triac 420 may be deactivated at any point. The controller 426 may control the relay 414 open after the triac 420 is deactivated. In some embodiments, the controller 426 controls the relay 414 to open after a predetermined delay. The delay may be equal or not equal to the delay between closing the relay and deactivating the triac 414.

Figure 5A:
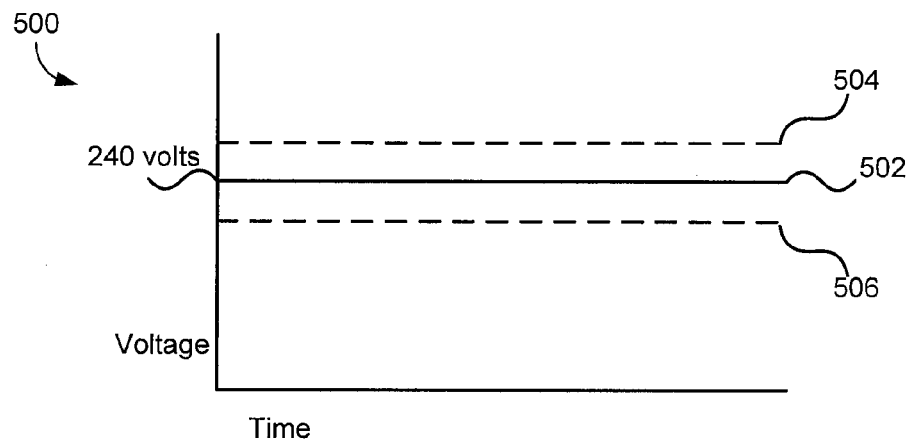
FIGS. 5a and 5b are graphs that depict a desired voltage range in relation to set points in some embodiments.
Figure 5B:
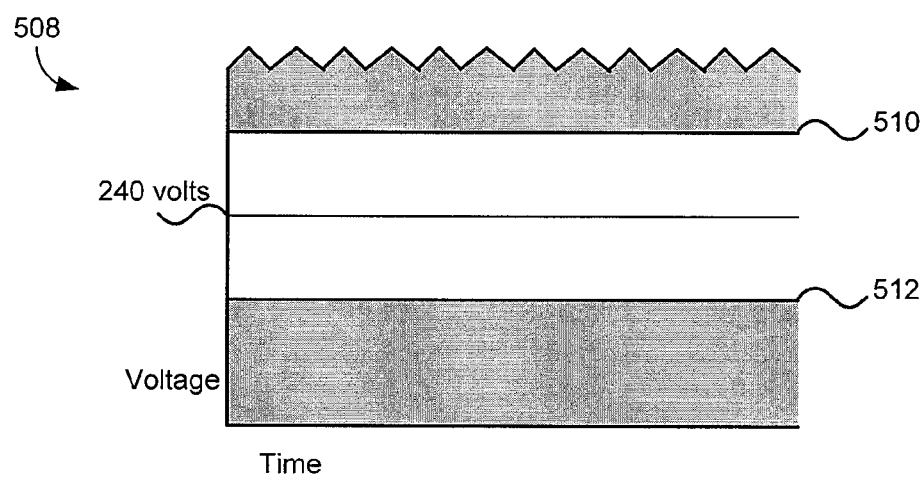

FIGS. 5a and 5b are graphs 500 and 508 that depict a desired voltage range in relation to set points in some embodiments. In various embodiments, a switch-controlled VAR source may comprise a single set point 502 (e.g., 240 volts). The switch-controlled VAR source may be configured to adjust voltage (e.g., through controlling the VAR compensation component) by comparing the detected voltage to the set point 502. Threshold 504 and 506 may identify an allowed voltage range (e.g., +/−2 volts) before the switch-controlled VAR source may enable or disable the VAR compensation component.

Those skilled in the art will appreciate that the thresholds 504 and 506 may be equal or unequal. Further, the thresholds 504 and 506 may be change over time (e.g., through an algorithm that changes based on time of day, season, temperature, voltage, current, rate of change in detected voltage, or the like).

FIG. 5b is a graph depicting voltage over time and identifying set points 510 and 512 in some embodiments. Set points 510 and 512 bracket the desired "ideal" voltage (e.g., 240 volts). In various embodiments, a switch-controlled VAR source may detect a proximate voltage and compare the detected voltage to set points 510 and 512. If the voltage is higher than set point 510 or lower than set point 512, the switch-controlled VAR source may enable/disable a VAR compensation component or otherwise regulate the voltage to make corrections. Although the impact of one switch-controlled VAR source may not change the network voltage significantly, multiple VAR sources operating autonomously to change the network voltage may regulate the voltage over multiple points. As such, a limited change by many devices may create significant efficiencies and improvements in distribution with limited additional cost.

In various embodiments, one or more of the switch-controlled VAR sources do not have communication modules but rather may comprise set points previously configured at manufacture. In other embodiments, one or more of the switch-controlled VAR sources comprise communication modules and, as a result, set points may be altered or updated by other switch-controlled VAR sources or one or more central communication and control facilities.

In some embodiments, one or more of the switch-controlled VAR source may comprise regulation profiles. A regulation profile may comprise a policy that changes one or more set points based on time, proximate conditions, or usage in order to improve conservation. If usage is likely to spike (e.g., based on heat of the day, business loads, residential loads, or proximity to electric car charging facilities), a regulation profile may adjust the set points accordingly. As a result, set points may be changed depending upon sensed usage, voltage changes, time of day, time of year, outside temperature, community needs, or any other criteria.

Those skilled in the art will appreciate that one or more of the switch-controlled VAR sources may receive regulation profiles at any time over the communications modules. In some embodiments, one or more of the switch-controlled VAR sources may not comprise a communication module but may still comprise one or more regulation profiles which may have been previously configured.

Figure 6:
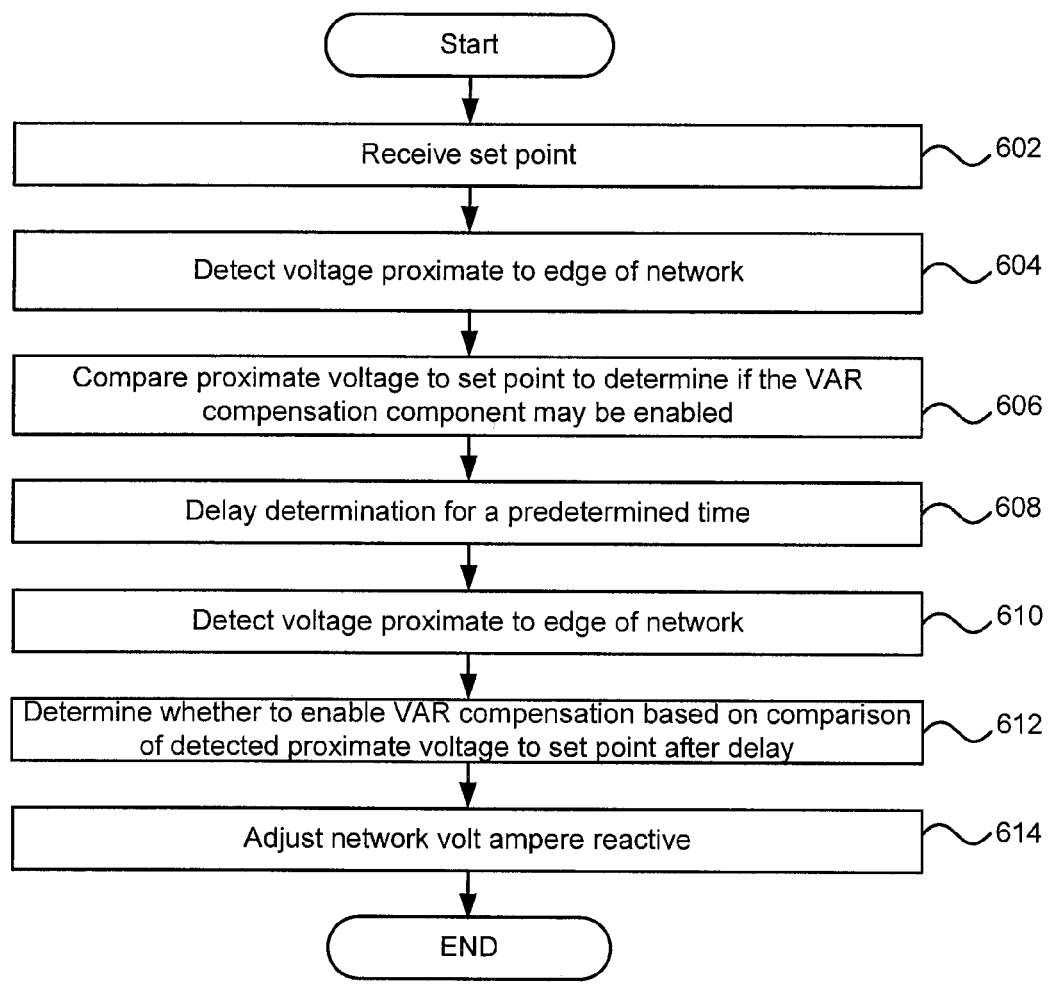
FIG. 6 is a flow chart for voltage regulation by a switch-controlled VAR source in some embodiments.

FIG. 6 is a flow chart for voltage regulation by a switch-controlled VAR source in some embodiments. In step 602, the switch-controlled VAR source may receive a first set point. In some embodiments, the switch-controlled VAR source comprises a communication module that may receive the set point from a digital device (e.g., wirelessly or through a communication module of a smart meter), from another shunt-connected, switch-controlled VAR source (e.g., through near field communication), power line carrier communication, or the like. The set point may activate the switch-controlled VAR source to enable VAR compensation or, in some embodiments, the set point may be a voltage set point which may be compared to a detected proximate voltage.

In some embodiments, the utility may include a VAR source server or other device configured to communicate with different VAR sources (e.g., via WiFi, cellular communication, near field communication, wired, or power line carrier). In various embodiments, the VAR source server may communicate with one or more other servers to communicate with the VAR sources. For example, the VAR source server may communicate through smart meters or servers that communicate with smart meters. One or more smart meter may comprise a VAR source or otherwise communicate with one or more VAR sources.

The first set point (e.g., a voltage set point) may be a part of a regulation profile. In one example, a plurality of regulation profiles may be received by the switch-controlled VAR source either during manufacture or through a communication module. Each regulation profile may comprise one or more different set points to improve power distribution and/or efficiency based on a variety of factors (e.g., time of day, history of usage, type of load, green energy production, and the like). In various embodiments, the processor of the switch-controlled VAR source may switch regulation profiles based on detected voltage, rate of change of voltage, communication with other switch-controlled VAR sources, communication with a VAR source server, temperature, time of day, changes to the grid or the like. Once implemented from the regulation profile, the processor of a switch-controlled VAR source will continue to detect proximate voltage and compare the voltage to the new set point(s) in order to determine whether a VAR compensation component should be enabled or disabled.

In step 604, the controller 426 (i.e., processor) detects proximate voltage at the edge of the network (e.g., near a load of the power grid). Proximate voltage is the voltage received from line 402 (e.g., the voltage at the point the line 402 is coupled to a feeder line or grid asset. The proximate voltage may be the voltage of where the shunt-connected, switch-controlled VAR source 400 is coupled in the power distribution grid at the time of voltage detection.

In some embodiments, the switch-controlled VAR source may detect voltage through another switch-controlled VAR source or a grid asset. In some embodiments, a smart meter, transformer, or other power device may detect voltage. The switch-controlled VAR source may receive the detected voltage from the other device or intercept the detected voltage at or during transmission.

In step 606, the controller 426 may compare the detected proximate voltage to any number of set points to determine if the VAR compensation component may be enabled or disabled. As discussed herein, the controller 426 may control a switch (e.g., relay and/or semiconductor switch) to enable or disable one or more capacitors and/or one or more inductors based on the comparison. Those skilled in the art will appreciate that the determination to enable or disable the VAR compensation component may be made by the processor of the switch-controlled VAR source as opposed to a centralized facility. The determination may be made autonomously and independent of other switch-controlled VAR sources. Achieving an overall control objective may be achieved with the concurrent operation of other similar VAR sources.

Through the operation of any number of switch-controlled VAR sources operating to regulate voltage within the desired range, voltage regulation of the network may be achieved. Further, the voltage range may be controlled within a desired narrow range, and may further be capable of dynamically responding to changes along one or more distribution lines and/or feeders.

In step 608, the controller 426 may delay switching the VAR compensation component for a predetermined time. As discussed herein, in order to avoid infighting between any number of switch-controlled VAR sources, one or more of the switch-controlled VAR sources may delay switching for a predetermined time. The time of delay may be different for different switch-controlled VAR source. For example, even if a first switch-controlled VAR source detects the need to regulate voltage, the first switch-controlled VAR source may wait until after a second switch-controlled VAR source has made a similar determination and enabled VAR compensation. The first switch-controlled VAR source may detect the change in the network and make another determination whether to further enable additional VAR compensation. As a result, multiple switch-controlled VAR source may not constantly correct and re-correct changes in network voltage caused by other switch-controlled VAR sources.

The delay time may be updated by the VAR source server, other switch-controlled VAR sources, or be a part of the regulation profile (e.g., which may comprise multiple different delay times depending on the need). In some embodiments, if detected voltage is changing at a substantial rate, the delay time may be accelerated. Those skilled in the art will appreciate that there may be many different ways to provide, update, and/or alter the delay time of a switch-controlled VAR source.

In step 610, after detecting and determining a need to change the network voltage and waiting the delay time, the switch-controlled VAR source may again detect any changes to the voltage and compare the change against one or more of the set points. If there remains a decision in step 612 that is consistent with the previous determination in step 606 (e.g., that the VAR compensation component should be enabled or disabled), then the switch-controlled VAR source may adjust the network voltage by engaging a switch to enable or disable the VAR compensation component.

In one example, if the proximate voltage is above a first set point, the controller 426 may control the relay 414 and the triac 420 to either form the connection to the line 402 or to confirm that the relay 414 is closed and/or the triac 420 is enabled. If the proximate voltage is below the second set point, the controller 426 may control the relay 414 and the triac 420 to either open the connection to the line 402 or to confirm that the relay 414 is open and/or the triac 420 is disabled.

In some embodiments, each of the plurality of shunt-connected, switch-controlled VAR sources may increase leading volt-ampere reactive if the set point is higher than the detected proximate voltage and decrease leading volt-ampere reactive if the set point is lower than the detected proximate voltage.

In some embodiments, the controller 426 may enable or disable an inductor based on the comparison of the detected proximate voltage to the set points. For example, based on the comparison, the controller 426 may disable the capacitor and enable an inductor (e.g., the controller 426 may control the relay 414 the triac 520 to create an open circuit to disable the capacitor while controlling another relay and another triac to enable the inductor to regulate voltage).

In various embodiments, voltage may be tracked over time. In some embodiments, the controller 426 may track the detected proximate voltage over time and provide the information to another switch-controlled VAR source and/or a digital device. For example, one switch-controlled VAR source may be in communication with any number of other switch-controlled VAR source (e.g., in a pole top enclosure). The one or more switch-controlled VAR sources may be a part of any grid asset such as a substation or transformer.

In some embodiments, the tracked detected voltage may be assessed and/or compared to a voltage history. The voltage history may be a history of past usage or may indicate an expected usage. In various embodiments, the controller 426 or a digital device may detect a failing grid asset based on the comparison. For example, the expected output and/or input of a grid asset may be determined and compared to the tracked detected proximate voltage. If the currently detected proximate voltage and/or tracked detected proximate voltage are not within the expected range, the tracked detected proximate voltage may be reviewed to determine if a grid asset has failed or is deteriorating. As a result, deteriorating equipment that may need to be replaced or receive maintenance may be identified and budgeted before performance significantly suffers thereby improving efficiency in both power delivery and upkeep of the distribution power grid.

Those skilled in the art will appreciate that potential theft may be identified. In various embodiments, each switch-controlled VAR source may detect and track voltage. The tracked voltage may be logged and/or provided to a VAR source server (e.g., via the communication module or antenna of another digital device such as a smart meter). The VAR source server may, for example, track voltage identified by all of the switch-controlled VAR sources along a feeder line and compare the voltage to consumption as tracked by the utility (e.g., via smart meters). Based on the comparison, theft may be detected. Further, based in part on the effect of any number of switch-controlled VAR sources, the theft may be localized for further investigation.

As suggested herein, massively distributed dynamically controllable VAR source strategy leverages other costs that a public utility is already bearing. For example, a switch-controlled VAR source may be located inside a smart meter or may be co-located with a smart meter so that the installation can proceed concurrently with meter installation or reading/servicing. These meters sense voltage and current to calculate the power consumption of the load, and have communications to relay the information to a central data repository. The cost of installing these is already built into the meter cost.

A simple communication mechanism with the meter may allow communication between the meter and the switch-controlled VAR source (e.g., for reporting to the utility on status, receiving set points, receiving delay times, and/or for taking commands to activate). In some embodiments, the load current measurement inside the smart meter may be communicated to the switch-controlled VAR source for use in the determination for voltage regulation.

In various embodiments, a meter switch-controlled VAR source may be very compact and ultra low-cost. In some embodiments, a typical rating may be 500 VARs at 240 volts, corresponding to 2.1 Amperes of capacitive current. This may be approximately the VAR drop across the leakage impedance of a 5% impedance transformer supplying 10 kW to a customer. Utility networks and asset loading calculations may be done on a statistical basis, assuming a load diversity factor. If all the meters (e.g., 10,000) on a distribution circuit have switch-controlled VAR sources, then there may be 5 MVARs of dynamically controllable VARs on that line, deployed on a per phase basis. Raising the compensation per switch-controlled VAR source to 1000 VARs, for example, may only raise cost marginally, but may provide 10 MVARs of dynamic VAR compensation.

In various embodiments, the switch-controlled VAR source may be integrated into or be alongside any utility asset, such as a pole-mount transformer or lighting pole. As discussed herein, communication capability is not a requirement for switch-controlled VAR source operation, but may augment the ability to take dispatch instructions and to communicate status to the utility. A possible implementation would be to bundle multiple switch-controlled VAR sources into a common housing and locating the bundle within or proximate to a transformer supplying multiple residential or commercial loads. The bundle may be connected to the transformer on the low-voltage side thereby minimizing or reducing requirements for BIL management on the switch-controlled VAR sources.

Those skilled in the art will appreciate that the bundling may allow integration of a single communication module with multiple switch-controlled VAR sources, thereby allowing greater cost savings. This class of device may be measured in cost as a ratio of the dollars of cost of the actual device to the kiloVARs delivered ($/kVAR). This bundling may also allow the use of a single power supply and controller and provide reliable information on the switching behavior of the different switch-controlled VAR source.

In a bundled unit, it may be possible to minimize or reduce impact of harmonics on the grid. This implementation may maintain the basic features of the single user units, however, the bundle may provide more value to utility customers by integrating current and temperature measurement into the unit, using transformer loading and temperature excursions to calculate impact on transformer life, and/or communicating transformer status to the utilities. The bundled switch-controlled VAR source implementation, particularly when located in close proximity to pole-top or pad-mount transformers as conventionally used in the utility industry, may offer high value to the utility by performing a function of dynamic volt-VAR optimization, and in addition, serving as an asset monitor for the millions of transformers located on the distribution network.

In various embodiments, in order to avoid multiple switch-controlled VAR sources from adjusting and readjusting the reactive power based on changes perceived by other switch-controlled VAR sources, one or more controllers may activate or deactivate different switch-controlled VAR source based on a different detected voltage. For example, different switch-controlled VAR sources may activate and/or deactivate based on different set points. The different set points may be provided by one or more remote digital devices. In some embodiments, one or more switch-controlled VAR sources may adjust set points (e.g., alter the set point by a randomly determined amount) to establish a different set point.

The switch-controlled VAR source may perform reactive power compensation based only on measured line voltage, and not load or line current. In such an embodiment, the switch-controlled VAR source may not perform power factor correction. In another embodiment, one may also look at the line current and voltage to assess the level of VAR correction required and may operate to bring customer load power factor to unity. Power factor correction may not manage reactive power for grid voltage regulation. In some embodiments, a current sensor on the medium voltage line can provide information to correct for the power factor on the primary medium voltage line, thus reducing overall system losses. Those skilled in the art will appreciate that power factor correction is often used to reduce penalties, and may reduce energy supplied by the utility to some extent (if loads have a significant lagging power factor). In other embodiments, the switch-controlled VAR source may detect current (e.g., via a meter, grid asset, or assessment by the controller 524) and perform power factor correction in addition to voltage regulation using a weighting algorithm. The multiplicity of VAR sources used may allow for simultaneous optimization of several objectives such as voltage regulation, as well as load and line power factor.

Figure 7:
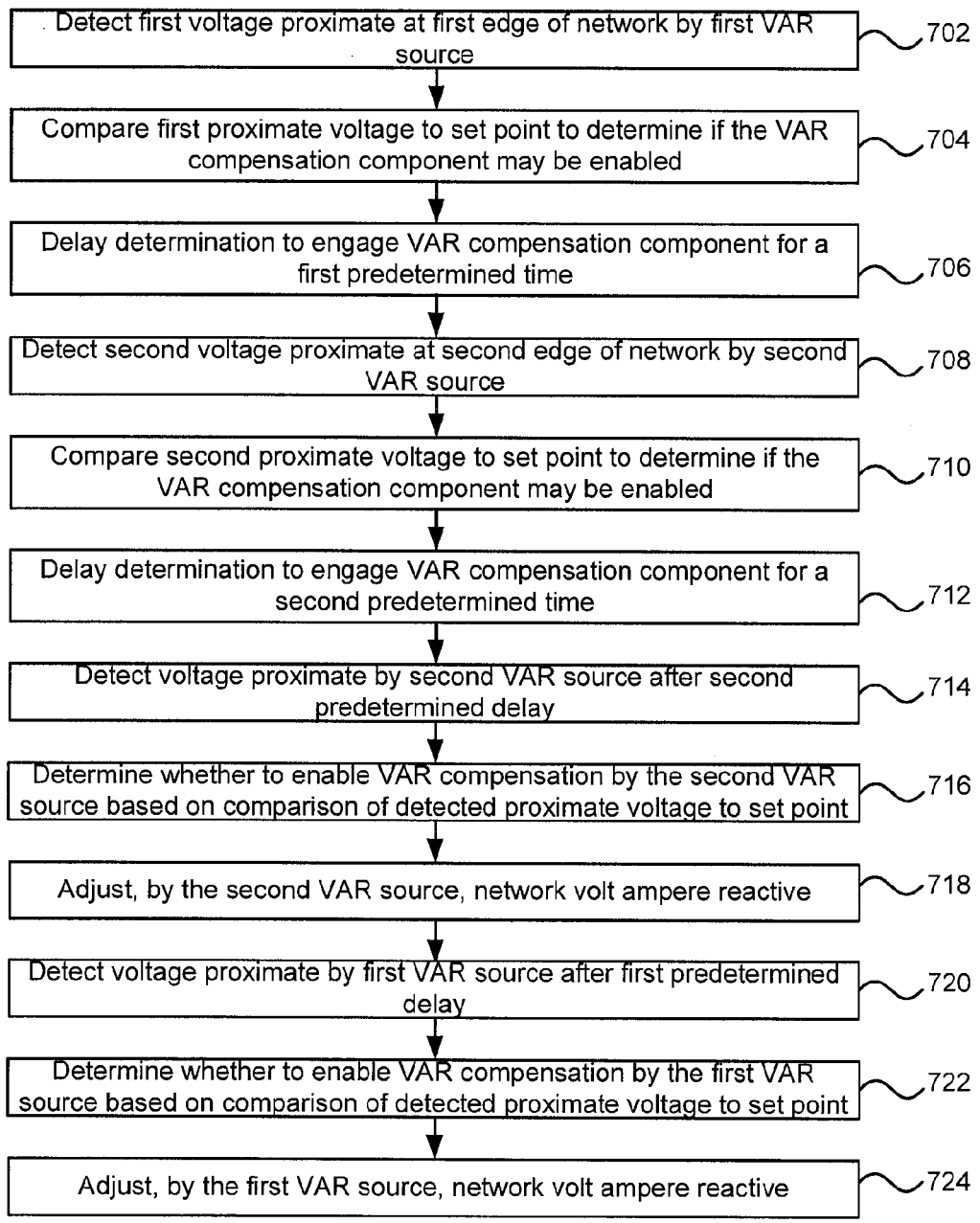
FIG. 7 is a time sequence of events of network regulation with two switch-controlled VAR sources in some embodiments.

FIG. 7 is a time sequence of events of network regulation with two switch-controlled VAR sources in some embodiments. In various embodiments, the first and second switch-controlled VAR sources may be proximate to each other (e.g., coupled to the same or related feeder line). Changes to voltage caused by one switch-controlled VAR source may be detected and reacted to by the other switch-controlled VAR source. As a result, to avoid infighting (e.g., constant correcting and re-correcting voltage in view of other switch-controlled VAR source actions), the switching process for one or more of the switch-controlled VAR sources may be delayed by a different delay time. As a result, even if the first switch-controlled VAR source originally determined to enable the VAR compensation component based on the detected voltage, the first switch-controlled VAR source may wait the delay time thereby giving the second switch-controlled VAR source an opportunity to correct voltage. If the action of the second switch-controlled VAR source was sufficient, then the first switch-controlled VAR source may detect the change and not perform any switching action.

In step 702, the first switch-controlled VAR source detects a first voltage proximate to a first edge of the network. In some embodiments, the first switch-controlled VAR source detects a voltage at a particular load on the low power side of a transformer. In step 704, the first switch-controlled VAR source may compare the first proximate voltage to a set point to determine if the VAR compensation component of the first switch-controlled VAR source should be enabled. In step 706, the switch-controlled VAR source may delay switching to engage the VAR compensation component for a first predetermined time (i.e., for a first delay).

In step 708, the second switch-controlled VAR source detects a second voltage proximate to a second edge of the network. In some embodiments, the second switch-controlled VAR source detects a voltage at a particular load on the low power side of a transformer. In one example, both the first and second switch-controlled VAR source may be coupled to the same feeder line and/or on the same side of the same transformer. In step 710, the second switch-controlled VAR source may compare the second proximate voltage to a set point to determine if the VAR compensation component of the second switch-controlled VAR source should be enabled. In step 712, the switch-controlled VAR source may delay switching to engage the VAR compensation component for a second predetermined time (i.e., for a second delay).

The first and second delay may be for different periods of time. As a result, each switch-controlled VAR source may delay acting on the comparison of the detected proximate voltage to one or more set points until other switch-controlled VAR sources have had an opportunity to correct voltage of the network. If, after the predetermined time, the initial determination is still necessary (e.g., the proximate voltage has remained unchanged or still outside of the set point(s) after expiration of the delay time), then a switch-controlled VAR source may control a switch to engage or disengage the VAR compensation component.

In various embodiments, delays may be used to avoid infighting between two or more switch-controlled VAR sources. The delays may be updated and/or communicated by another digital device (e.g., wirelessly, over power line carrier, or via a smart meter).

As discussed herein, the delay time may be altered based on conditions of the power network. For example, if the rate of change of voltage, current, or any power characteristic is significant, the delay time may be shortened or extended. In some embodiments, there are different delay times for different switch-controlled VAR sources, however, all of the delay times may be changed in the similar manner (e.g., shortened or extended) under similar conditions.

In step 714, the second switch-controlled VAR source detects proximate voltage after the second delay time (e.g., after the second predetermined delay). In various embodiments, the switch-controlled VAR sources detect proximate voltage at predetermined times or continuously. Once the delay is expired, the controller of the second switch-controlled VAR source may retrieve the last detected voltage or detect voltage of the line. In step 716, the second switch-controlled VAR source determines whether to enable VAR compensation based on comparison of the last detected proximate voltage to one or more set points.

In step 718, if, based on the comparison, the second switch-controlled VAR source determines to enable the VAR compensation component, the second switch-controlled VAR source may adjust the network voltage (e.g., by regulating VAR).

In various embodiments, the first switch-controlled VAR source may continue the delay before switching the related VAR compensation component. The first switch-controlled VAR source may detect a change in voltage caused by the action of the second switch-controlled VAR source. If, after the first delay, the newly detected proximate voltage is still outside a range established by one or more set points, the first switch-controlled VAR source may engage the VAR compensation component. If, however, after the delay, the action of the second switch-controlled VAR source improves network voltage (e.g., the newly detected voltage is within a range of the one or more set points), the first switch-controlled VAR source may not take further action.

In step 720, the first switch-controlled VAR source detects proximate voltage after the first delay time (e.g., after the first predetermined delay). In one example, once the delay is expired, the controller of the first switch-controlled VAR source may retrieve the last detected voltage or detect voltage of the line. In step 722, the first switch-controlled VAR source determines whether to enable VAR compensation based on comparison of the last detected proximate voltage to one or more set points.

In step 724, if, based on the comparison, the first switch-controlled VAR source determines to enable the VAR compensation component, the first switch-controlled VAR source may adjust the network voltage (e.g., by regulating VAR).

Those skilled in the art will appreciate that the voltage set points may be preconfigured. In some embodiments, one or both switch-controlled VAR sources may comprise communication module(s) configured to receive set point(s). In one example, a switch-controlled VAR source may receive new set points that may replace or supplement previously received and/or pre-existing set points.

Although only two switch-controlled VAR sources are discussed regarding FIG. 7, those skilled in the art will appreciate that there may be any number of switch-controlled VAR sources working to adjust the network volt ampere reactive (e.g., each may have different delays to prevent infighting).

Figure 8:
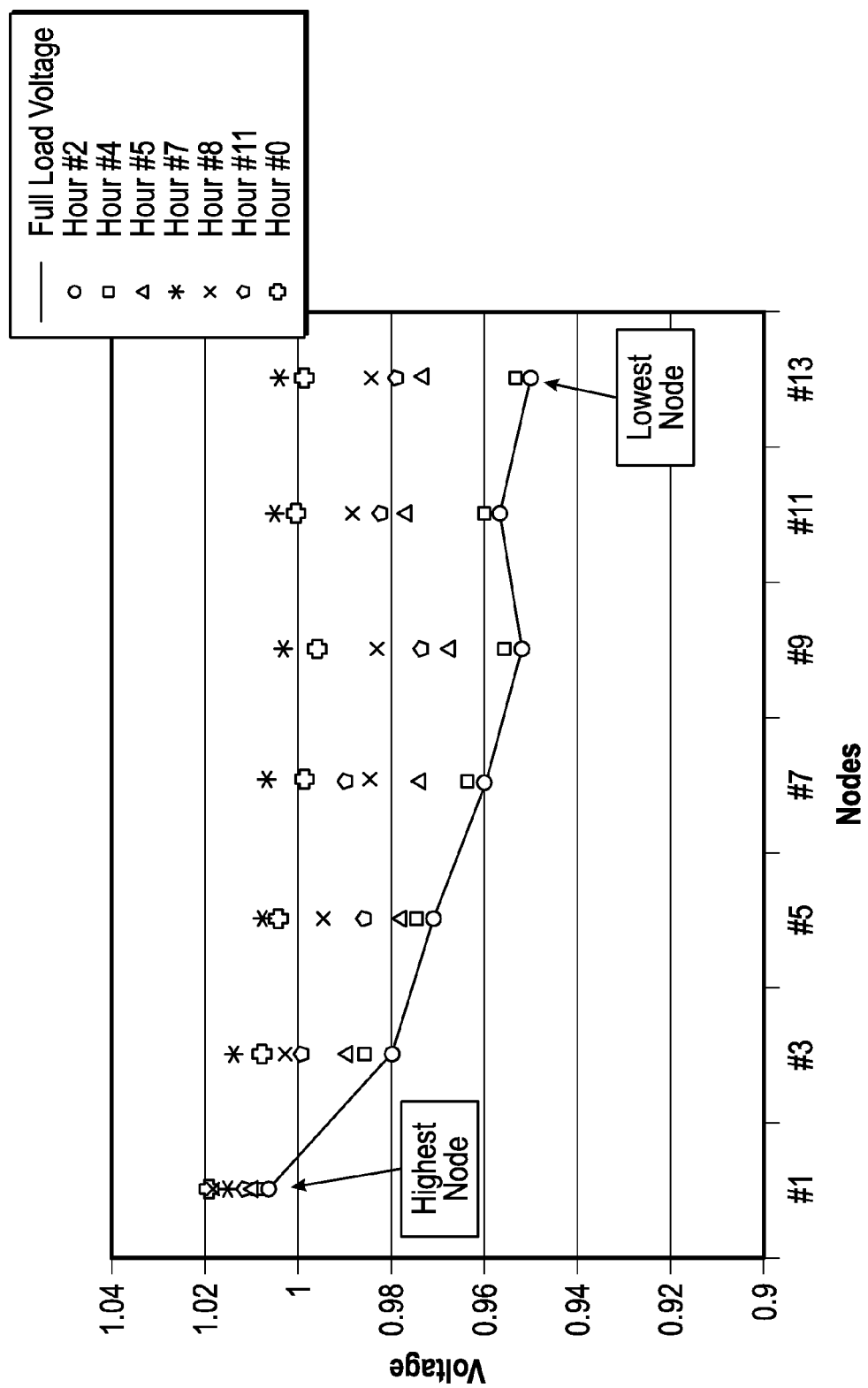
FIG. 8 is a graph that depicts a typical voltage profile at various nodes in the prior art.

FIG. 8 is a graph that depicts a typical voltage profile at various nodes in the prior art. Colored dots represent various times of the day. With the prior art's approaches, a VVO or CVR solution is limited by the highest and lowest voltage nodes.

Figure 9:
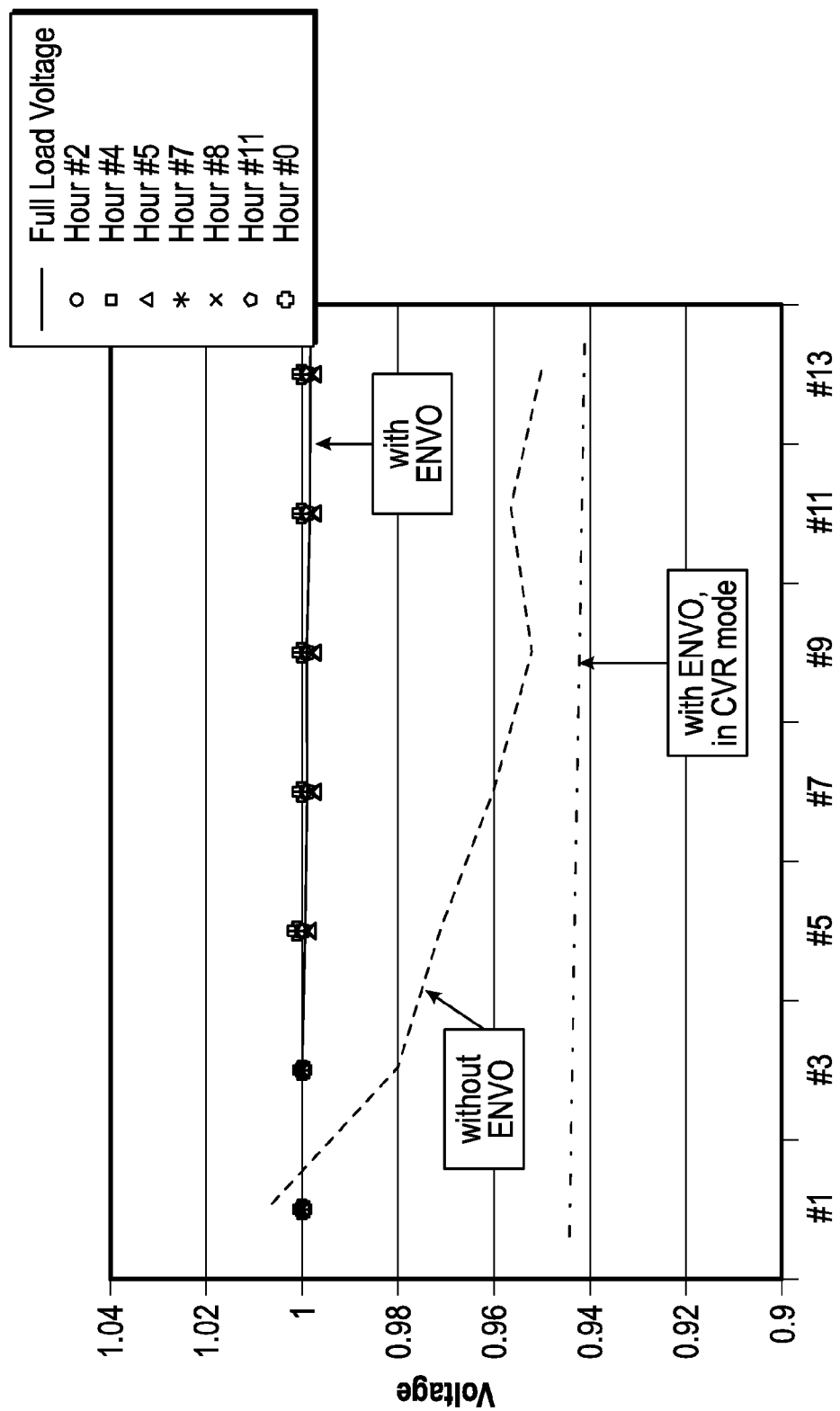
FIG. 9 is a graph that depicts relatively flat voltage profile at various nodes in some embodiments realized with 240 switch controlled VAR sources operating to regulate the voltage along the edge of the distribution feeder.

FIG. 9 is a graph that depicts relatively flat voltage profile at various nodes in some embodiments realized with 240 switch controlled VAR sources operating to regulate the voltage along the edge of the distribution feeder. Edge of Network Voltage Optimization (ENVO) as discussed herein may be achieved through dynamic, autonomous actions of multiple switch-controlled, VAR sources at or near the edge of the network. The switch-controlled, VAR sources may react automatically and autonomously (e.g., independent switching to enable or disable a VAR compensation component) to varying levels of loading on the feeder, maintaining the edge of network voltage all along the feeder within a tight regulation band.

This regulation may be maintained automatically even as heavily loaded regions shift randomly and stochastically over the design range for the feeder. In some embodiments, what results is a remarkably flat voltage profile across all measured edge of network points which is unprecedented under current technology. The graph shows voltage with ENVO that is relatively flat, voltage without ENVO that drops significantly, and a relatively flat voltage utilizing ENVO in CVR mode. The voltage spread is seen to reduce from +1/−5% without compensation to +/−1% with ENVO when operated with the same feeder and the same load.

Figure 10:
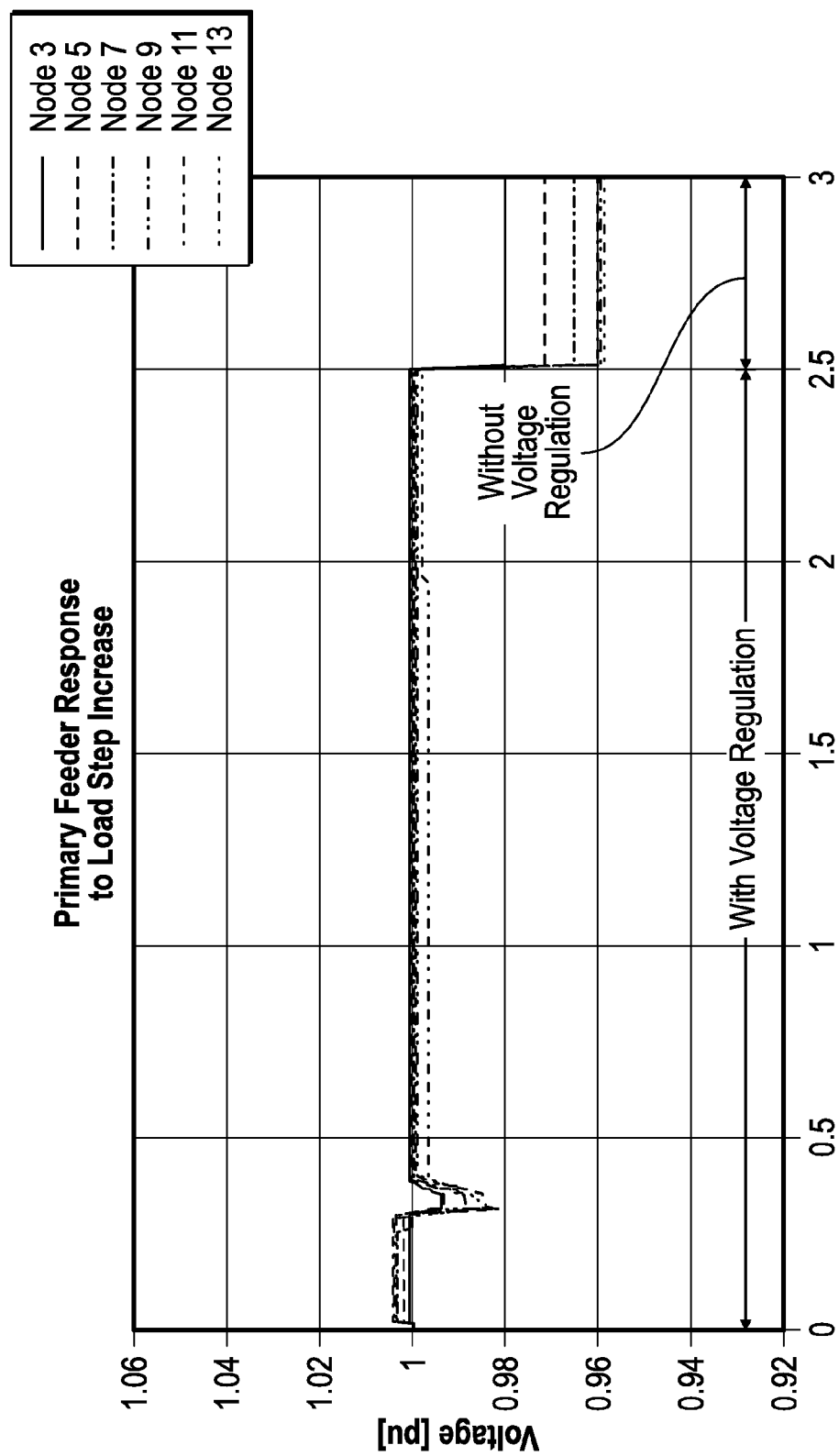
FIG. 10 is a graph that depicts a dynamic response of the ENVO system to line voltage changes (which can be caused by solar PV plants), as well as to step changes in line loading in some embodiments.

FIG. 10 is a graph that depicts a dynamic response of the ENVO system to line voltage changes (which can be caused by solar PV plants), as well as to step changes in line loading in some embodiments. In both cases, the voltage across the entire line is seen to quickly stabilize, demonstrating the high speed response. It may be noted that the initial changes to the lines beginning at time 0 and the changes to the lines after time 2.5 are a part of the set up and deactivation of a simulation.

FIG. 10 shows the ability to implement CVR with ENVO compensation, realizing a flat and reduced voltage profile along the length of the feeder. Coordinating with an LTC at the substation, it is seen that the edge of network voltage may be reduced by 3-6% (e.g., 4%) giving a reduction of 3.2% of energy consumed under a typical CVR factor of 0.8. This level of performance is simply not possible with conventional VVC or VVO solutions in the prior art.

The ENVO system operation may not be generally impacted by network configuration or by direction of power flows (e.g., from sporadic green energy generation), as are other VVO methods that rely on concentrated positions of devices that may work for one configuration but not another. As a result, network reconfiguration due to Fault Detection Isolation and Restoration (FDIR) schemes may not negatively impact the ENVO. Further, operation of tap changers may be simplified, as can the implementation of CVR functionality due to the increased control of the edge of network voltage profile. Moreover, the ENVO system sources may respond rapidly (e.g., within or much less than a cycle such as equal or less than 16.6 ms), to system faults helping to avert cascading failures such as Fault Induced Delayed Voltage Recovery or FIDVR events.

While no communication is required to achieve a flatter voltage profile along the entire length of the line, in various embodiments, inexpensive slow-speed variable-latency communications may allow advanced functions such as VVO and CVR (e.g., through set points), without the complexity of current VVO systems, at a cost that is substantially lower. Further, significant opportunities may exist to leverage existing investments in communications and other grid infrastructure to further reduce the total cost of ownership.

In mature markets, such as in the US, the ENVO system may implement a cost-effective distribution automation technology with a strong return on investment (ROI). In some embodiments, the ability to dynamically and/or automatically compensate for line-voltage drops all along the feeder allows building longer feeders, allows an increase in the capacity of existing feeders, particularly in rural areas, and significantly reduces the number of tap changing regulators needed as well as reduces the frequency of tap changes. It may also allow easier integration of distributed generation resources and may counteract the rapid voltage fluctuations caused by green energy generation (e.g., unpredictable clouds or wind change).

FIG. 11a is another circuit diagram of a plurality of switch-controlled VAR sources that may be within or next to a pole top transformer or any grid asset in some embodiments. FIGS. 1b-3 focus on different portions of the circuit diagram of FIG. 11a. In various embodiments, any transformer (e.g., pole top transformer), smart meter, meter, or grid asset may comprise one or more VAR sources. Each of a plurality of VAR sources may make determinations and adjust voltage autonomously from others in the pole top transformer. In some embodiments, a plurality of VAR sources may share any number of components, including, for example, a controller and/or a power supply unit.

In various embodiments, one or more controllers may control two or more of the VAR sources in a pole top transformer to coordinate voltage adjustment. For example, a single controller may detect proximate voltage, compare the voltage against one or more set points, determine a voltage adjustment, and determine which of the VAR sources should be enabled (or disabled) to achieve the desired effect and provide the appropriate commands.

In some embodiments, one or a subset of the VAR sources may comprise one or more inductors in parallel with one or more capacitors. Those skilled in the art will appreciate that the inductor may be enabled when necessary to adjust voltage. In other embodiments, there may any number of inductors and any number of capacitors in any number of the shunt-connected, switch-controlled VAR sources.

FIG. 11a depicts a switch-controlled VAR source 1102, a plurality of switch-controlled VAR sources 1104, a controller 1106, and a power module 1108. The switch-controlled VAR source 1102 may be any one of the plurality of switch-controlled VAR sources 1104. The switch-controlled VAR source 1102 may be similar to the switch-controlled VAR source 400. The plurality of switch-controlled VAR sources 1104 may comprise any number of switch-controlled VAR sources. The controller 1106 may be a microprocessor, PIC, or any processor. The power module 1108 may perform voltage detection and/or zero crossing threshold detection (ZCD).

Those skilled in the art will appreciate that the circuits depicted in FIG. 11 may be a part of any device or combination of devices and is not limited to pole top transformers. For example, there may be a plurality of switch-controlled VAR sources 1104, controllers 1106, and/or power modules 1108 associated with any grid asset or as a standalone unit (e.g., coupled to a feeder line in shunt).

FIG. 11b depicts a switch-controlled VAR source 1102 in some embodiments. The switch-controlled VAR source 1102 may comprise a fuse, capacitor, harmonic sensor, zero voltage detection for ADC circuitry, I sense detection for ADC circuitry, and a relay circuit. The switch-controlled VAR source 1102 may be coupled to a feeder in shunt, adjust reactive power, and provide information (e.g., harmonic information, ZVD, and/or I sense signals) to the controller 1106. The triac and relay circuit may be controlled by signals from the controller 1106.

In some embodiments, the harmonic sensor may detect harmonic resonance which may be subsequently reduced or eliminated. The I sense detection for ADC circuitry and zero voltage detection for ADC circuitry may be used to detect current, harmonics, and/or voltage which may allow the controller 1106 to better protect the circuit and make adjustments for voltage regulation. The relay circuitry may be a part of the switch to enable or disable the capacitor.

FIG. 11c depicts a plurality of switch-controlled VAR sources 1104 in some embodiments. Each switch-controlled VAR source of FIG. 11c may include similar or dissimilar components from the other switch-controlled VAR sources. For example, one or more of the switch-controlled VAR sources may comprise an inductor in parallel with a capacitor. A single controller may control one or more of the switch-controlled VAR sources.

FIG. 11d (and FIGS. 11d-1, 11d-2, 11d-3, and 11d-4 which are exploded views of the corresponding sections/elements illustrated in FIG 11d) depicts a controller 1106 in some embodiments. The controller 1106 may control any number of switch-controlled VAR sources 1104. The controller may receive information (harmonic information, ZVD, and/or I sense signals) from one or more of the switch-controlled VAR sources and use the information to control triacs, relays, and/or reduce harmonic resonance. For example, the controller 1106 may receive and make adjustments based on voltage detection of only one of the plurality of switch-controlled VAR sources 1104. Although only one processor is depicted in FIGS. 11a and 11d, those skilled in the art will appreciate that there may be any number of processors coupled to any number of switch-controlled VAR sources.

Figure 11E:
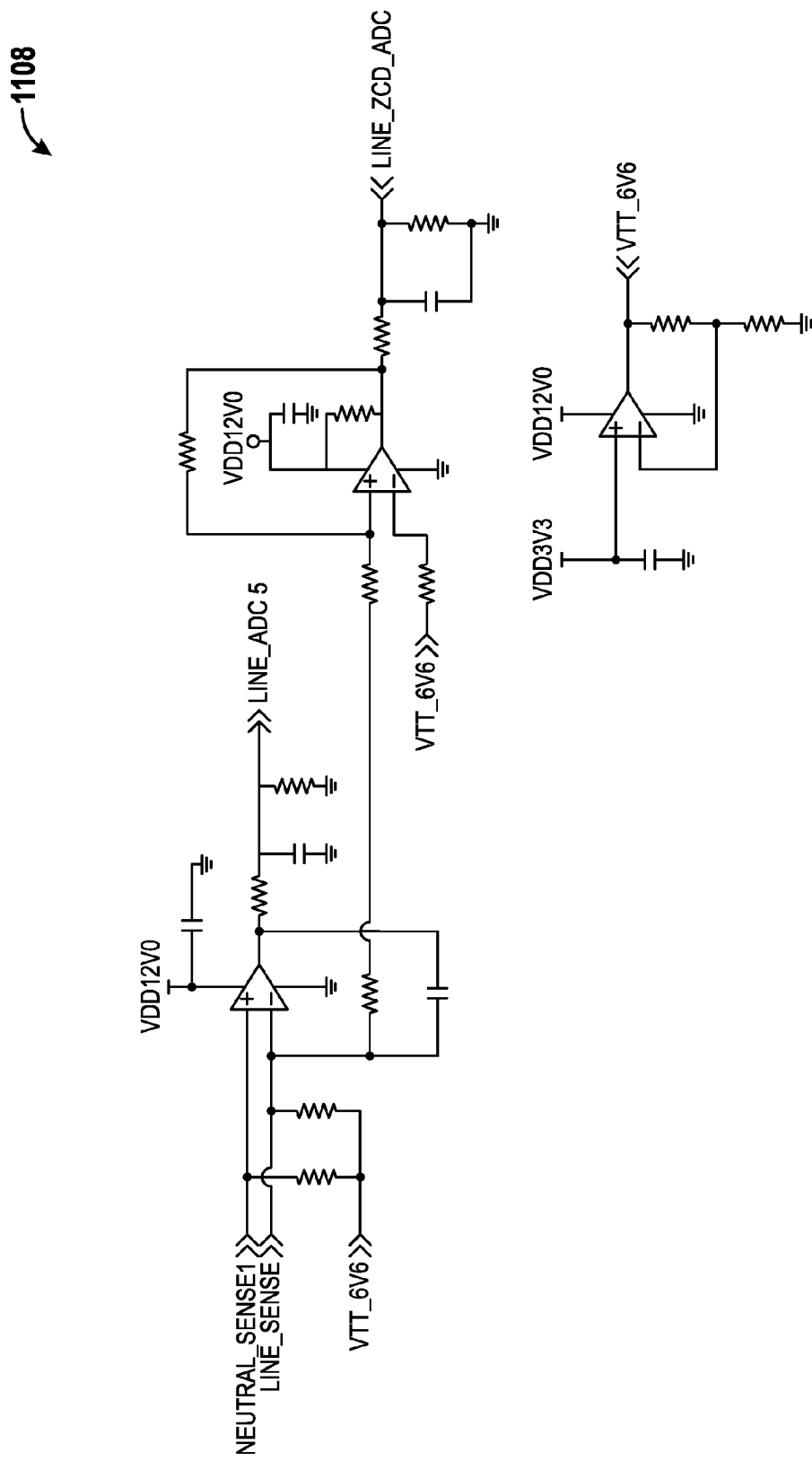
FIG. 11e depicts power module comprising ADC circuitry and ZCD circuitry coupled to the controller in some embodiments.

FIG. 11e depicts power module 1108 comprising ADC circuitry and ZCD circuitry coupled to the controller 1106 in some embodiments. The ADC circuitry and ZCD circuitry may be coupled to the feeder and provide information and/or power to the controller 1106. The ADC circuitry and ZCD circuitry may provide the controller 1106 power and/or information regarding voltage. In some embodiments, the controller 1106 controls one or more of the triacs of the plurality of the switch-controlled VAR sources 1102 based on the zero crossing detection.

Those skilled in the art will appreciate that other circuit designs, components, and the like may perform similar functionality or perform similar results and still be within the invention(s) described herein.

Figure 12:
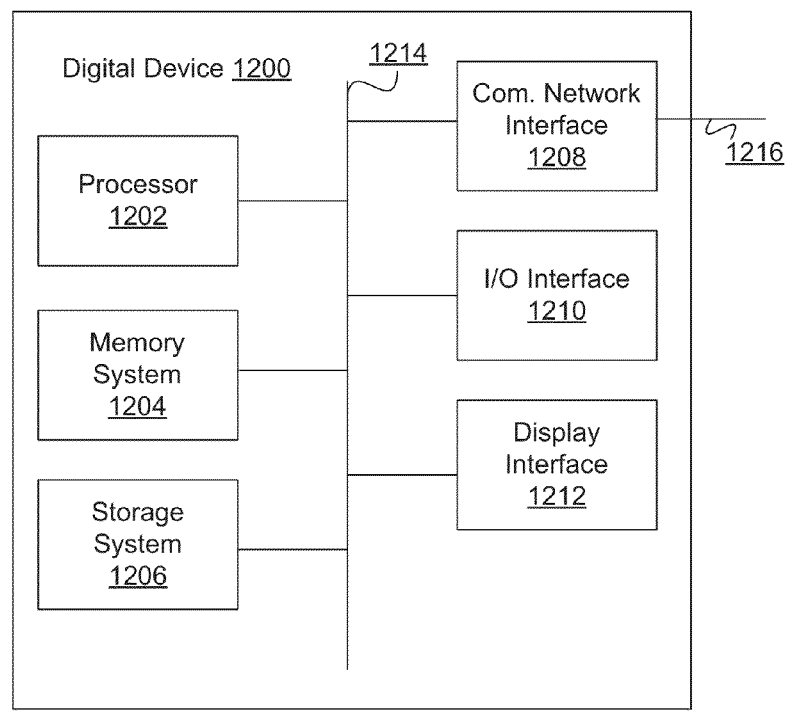
FIG. 12 is a block diagram of an exemplary digital device.

FIG. 12 is a block diagram of an exemplary digital device 1200. In some embodiments, the digital device 1200 may provide set points and/or profiles to one or more switch-controlled VAR sources. The digital device 1200 may also receive voltage and/or power tracking information which may be used to track usage, identify potential theft, and/or maintain grid assets. Further, in various embodiments, the digital device 1200 may coordinate and/or control any number of switch-controlled VAR sources.

The digital device 1200 comprises a processor 1202, a memory system 1204, a storage system 1206, a communication network interface 1208, an optional I/O interface 1210, and an optional display interface 1212 communicatively coupled to a bus 1214. The processor 1202 is configured to execute executable instructions (e.g., programs). In some embodiments, the processor 1202 comprises circuitry or any processor capable of processing the executable instructions.

The memory system 1204 is any memory configured to store data. Some examples of the memory system 1204 are storage devices, such as RAM or ROM. The memory system 1204 can comprise the ram cache. In various embodiments, data is stored within the memory system 1204. The data within the memory system 1204 may be cleared or ultimately transferred to the storage system 1206.

The data storage system 1206 is any storage configured to retrieve and store data. Some examples of the data storage system 1206 are firmware memory, flash drives, hard drives, optical drives, and/or magnetic tape. In some embodiments, the digital device 1200 includes a memory system 1204 in the form of RAM and a data storage system 1206 in the form of flash data. Both the memory system 1204 and the data storage system 1206 comprise computer readable media which may store instructions or programs that are executable by a computer processor including the processor 1202.

The communication network interface (com. network interface) 1208 can be coupled to a network (e.g., communication network 164) via the link 1216. The communication network interface 1208 may support communication over an Ethernet connection, a serial connection, a parallel connection, or an ATA connection, for example. The communication network interface 1208 may also support wireless communication (e.g., 802.16 a/b/g/n, WiMax). It will be apparent to those skilled in the art that the communication network interface 1208 can support many wired and wireless standards.

The optional input/output (I/O) interface 1210 is any device that receives input from the user and output data. The optional display interface 1212 is any device that is configured to output graphics and data to a display. In one example, the display interface 1212 is a graphics adapter. It will be appreciated that not all digital devices 1200 comprise either the I/O interface 1210 or the display interface 1212.

It will be appreciated by those skilled in the art that the hardware elements of the digital device 1200 are not limited to those depicted in FIG. 12. A digital device 1200 may comprise more or less hardware elements than those depicted. Further, hardware elements may share functionality and still be within various embodiments described herein. In one example, encoding and/or decoding may be performed by the processor 1202 and/or a co-processor located on a GPU (i.e., NVidia).

Figure 13:
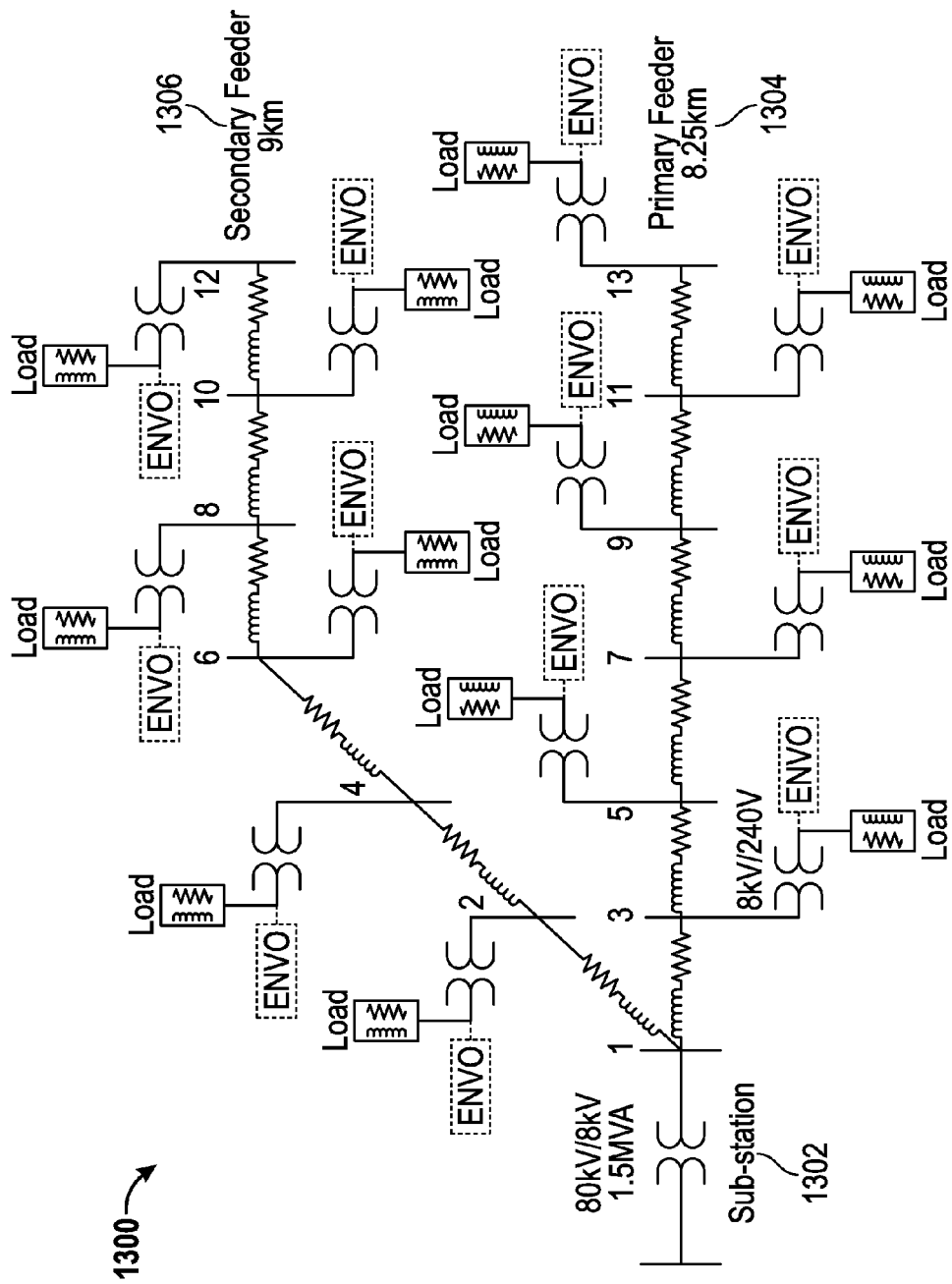
FIG. 13 depicts a simulated feeder diagram in some embodiments.

FIG. 13 depicts a simulated feeder diagram 1300 in some embodiments. FIG. 13 comprises a substation 1302 with two feeders including the primary feeder 1304 and the secondary feeder 1306. Along each feeder, loads and ENVOs are installed after an 8 kV/240V transformer. In this example, ENVOs are co-located or located near loads on different feeders.

In some embodiments, each ENVO comprises a switch-controlled voltage source. The switch-controlled voltage source may be similar to the switch-controlled VAR source 400 of FIG. 4a. The switch-controlled voltage source may adjust reactive power, real power, or both. In various embodiments, the switch-controlled voltage source is the switch-controlled VAR source 400 of FIG. 4a.

In the example depicted in FIG. 13, there is an ENVO located at or near every load. In various embodiments, switch-controlled voltage sources or ENVOs are not located at or near every load. For example, multiple loads may not be at or near a switch-controlled voltage source or ENVO. Further, in some embodiments, one or more switch-controlled voltage sources or ENVOs may be located together (e.g., within a pole top where multiple ENVOs may be controlled by a single processor or controller).

In various embodiments, each switch-controlled voltage source or ENVO may comprise one or more delays to avoid infighting. For example, if a variety of different switch-controlled voltage sources or ENVOs wait for different delay durations before acting, one or more switch-controlled voltage sources or ENVOs may take the voltage adjustments of other switch-controlled voltage source or ENVOs into account before taking action. As a result hysteresis or bouncing above and below a desired network voltage is reduced or eliminated.

In various embodiments, each switch-controlled voltage source or ENVO may generate a delay (e.g., with a randomizer) that allows the different units to act in concert even if there is no direct communication between the different switch-controlled voltage source and no direct control by a centralized communication facility that synchronizes behavior in real time by directly commanding the different switch-controlled voltage source to engage or disengage.

In various embodiments, the different switch-controlled voltage sources or ENVOs act independently, however, in the aggregate, the effect is to improve power and/or voltage across all or part of the distribution power network.

Figure 14:
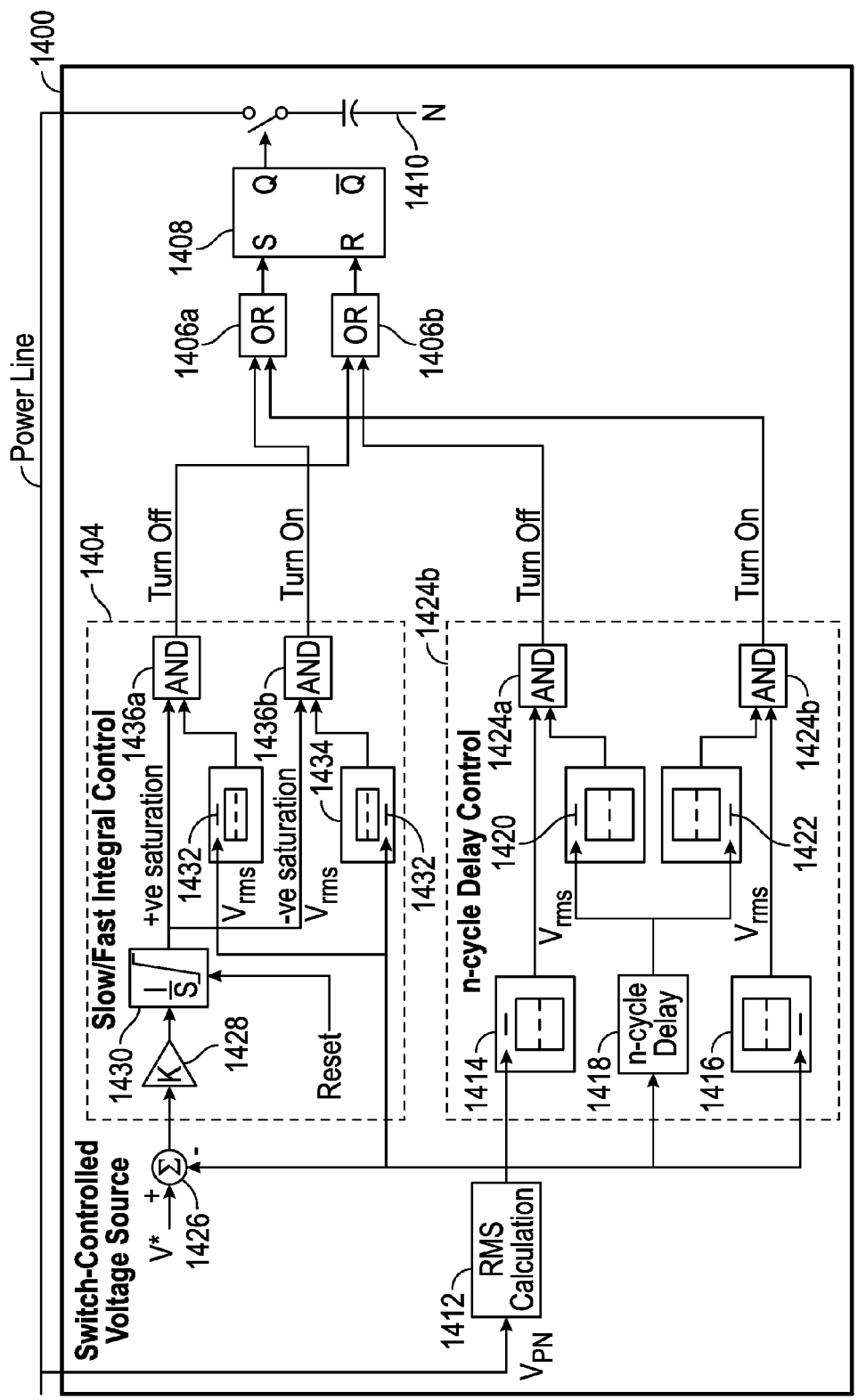
FIG. 14 is a block diagram of an exemplary switch-controlled voltage source which may be coupled to a distribution power network in some embodiments.

FIG. 14 is a block diagram of an exemplary switch-controlled voltage source 1400 which may be coupled to a distribution power network in some embodiments. The switch-controlled VAR source 1400 may comprise an n-cycle delay control module 1402, a slow/fast integral control module 1404, "or" modules 1406a-b, latch 1408, and a VAR compensation component 1410 (could be a capacitor or inductor). In some embodiments, if the measured terminal voltage ($V_{PN}$) is out of range, the n-cycle delay control block 1402 generates a switching signal to regulate voltage by switching in or switching out voltage sources (e.g., VARs) after a delay of n-cycles at fundamental frequency:

$$V_{PN} <= V_{low} \text{ (Switch In)}$$

$$V_{PN} >= V_{high} \text{ (Switch out)}$$

The value n may define the switching instant of an individual switch-controlled voltage source 1400. $V_{low}$ and $V_{high}$ are values that may provide limits for hysteresis control.

The slow/fast integral control block 1404 may work in parallel with the n-cycle delay control block 1402. In various embodiments, if the measured voltage error is either too high or too low then Slow/Fast Integral Control block 1404 may generate a switching signal for fast switching during transient voltage conditions and slow switching during steady state conditions, respectively.

In various embodiments, the n-cycle delay control bock 1402 regulates line voltage within a regulation range. The n-cycle delay control bock 1402 may comprise a voltage detection module 1412 (RMS calculation) coupled to a first high voltage comparator 1414, a first low voltage comparator 1416, and an n-cycle delay module 1418. The n-cycle delay module 1418 is coupled to a second high voltage comparator 1420. An "and" module 1424a is coupled to both the first and second high voltage comparators 1414 and 1420. The n-cycle delay module 1418 is also coupled to a second low voltage comparator 1422. An "and" module 1424b is coupled to both the first and second low voltage comparators 1416 and 1422.

The "and" modules 1424a and 1424b are respectively coupled to "or" modules 1406a and 1406b, respectively. The "or" modules 1406a and 1406b are coupled to a latch module 1408 which in turn is coupled to a voltage source 1410 such as, but not limited to, a capacitor or any other voltage compensation component.

In various embodiments, the voltage detection module 1412 may detect a voltage and provide the detected voltage to the first high voltage comparator 1414, the first low voltage comparator 1416, and the n-cycle delay module 1418. The voltage detection module 1412 may, in some embodiments, calculate an RMS value or any other value associated with the detected voltage from the power line. In various embodiments, the voltage detection module 1412 does not calculate a value of the detected voltage.

The first high level comparator 1414 may receive the detected voltage (e.g., any value representing detected voltage) from the voltage detection module 1412 and compare the detected voltage to a first high voltage value. The first high voltage value may comprise a set point or may be determined based on one or more set points received by the switch-controlled voltage source 1400. If the first high level comparator 1414 determines that the detected voltage is greater than the first high voltage value, the first high level comparator 1414 may provide a first high voltage signal to the "and" module 1424a.

The first low level comparator 1416 may receive the detected voltage (e.g., any value representing detected voltage) from the voltage detection module 1412 and compare the detected voltage to a first low voltage value. The first low voltage value may comprise a set point or may be determined based on one or more set points received by the switch-controlled voltage source 1400. Any number of set point(s) of the first low level comparator 1416 may be similar to different than any number of set point(s) of the first high level comparator 1414. If the first low level comparator 1416 determines that the detected voltage is less than the first low voltage value, the first low level comparator 1416 may provide a first low voltage signal to the "and" module 1424a.

The n-cycle delay module 1418 may be a module that stores and/or generates a delay value (e.g., an n-cycle delay value). In some embodiments, the switch-controlled voltage source 1400 comprises or is coupled to a communications interface (e.g., through integration with a smart meter) which is configured to receive one or more delay values. In various embodiments, the switch-controlled voltage source 1400 may be preconfigured with one or more delay values when the switch-controlled voltage source 1400 is fabricated. Further, in some embodiments, the switch-controlled voltage source 1400 may generate one or more delay values. For example, the n-cycle delay module 1418 may comprise a randomizer to generate a delay value. Those skilled in the art will appreciate that the n-cycle delay module 1418 may generate a delay over a preset range of values (e.g., the present range of values being received via a communication interface, preconfigured, or generated).

After a delay duration based on the delay value, the n-cycle delay module 1418 provides the detected signal to the second high level comparator 1420 and the second low level comparator 1422. The second high level comparator 1420 may be similar to or different from the first high level comparator 1414. For example, the second high level comparator 1420 may compare the detected voltage to one or more set points that is similar or different from one or more set points of the first high level comparator 1420. Further, the second low level comparator 1422 may be similar to or different from the first low level comparator 1422. For example, the second low level comparator 1422 may compare the detected voltage to one or more set points that is similar or different from one or more set points of the first low level comparator 1416.

If the second high level comparator 1420 determines that the detected voltage is greater than a second high voltage value (the second high voltage value being based on one or more set points of the second high level comparator 1420), the second high level comparator 1420 may provide a second high voltage signal to the "and" module 1424a.

If the second low level comparator 1422 determines that the detected voltage is less than a second low voltage value (the second low voltage value being based on one or more set points of the second low level comparator 1422), the second low level comparator 1422 may provide a second low voltage signal to the "and" module 1424b.

The "and" module 1424a may receive the first and second high voltage signals from the first and second high level comparators 1414 and 1420, respectively. The first and second high voltage signals may be similar (e.g., may be the same signal) or different. If both the first and second high voltage signals are received by the "and" module 1424a, the "and" module 1424a may provide an "off" signal to the "or" module 1406b. The "off" signal may be similar or different from the first and/or second high voltage signals.

The "and" module 1424b may receive the first and second low voltage signals from the first and second low level comparators 1416 and 1422, respectively. The first and second low voltage signals may be similar (e.g., may be the same signal) or different. If both the first and second low voltage signals are received by the "and" module 1424b, the "and" module 1424b may provide an "on" signal to the "or" module 1406a. The "on" signal may be similar or different from the first and/or second low voltage signals.

The slow/fast integral control 1404 may comprise a mixer 1426 that mixes a set voltage (e.g., Vset) with the detected voltage from the voltage detector 1412. The mixer 1426 may provide the mixed signal to the scalar module 1428. The scalar module 1428 may provide a scaling factor (e.g., K) the mixed signal. The scaling factor may be, for example, received by an optional communication interface, preconfigured, or generated.

Those skilled in the art will appreciate that the switch-controlled voltage source 1400 may comprise any number of set points. Any number of the set points may be received from a communications interface, preconfigured, and/or generated. In various embodiments, one or more of the set points may be altered or updated at any time. In various embodiments, a processor of the switch-controlled voltage source 1400 may be configured to update, modify, or change one or more set points. For example, the processor of the switch-controlled voltage source 1400 may perform a learning function to identify likely power scenarios (e.g., a consistent change in voltage or a change in voltage that is periodic) and change one or more set points to improve efficiency in view of performance of the switch-controlled voltage source 1400 and/or expected result from any number of other voltage sources (e.g., capacitor banks and/or other switch-controlled voltage source 1400).

The scalar module 1428 may provide the scaled, mixed signal to the integration module 1430. The integration module 1430 may integrate a number of errors and/or number of events whereby the detected voltage is above or below any number of set points. The integration module 1430 may provide a high voltage saturation signal to "and" module 1436a and provide a low voltage saturation signal to "and" module 1436b.

The third high voltage comparator 1432 and third low voltage comparator 1434 of the slow/fast integral control module 1404 may be configured to receive the detected voltage (e.g., from the voltage detector 1412). The third high voltage comparator 1432 may compare the detected voltage to one or more set points. The one or more set points of the third high voltage comparator 1432 may be similar to or different from any number of set points of the n-cycle delay control module 1402 or the third low voltage comparator 1434. If the detected voltage is greater and/or equal to one or more set points, the third high voltage comparator 1432 may provide a third high voltage signal to the "and" module 1436a.

The third low voltage comparator 1434 may compare the detected voltage to one or more set points. The one or more set points of the third low voltage comparator 1434 may be similar to or different from any number of set points of the n-cycle delay control module 1402 or the third high voltage comparator 1432. If the detected voltage is less than and/or equal to one or more set points, the third low voltage comparator 1434 may provide a third low voltage signal to the "and" module 1436b.

The "and" module 1436a may receive the high voltage saturation signal and the third high voltage signal from the integration module 1430 and third high level comparator 1432, respectively. The high voltage saturation signal and the third high voltage signal may be similar (e.g., may be the same signal) or different. If both the high voltage saturation signal and the third high voltage signal are received by the "and" module 1436a, the "and" module 1436a may provide an "off" signal to the "or" module 1406b. The "off" signal may be similar or different from the high voltage saturation signal and the third high voltage signal.

The "and" module 1436b may receive the low voltage saturation signal and the third low voltage signal from the integration module 1430 and third low level comparator 1434, respectively. The low voltage saturation signal and the third low voltage signal may be similar (e.g., may be the same signal) or different. If both the low voltage saturation signal and the third low voltage signal are received by the "and" module 1436b, the "and" module 1436b may provide an "on" signal to the "or" module 1406a. The "on" signal may be similar or different from the high voltage saturation signal and the third high voltage signal.

If an "on" signal from the "and" module 1436b and/or the "on" signal from the "and" module 1424b is received by the "or" module 1406a, the latch module 1408 may receive a signal from the "or" module 1406a to activate (e.g., close the switch) the voltage source 1410. The switch may comprise a transistor, relay, or any other switch such as, for example, all or part of semiconductor switch 416 and/or relay 414 of FIG. 4a.

If an "off" signal from the "and" module 1436a and/or the "off" signal from the "and" module 1424a is received by the "or" module 1406b, the latch module 1408 may receive a signal from the "or" module 1406b to deactivate (e.g., open the switch) the voltage source 1410.

Those skilled in the art will appreciate that the latch 1408 may be any kind of latch such as a state device or a flip flop. The "or" modules 1406a-b may comprise, either separately or collectively, any type of hardware or software to perform "or" logic operations.

Further, those skilled in the art will appreciate that "and" modules 1424a-b and 1436a-b may comprise, either separately or collectively, any type of hardware or software to perform "and" logic operations. Further, although the voltage source is depicted in FIG. 14 as a capacitor, those skilled in the art will appreciate that any number of capacitors, inductors, and/or any other voltage sources may enacted through activation of a switch. The switch may also be either software or hardware.

In various embodiments, a module may be hardware, software, or a combination of hardware and software. In some embodiments, some of the elements of FIG. 14, such as the n-cycle delay control module 1402 and the slow/fast integral control module 1404 may be implemented logically, in software, by a processor of the switch-controlled VAR source 1400. Those skilled in the art will appreciate that the various circuits, modules, and gates may be implemented in many ways.

FIG. 14 is one of many possible implementations of delays and control of one or more voltage sources. Those skilled in the art will appreciate that there may be any number of comparisons to one or more set points over any kind of delay to avoid infighting. For example, there may be any number of switch-controlled VAR sources operating to correct voltage after a delay. Because the delays of any number or a subset of switch-controlled voltage sources are different, the effect may be to correct and/or improve power within and/or throughout a power distribution network or a feeder without hysteresis. In some embodiments, as corrections occur, any number of switch-controlled VAR sources may activate (albeit at potentially different delays) to improve power asymptotically.

In some embodiments, the switch-controlled voltage source 1400 comprises or is coupled to a communications interface (e.g., through integration with a smart meter) which is configured to receive one or more delay values. In various embodiments, the switch-controlled voltage source 1400 may be preconfigured with one or more delay values when the switch-controlled voltage source 1400 is fabricated. Further, in some embodiments, the switch-controlled voltage source 1400 may generate one or more delay values. For example, the n-cycle delay module 1418 may comprise a randomizer to generate a delay value. Those skilled in the art will appreciate that the n-cycle delay module 1418 may generate a delay over a preset range of values (e.g., the present range of values being received via a communication interface, preconfigured, or generated).

Figure 15:
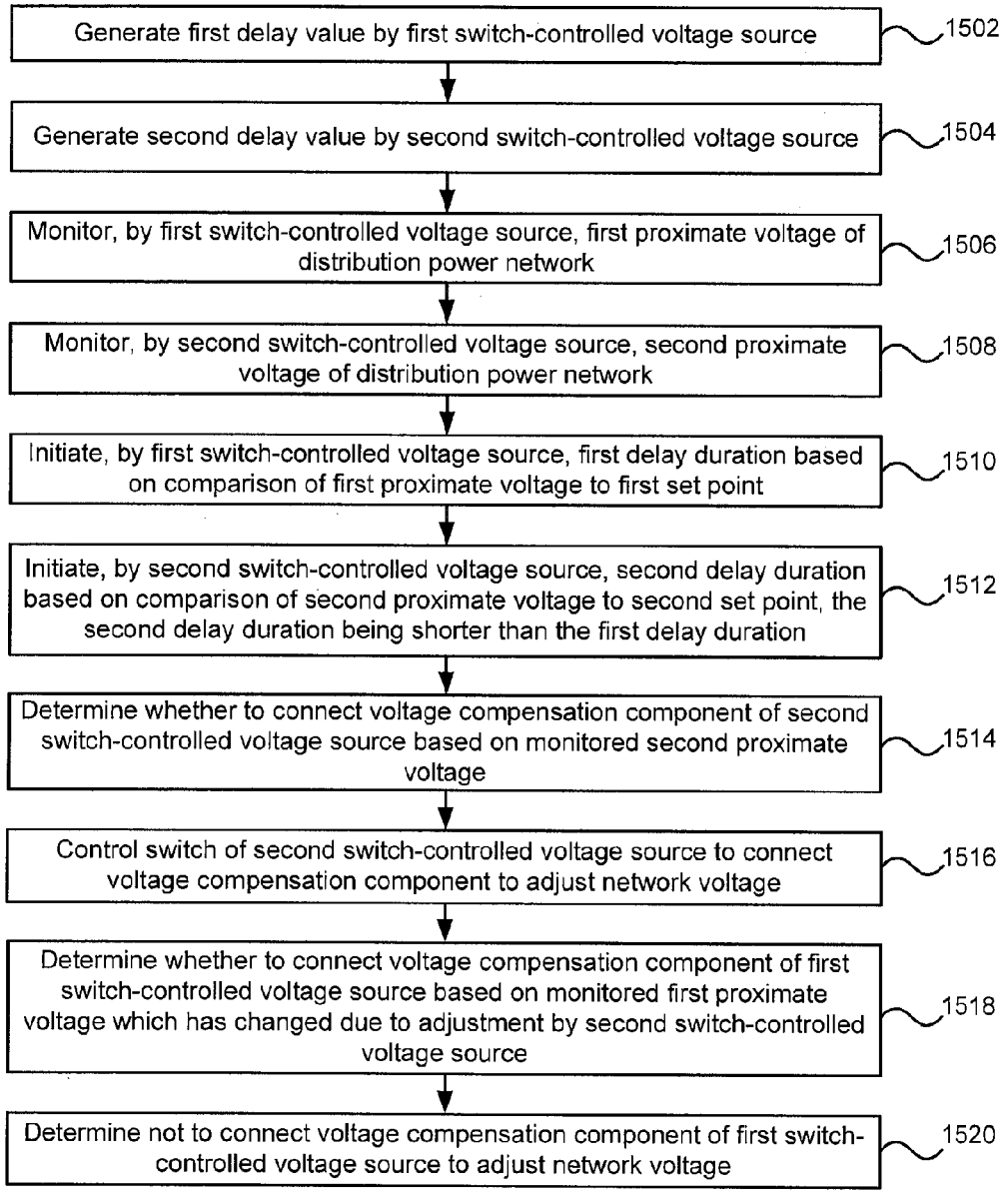
FIG. 15 is a method of multiple switch-controlled voltage sources operating with different delays in some embodiments.

FIG. 15 is an exemplary method of multiple switch-controlled VAR (also in figures) sources operating with different delays in some embodiments. As discussed herein, each switch-controlled VAR source (e.g., the first and second switch-controlled voltage sources) may comprise all or some of the components of the switch-controlled VAR source 400 as discussed regarding FIG. 4a. For example, each switch-controlled voltage source discussed with regard to FIG. 15 may comprise a processor, a switch, and/or a voltage compensation component. Each processor may be any processor such as, but not limited to, controller 426 of FIG. 4a. Each switch may be any switch such as, but not limited to optional NTC 418, triac 420, and/or relay 414 of FIG. 4a. The voltage compensation component may be any voltage source that may compensate for voltage or power. Each voltage compensation component may be any voltage compensation component, such as, but not limited to capacitor 412. The voltage compensation component may compensate reactive power, real power, or a combination of real and reactive power of a feeder line, branch, or any portion of a power distribution network.

In step 1502, a first switch-controlled voltage source may generate a first delay value. In one example, a randomizer of the first switch-controlled voltage source may generate a first delay value. The randomizer may randomly select the first delay value or, in some embodiments, the randomization may be weighted or limited to a range of delay values.

In step 1504, a second switch-controlled voltage source may generate a second delay value. In one example similar to step 1502, a randomizer of the second switch-controlled voltage source may generate a second delay value. The randomizer may randomly select the second delay value or, in some embodiments, the randomization may be weighted or limited to a range of delay values. The randomizer of the second switch-controlled voltage source and the randomizer of the first switch-controlled voltage source may be weighted or limited in a similar or different manner.

Those skilled in the art will appreciate that the delay value may be obtained in any number of ways. A randomizer may generate the delay value or may only be a part of the overall process of delay value generation. In some embodiments, the delay value is selected from a set of delay values based on a range of delay values.

In various embodiments, instead of generating the delay value, the first and/or second switch-controlled voltage source may obtain one or more delay values through receiving the delay values via an optional communication interface (e.g., from a centralized communication facility or through near field communications between one or more switch-controlled voltage sources). The first and/or second switch-controlled voltage source may also be preconfigured (e.g., during or after manufacture) with one or more delay values. In various embodiments, each switch-controlled voltage source comprises memory coupled to the respective processor. In some embodiments, the processor obtains the one or more delay values from memory and/or from storage.

As discussed regarding FIG. 14, each switch-controlled voltage source may comprise any number of delay values. For example, each switch-controlled voltage source may comprise an n-cycle delay value and/or an integrator that may function to delay immediate implementation of a voltage compensation component.

In step 1506, the first switch-controlled voltage source monitors a first proximate voltage of the distribution power network. For example, the first switch-controlled voltage source may be coupled to any portion of the distribution power network (e.g., a feed line). The first proximate voltage may be a detected voltage that is proximate to the first switch-controlled voltage source. In various embodiments, the processor of the first and/or second switch-controlled voltage source receives a voltage value representative of a detected voltage. The processor may monitor the voltage values.

In step 1508, the second switch-controlled voltage source monitors a second proximate voltage of the distribution power network. For example, the second switch-controlled voltage source may be coupled to any portion of the distribution power network (e.g., a feed line) at any distance from the first switch-controlled voltage source. The second proximate voltage may be a detected voltage that is proximate to the second switch-controlled voltage source.

In step 1510, the first switch-controlled voltage source initiates a first delay duration based on a comparison of the first proximate voltage to a first set point. The first delay duration may be based on the first delay value that was generated, received, or preconfigured. In some embodiments, the first delay duration may be based, at least in part on any number of delay values. In some embodiments, the first switch-controlled voltage source compares the first proximate voltage to any number of set points. If the first proximate voltage is determined to not be as expected (e.g., too high or too low), the first switch-controlled voltage source may initiate a first delay duration before engaging in corrective action (e.g., enabling the voltage compensation component of the first switch-controlled voltage source).

In step 1512, the second switch-controlled voltage source initiates a second delay duration based on a comparison of the second proximate voltage to a second set point. The second delay duration may be based on the second delay value that was generated, received, or preconfigured. In some embodiments, the second delay duration may be based, at least in part on any number of delay values. In some embodiments, the second switch-controlled voltage source compares the second proximate voltage to any number of set points. If the second proximate voltage is determined to not be as expected (e.g., too high or too low), the second switch-controlled voltage source may initiate a second delay duration before engaging in corrective action (e.g., enabling the voltage compensation component of the first switch-controlled voltage source).

In various embodiments, the first and second switch-controlled voltage source may monitor the first and second proximate voltage simultaneously or near simultaneously. Similarly, both the first and second switch-controlled voltage sources may initiate the first and second delay durations, respectively, simultaneously or near simultaneously. The delay duration of the first and second switch-controlled voltage sources, however, may be different. As a result, the duration of either delay duration may expire before the other thereby allowing corrective action of one of the switch-controlled voltage sources to occur before the delay duration of the other switch-controlled voltage source expires.

In step 1514, the second delay duration of the second switch-controlled voltage source expires before the first delay duration of the first switch-controlled voltage source. The processor of the second switch-controlled voltage source may determine whether to connect a voltage compensation component of the second switch-controlled voltage source based on continued monitoring of the second proximate voltage. For example, if the second proximate voltage changes (e.g., is corrected by other switch-controlled voltage sources) and the second proximate voltage is as expected (e.g., as compared to one or more set points), the processor of the second switch-controlled voltage source may determine not to connect or enable the voltage compensation component. If the second proximate voltage is unchanged or still in a range that is sufficiently unexpected or undesirable, the second switch-controlled voltage source may determine to connect the voltage compensation component (e.g., enable one or more capacitors, inductors, or both).

In step 1516, upon determining to connect a voltage compensation component of the second switch-controlled voltage source, the processor may control one or more switches to connect or otherwise enable a voltage compensation component to adjust network voltage. Network voltage is a voltage of all or part of a distribution power network. A network voltage component may be all or a part of the voltage or power (e.g., reactive power, real power, or a combination of both).

Those skilled in the art will appreciate that the processor of the second switch-controlled voltage source or any processor of any switch-controlled voltage source may determine to disable or disconnect the voltage compensation component based on the determination. For example, after the second delay duration expires, the processor of the second switch-controlled voltage source may determine to disconnect the voltage compensation component of the second switch-controlled voltage source because all or part of the second proximate voltage is too high (e.g., as determined by comparing the monitored second proximate voltage to one or more set points after the expiration of the second delay duration).

In step 1518, the first delay duration of the first switch-controlled voltage source expires. The processor of the first switch-controlled voltage source may determine whether to connect a voltage compensation component of the first switch-controlled voltage source based on continued monitoring of the first proximate voltage. For example, in a manner similar to that discussed herein regarding the second switch-controlled voltage source, if the first proximate voltage changes (e.g., is corrected by other switch-controlled voltage sources) and the first proximate voltage is as expected (e.g., as compared to one or more set points), the processor of the first switch-controlled voltage source may determine not to connect or enable the voltage compensation component. In this example, the first proximate voltage may have changed due to the action of the second switch-controlled voltage source. If the changed first proximate voltage is acceptable, the processor of the first switch-controlled voltage source may determine not to connect the voltage compensation component of the first switch-controlled voltage source. Alternately, if the changed first proximate voltage is still unacceptable (e.g., the changed first proximate voltage has improved but remains undesirable as compared to one or more set points), the processor of the first switch-controlled voltage source may determine to connect or enable the voltage compensation component to further adjust network voltage.

In step 1520, upon determining not to connect a voltage compensation component of the first switch-controlled voltage source, the first switch-controlled voltage source may continue to monitor the first proximate voltage. The process may continue in step 1506.

Those skilled in the art will appreciate that the processor of the first switch-controlled voltage source or any processor of any switch-controlled voltage source may determine to disable or disconnect the voltage compensation component based on the determination. For example, after the first delay duration expires, the processor of the first switch-controlled voltage source may determine to disconnect the voltage compensation component of the first switch-controlled voltage source because all or part of the first proximate voltage is too high (e.g., as determined by comparing the monitored first proximate voltage to one or more set points after the expiration of the first delay duration).

In some embodiments, after one or more operations (e.g., enabling or disabling a voltage compensation component), any number of switch-controlled voltage sources may update one or more delay values and/or one or more set points. For example, one or more switch-controlled voltage source may lengthen delay durations after heavy periods of activity to cool one or more switches and/or voltage compensation components. Further, one or more switch-controlled voltage source may lengthen delay durations after heavy periods of activity to prolong the life of one or more components such as, for example, one or more relays.

In some embodiments, after a duration of time with few operations, any number of switch-controlled voltage sources may update one or more delay values and/or one or more set points. For example, one or more switch-controlled voltage source may shorten delay durations after light periods of activity to relieve burden from other switch-controlled voltage sources.

Figure 16:
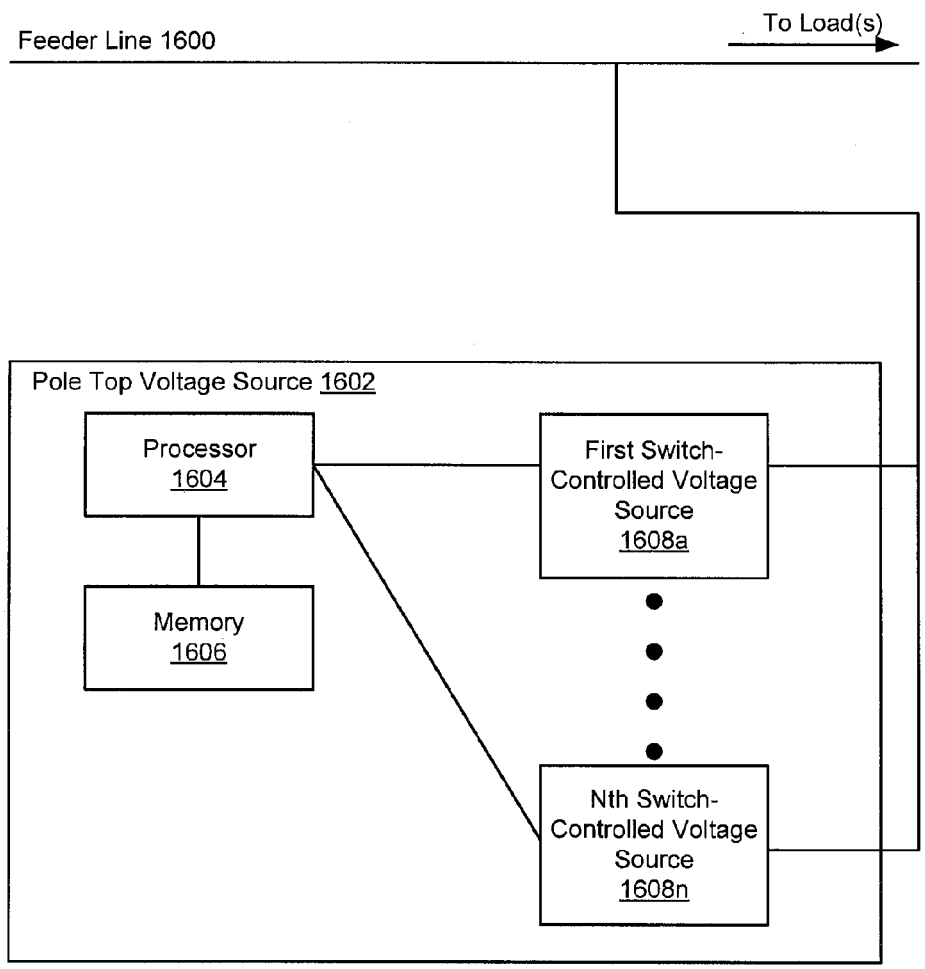
FIG. 16 depicts a block diagram of a pole top voltage source including of a plurality of switch-controlled voltage sources in some embodiments.

FIG. 16 depicts a block diagram of a pole top voltage source 1602 including of a plurality of switch-controlled voltage sources 1608a-1608n in some embodiments. The pole top voltage source 1602 may comprise any number of switch-controlled voltage sources. In various embodiments, the pole top voltage source 1602 is similar to the pole top device depicted in FIGS. 11a-e.

Similar to the discussion regarding FIG. 11a, in various embodiments, any transformer (e.g., pole top transformer), smart meter, meter, or grid asset may comprise one or more voltage sources. Each of a plurality of voltage sources may make determinations and adjust voltage autonomously from others in the pole top transformer. In some embodiments, a plurality of voltage sources may share any number of components, including, for example, a controller 1604, memory 1606, and/or a power supply unit.

In various embodiments, one or more controllers may control two or more of the VAR sources in a unit adjacent to or integrated with a pole top transformer to coordinate voltage adjustment. For example, a single controller may detect proximate voltage, compare the voltage against one or more set points, determine a voltage adjustment, initiate delay durations associated with the different voltage sources, and command one or more of the voltage sources to enable (or disable) a related voltage compensation component to achieve the desired effect and adjust network voltage.

The pole top voltage source 1602 may be coupled with the feeder line 1600. In various embodiments, the pole top voltage source 1602 comprises a processor 1604 (e.g., a controller) coupled to memory 1606 as well as any number of switch-controlled voltage sources 1608*a-n*. In various embodiments, the processor 1604 may generate one or more delay values associated with different switch-controlled voltage source 1608*a-n*.

In some embodiments, the pole top voltage source 1602 comprises a communication interface configured to receive one or more set points associated with one or more switch-controlled voltage sources 1608*a-n*. Further, the communication interface may be configured to receive on or more delays associated with one or more switch-controlled voltage sources 1608*a-n*.

The processor 1604 may control the various delays, for example, by changing the length of a delay value to improve heat dissipation and prolong lifetime of various components (e.g., relays). For example, if a subset of switch-controlled voltage sources has had heavy switching duty for a predetermined period of time, the processor 1604 may exclude all or a portion of the subset for a period of time to let the formerly active switch-controlled voltage source to cool and prolong the life of a relay. Similarly, if a subset of switch-controlled voltage source has had light switching duty for a predetermined period of time, the processor 1604 may shorten delays so that the formerly rarely used devices may perform more switching and allowing other switch-controlled voltage sources to be used less frequently.

Figure 17:
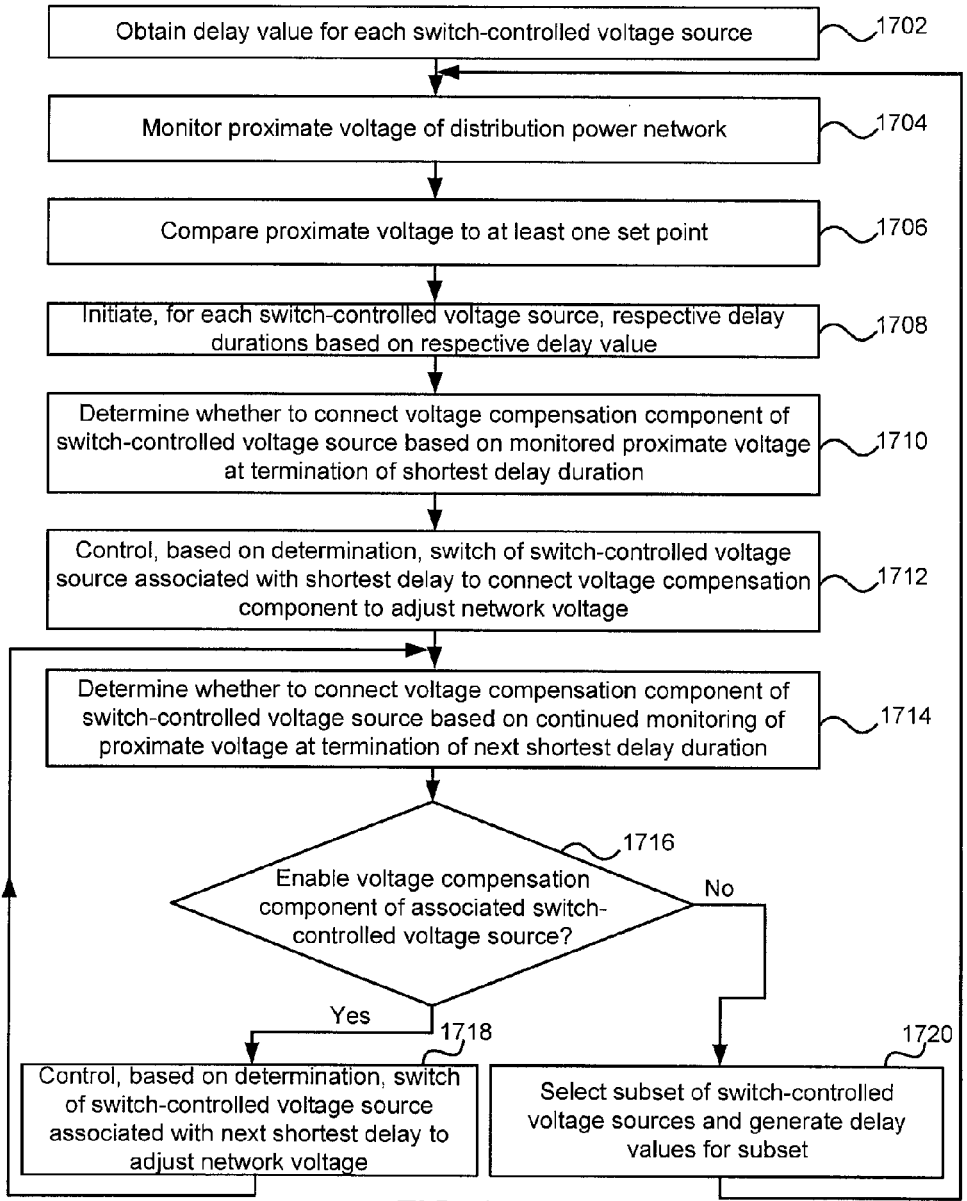
FIG. 17 is a flow chart of a method for controlling a plurality of switch-controlled voltage sources by a processor in some embodiments.

FIG. 17 is a flow chart of a method for controlling a plurality of switch-controlled voltage sources 1608*a-n* by a processor 1604 in some embodiments. In various embodiments, all or some of the switch-controlled voltage sources 1608 may be controlled by the processor 1604. All or some of the switch-controlled voltage sources 1608*a-n* may or may comprise separate processors.

In step 1702, the processor 1604 obtains a delay value for each of the switch-controlled voltage sources 1608*a-n*. In some embodiments, the processor 1604 utilizes a randomizer to generate one or more of the delay values. In various embodiments, the processor 1604 may receive delay values from a centralized communication facility via an optional communication interface or near field communication. Further, the processor 1604 may obtain one or more delay values from memory 1606. Those skilled in the art will appreciate that the processor may obtain the delay values in any number of ways (e.g., generate, receive through a communication interface, or be preconfigured). In another example, the pole top voltage source 1602 may receive a set of delay values to associate with different switch-controlled voltage sources.

In step 1704, the processor 1604 and/or one of more of the switch-controlled voltage sources monitor a proximate voltage of the distribution power network. A proximate voltage is a voltage that is proximate to the pole top voltage source 1602. In step 1706, the processor 1604 and/or one of more of the switch-controlled voltage sources compare proximate voltages to at least one set point. The at least one set point may be, for example, generated, preconfigured, or received via the optional communication interface.

In step 1708, if the comparison indicates that the proximate voltage is unexpected or otherwise undesirable, the processor 1604 initiates a respective delay duration for each switch-controlled voltage source 1608*a-n*. Each different delay duration may be based on a different delay value. As a result, different switch-controlled voltage sources 1608*a-n* are delaying action based on the associated delay duration.

In step 1710, the processor 1604 determines whether to connect the voltage compensation component of a switch-controlled voltage source at the termination of the shortest delay duration. For example, the associated delay duration for a particular switch-controlled voltage source may terminate. Upon termination, if the continued monitoring of the proximate voltage indicates that the proximate voltage is still undesirable (e.g., by comparing the proximate voltage to one or more set points), the processor 1604 may determine to command the particular switch-controlled voltage source to engage (or disengage) the associated voltage compensation component. If, on the other hand, the proximate voltage has changed during the delay duration and the proximate voltage is desirable, the processor may not generate any commands to the switch-controlled voltage sources 1608*a-n*.

In step 1712, the processor 1604 may control, based on the determination, a switch of the switch-controlled voltage source associated with the shortest delay to connect or couple the associated voltage compensation component to adjust network voltage.

Those skilled in the art will appreciate that this process will continue for each switch-controlled voltage source until the continued monitoring of the proximate voltage indicates that the proximate voltage is desirable (e.g., by comparing the proximate voltage to one or more set points). For example, in step 1714, the processor 1604 determines whether to connect or couple a voltage compensation component of the switch-controlled voltage source upon termination of the next shortest delay duration. The determination may be made by comparing the continued monitoring of the proximate voltage to one or more set points. Although the continued monitoring of the proximate voltage may, potentially, reflect the adjustments made by the previous switch-controlled voltage source, the proximate voltage may still be undesirable.

In step 1716, a decision block based on the determination of step 1714 results in either controlling a switch of the switch-controlled voltage source associated with the next shortest delay to adjust network voltage in step 1718, or results in no changes because the proximate voltage is within an acceptable range. In some embodiments, if the proximate voltage becomes acceptable, the processor 1604 may terminate all initiated delays and not provide any further commands to adjust network voltage. In other embodiments, even if the proximate voltage becomes acceptable, separate determinations for each switch-controlled voltage source may be made based on comparing the proximate voltage to one or more set points as each delay duration expires.

If a determination is made to enable or disable the voltage compensation component of the switch-controlled voltage source associated with the next shortest delay duration, the switch of the associated switch-controlled voltage source may be controlled to adjust network voltage and the process returns to step 1714. The process may continue whereby the processor 1604 may continue to adjust the network voltage by one or more for the switch-controlled voltage sources at the expiration of each delay duration.

If the processor 1604 determines that further adjustment of the network voltage is not necessary (e.g., based on the comparison of the proximate voltage to one or more set points), the processor 1604 may optionally select a subset of switch-controlled voltage source and generate different delay values or, optionally, make a subset of the switch-controlled voltage source inactive (e.g., unable to make further changes to the network voltage) to allow for heat dissipation and/or extend the life of one or more components. In some embodiments, the processor 1604 may adjust delay values for any number of switch-controlled voltage sources 1608*a-n* to distribute wear, dissipate heat, or the like. The process then continues in step 1704 where proximate voltage is continued to be monitored and compared to at least one set point. Those skilled in the art will appreciate that step 1720 is optional.

Figure 18:
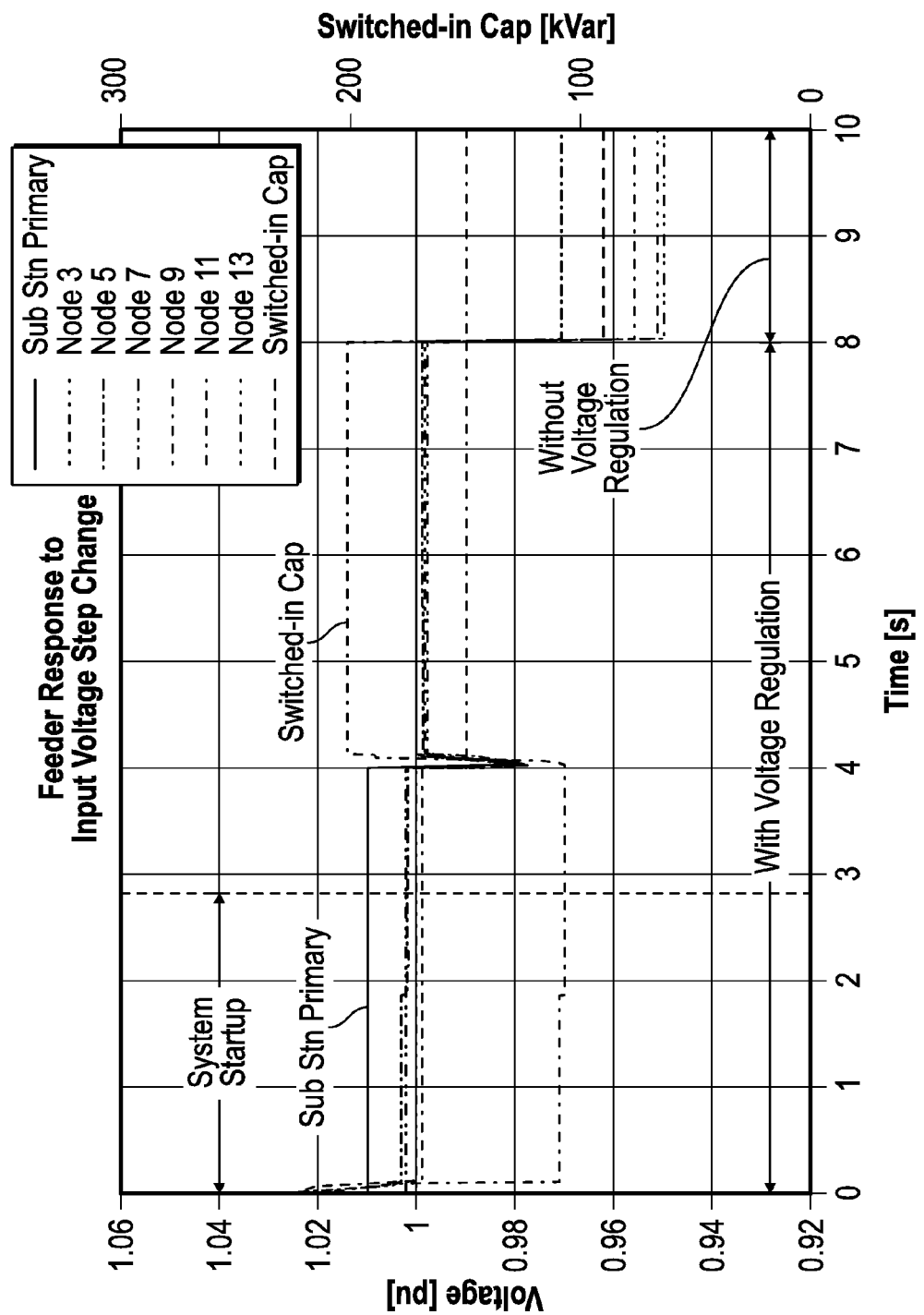
FIG. 18 depicts a simulation of voltage performance of nodes (i.e., switch-controlled voltage sources) on a primary feeder at different time without ENVO in some embodiments.
Figure 19:
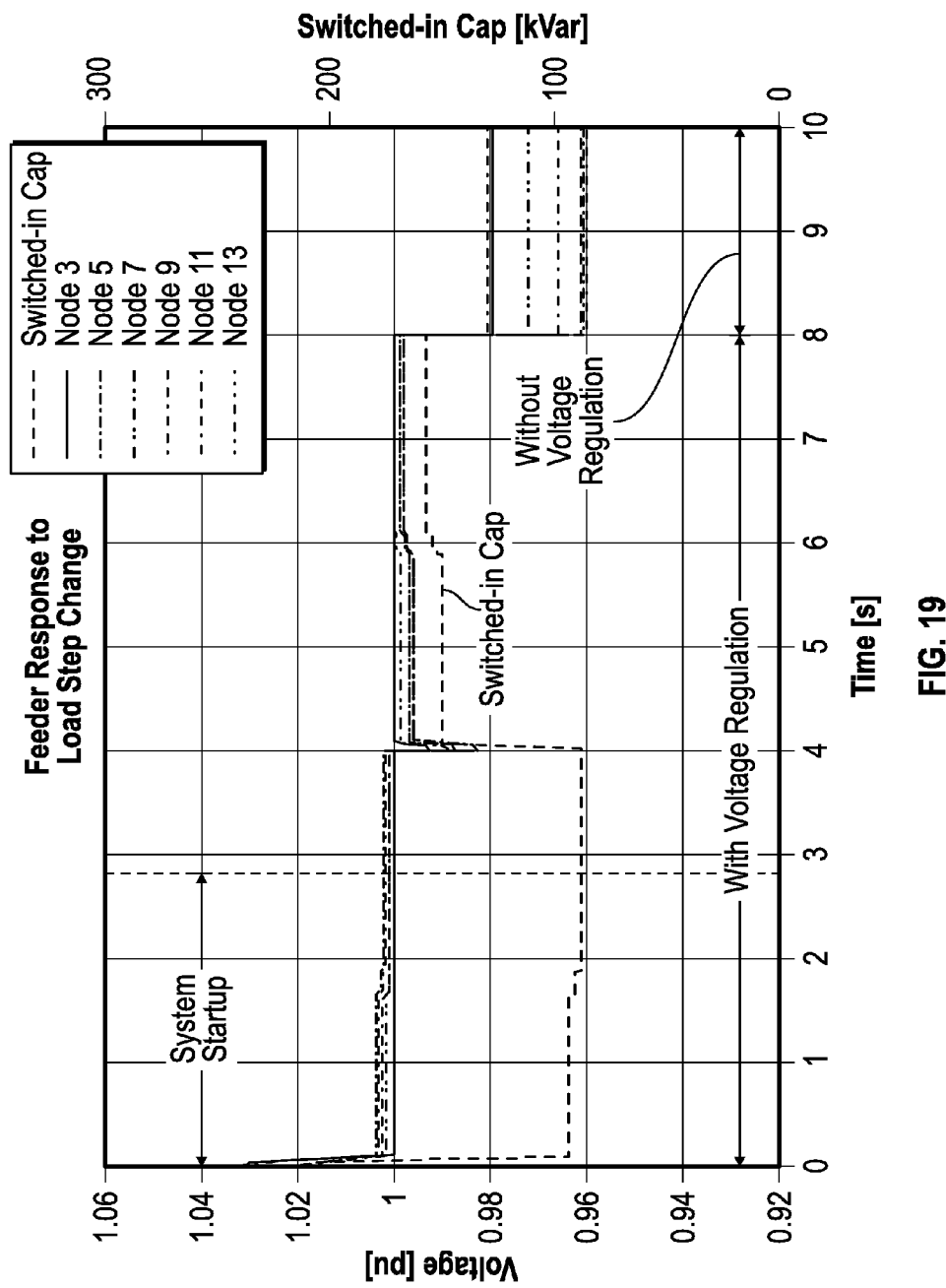
FIG. 19 depicts a simulation of voltage performance of nodes on a primary feeder at different time with ENVO in some embodiments.

Both FIGS. 18 and 19 depict the voltage response of a feeder to at least one event where voltage of a substation suddenly changes. FIGS. 18 and 19 further display that, in these example, the switch-controlled voltage sources (i.e., nodes) work together due, in part, to the different delays of the different switch-controlled voltage source. Since each of the switch-controlled voltage sources may delay action for a different duration before acting to improve network voltage, infighting among the different switch-controlled voltage sources is avoided. As a result, voltage may improve asymptotically (without bouncing back and forth above and below the desired voltage) thereby steadily approaching the desired voltage.

FIG. 18 depicts a simulation of voltage performance of nodes (i.e., switch-controlled voltage sources) on a primary feeder at different time without ENVO in some embodiments. Each switch-controlled voltage source may include delays that are different from one or more of the other switch-controlled voltage sources. The horizontal axis refers to time in seconds while the left vertical axis refers to network voltage. The right vertical axis refers to switched-in capacity kVar. Although the horizontal axis refers to time in seconds, those skilled in the art will appreciate that time may be in any increment including, but not limited to, nanoseconds, cycles, or partial cycles. Similarly, although the right axis refers to kVar, the voltage compensation components of the switch-controlled voltage sources may compensate for real power, reactive power, or both.

System startup refers to startup of the simulation. The simulation begins around time 2.8 seconds along the horizontal axis. The dotted line at approximately 2.8 seconds refers to the initiation of the simulation. At time 4 seconds, the substation drops voltage from approximately 1.01 to approximately 0.99. The multiple nodes 3, 5, 7, 9, 11, and 13 respond within fractions of a second to improve the voltage to approximately 0.9998. Thereafter, minor improvements are made after different delays by one or more of the switch-controlled voltage source that goes from a broad band from approximately 4.3 seconds to 5.5 seconds to an improved narrow band at approximately 5.5 seconds to the end of the simulation at 8 seconds.

The switched-in cap dotted line represents the amount of capacity delivered by the different voltage compensation components of the different switch-controlled voltage sources. Until approximately the drop of voltage of the substation, the total capacity provided by all nodes is approximately 110 kVar. As more of the nodes engage their associated voltage compensation components, the total capacity input into the system from the nodes increases to approximately 200 kVar (without ENVO).

Those skilled in the art will appreciate that, by implementing delays before acting, each switch-controlled voltage source can constantly monitor and potentially make adjustments to network voltage with little to not infighting. As a result of multiple nodes operating in concert, without relying on external control or communication between nodes, the overall voltage of the feeder is quickly and efficiently improved.

FIG. 19 depicts a simulation of voltage performance of nodes on a primary feeder at different time with ENVO in some embodiments. As discussed regarding FIG. 18, each switch-controlled voltage source may include delays that are different from one or more of the other switch-controlled voltage sources. The horizontal axis refers to time in seconds while the left vertical axis refers to network voltage. The right vertical axis refers to switched-in capacity kVar. Although the horizontal axis refers to time in seconds, those skilled in the art will appreciate that time may be in any increment including, but not limited to, nanoseconds, cycles, or partial cycles. Similarly, although the right axis refers to kVar, the voltage compensation components of the switch-controlled voltage sources may compensate for real power, reactive power, or both.

System startup refers to startup of the simulation. The simulation begins around time 1.9 seconds along the horizontal axis. The dotted line at approximately 1.9 seconds refers to the initiation of the simulation. At time 4 seconds, there is a load change (i.e., a load step increase). Multiple nodes 3, 5, 7, 9, 11, and 13 respond within fractions of a second to improve the voltage. Thereafter, minor improvements are made after different delays by one or more of the switch-controlled voltage source that goes from a broad band from approximately 4.3 seconds to 5.9 seconds to an improved narrow band at approximately 5.9 seconds to the end of the simulation at 8 seconds.

The switched-in cap dotted line represents the amount of capacity delivered by the different voltage compensation components of the different switch-controlled voltage sources. Until approximately the drop of voltage of the substation, the total capacity provided by all nodes is approximately 90 kVar. As more of the nodes engage their associated voltage compensation components, the total capacity input into the system from the nodes increases to approximately 160 kVar (with ENVO).

In some embodiments, one or more of the nodes 3, 5, 7, 9, 11, and 13 include the n-cycle delay control 1402 and the slow/fast integral control module 1404 of FIG. 14. In some embodiments, the portions of the depictions in FIGS. 18 and 19 that shows the greatest change (e.g., approximately between 4 seconds and 4.2 seconds) may be the response of the n-cycle delay control module 1402 of each respective node. The improved broad response may include responses of a combination of the n-cycle delay control module 1402 of some nodes and the responses of the slow/fast integral control 1404 of other nodes. The narrow band may include, for example, responses from the slow/fast integral control 1404 of other nodes.

Figure 20:
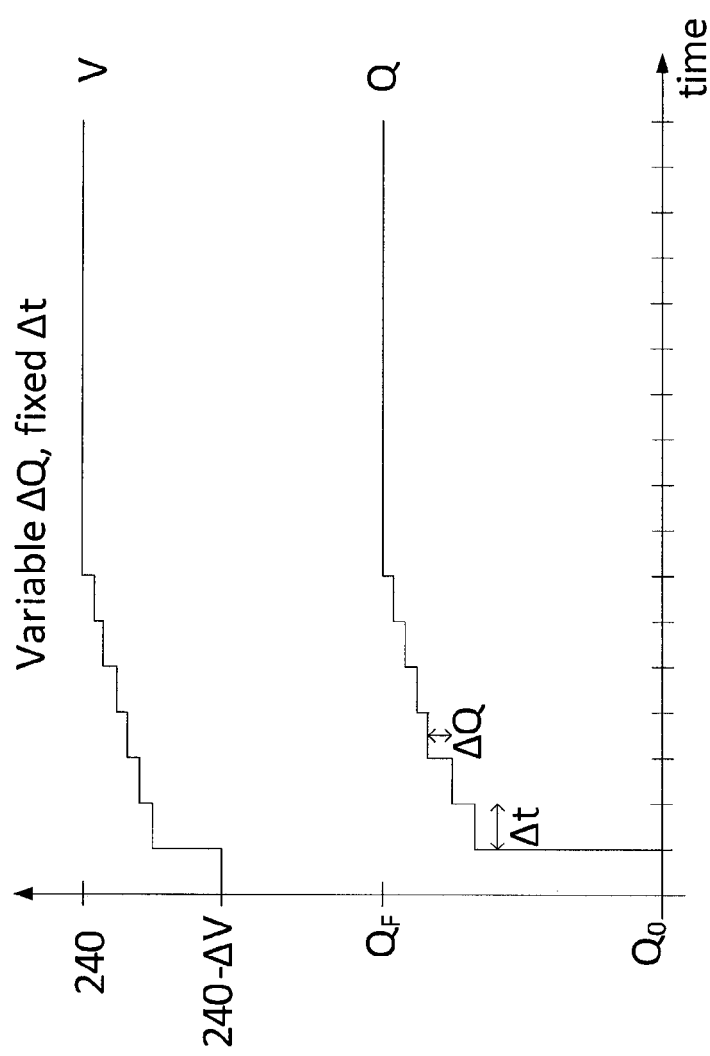
FIG. 20 depicts a control approach by an aggregated controller per switch-controlled voltage sources where variable Q (e.g., adjusted voltage such as, for example, kVAR) is injected over a fixed time interval until convergence occurs in some embodiments.

FIG. 20 depicts a control approach by an aggregated controller per switch-controlled voltage sources where variable Q (e.g., adjusted voltage such as, for example, kVAR) is injected over a fixed time interval until convergence occurs in some embodiments. In some embodiments, there may be an aggregated controller per switch-controlled voltage source, be it a 10-kVAR or an 80-kVAR switch-controlled voltage source. For example, a pole top system may comprise one controller that controls multiple different switch-controlled voltage sources (e.g., see FIGS. 11a-e). Such an approach may eliminate undesired interaction between the control loops for each individual switched switch-controlled voltage source, as a single 'loop' may be determine how many total capacitors to switch online at any given time.

In this example, variable Q is injected over a pre-determined fixed time interval. In some embodiments, the amount of Q to be injected at any time step is determined by the square of the voltage error. In one example, this behavior is expressed by $$\Delta Q = \Delta t \cdot K_{QT} \cdot |V^* - V|^2, \tag{1}$$

where $\Delta t$ is the fixed time step when a switching action can take place and $K_{QT}$ is a gain value that scales the amount of Q to be injected based on system characteristics, speed of response desired, and to decouple controller interactions of two adjacent switch-controlled voltage sources.

Figure 21:
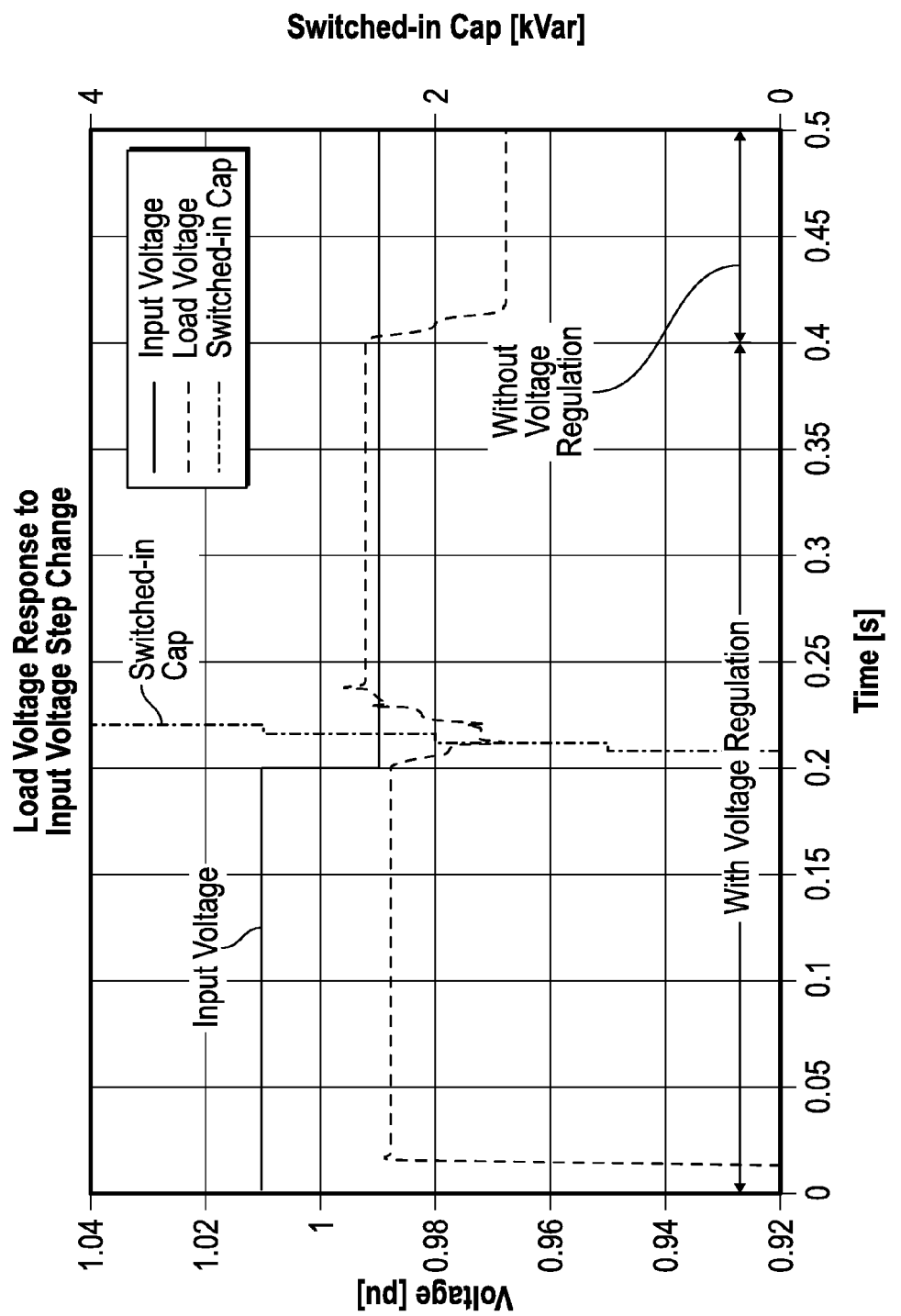
FIG. 21 depicts a simulation of a load voltage response to an input voltage step decrease in some embodiments.

FIG. 21 depicts a simulation of a load voltage response to an input voltage step decrease in some embodiments. In FIG. 21, the input voltage drops at approximately 0.2 seconds. At approximately 0.21 seconds, one or more of the switch-controlled voltage sources respond to adjust network voltage with variable Q at fixed time intervals. In this example, the total voltage raises to approximately 0.99 by approximately time 0.24 seconds and then is maintained. The simulation ends at approximately 0.4 seconds.

Figure 22:
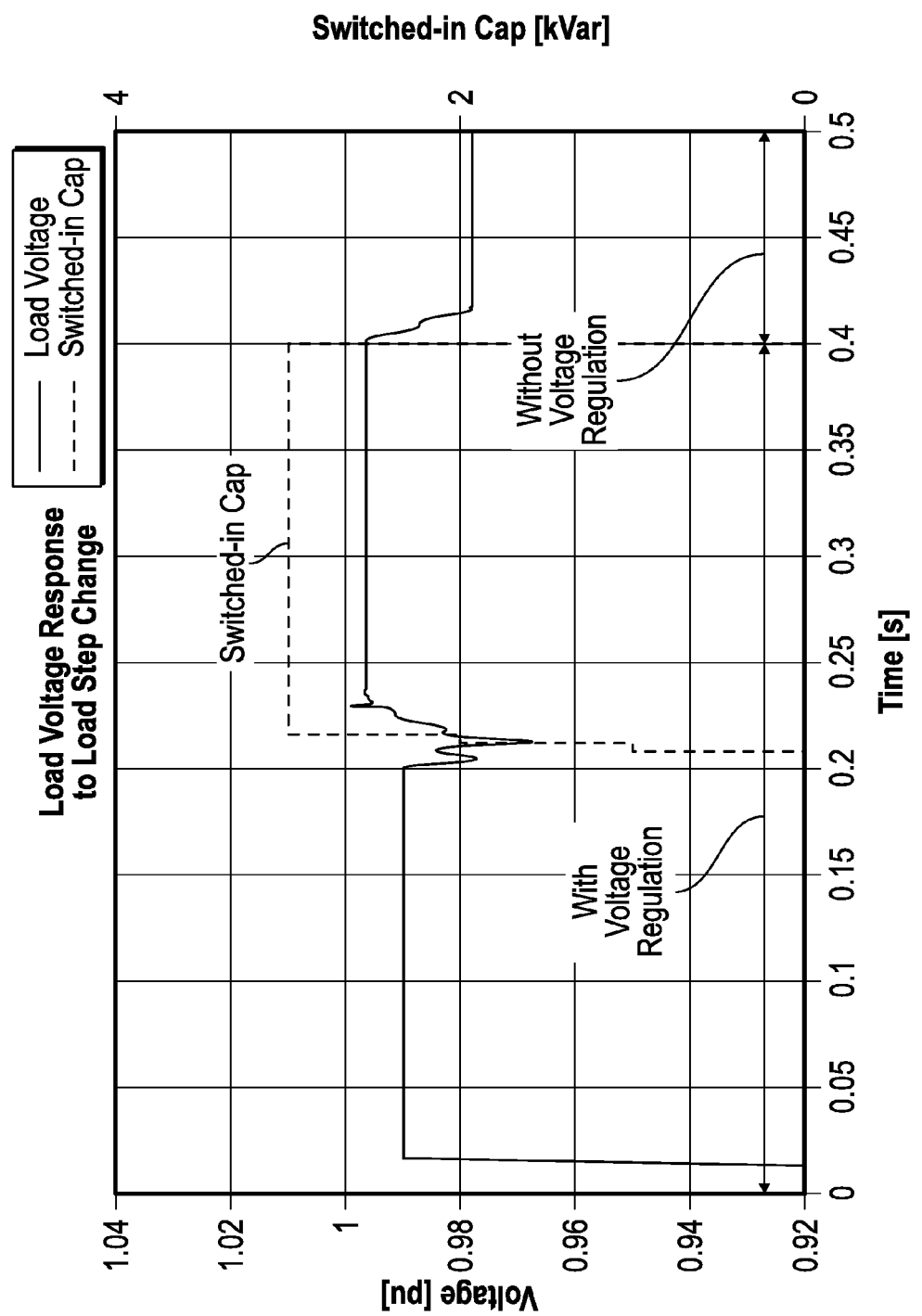
FIG. 22 depicts a simulation of a load voltage response to a load step increase in some embodiments.

FIG. 22 depicts a simulation of a load voltage response to a load step increase in some embodiments. In FIG. 22, there is a load step increase at approximately 0.2 seconds. At approximately 0.22 seconds, one or more of the switch-controlled voltage sources respond to adjust network voltage with variable Q at fixed time intervals. Like the previous example, the total voltage raises to approximately 0.99 by approximately time 0.23 seconds and then is maintained. The simulation ends at approximately 0.4 seconds.

It may be noted between the two simulations of FIGS. 21 and 22 that the total switched-in capacity of the one or more nodes may be less when responding to a load step increase as opposed to responding to an input voltage step decrease.

Figure 23:
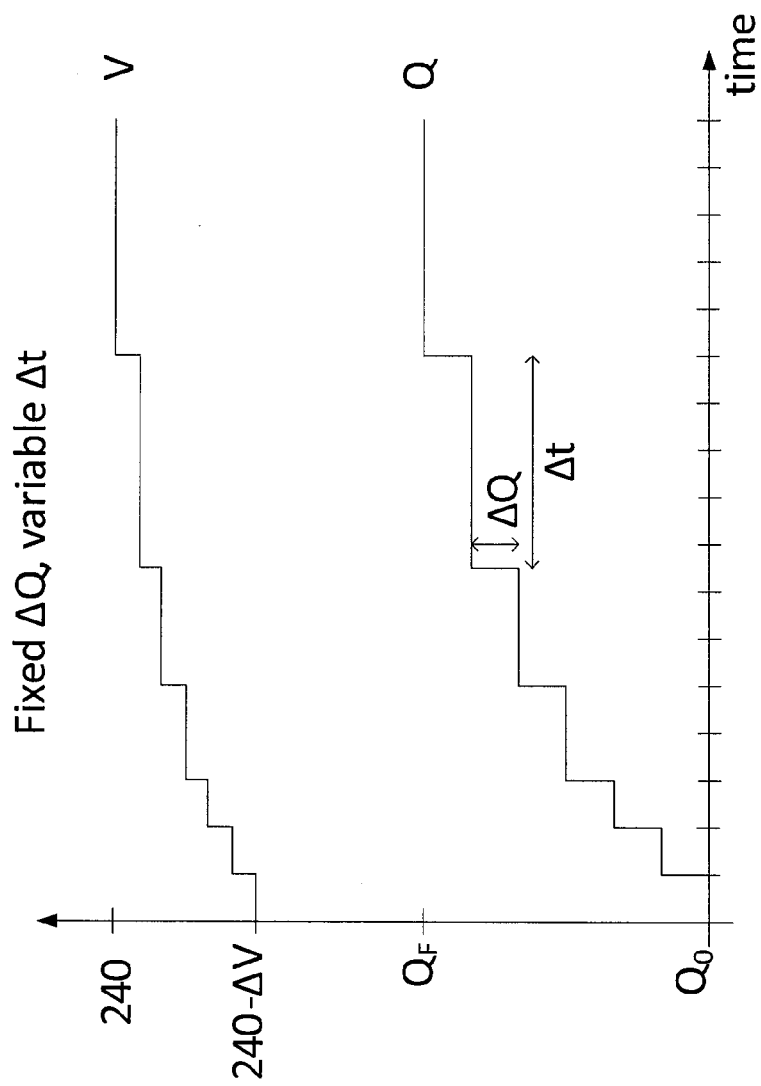
FIG. 23 depicts a control approach by an aggregated controller per switch-controlled voltage sources where fixed Q (e.g., adjusted voltage such as, for example, kVAR) is injected over a variable time interval in some embodiments.

FIG. 23 depicts a control approach by an aggregated controller per switch-controlled voltage sources where fixed Q (e.g., adjusted voltage such as, for example, kVAR) is injected over a variable time interval in some embodiments. In various embodiments, delta Q (i.e., the amount of reactive power, real power, or both provided by one or more of the switch-controlled voltage sources) is fixed, while the injection time interval is varied. This approach may eliminate large voltage swing. For example, this approach may eliminate a large voltage swing when a large amount of VAR is suddenly injected. However, convergence may occur more slowly. The variable time may be calculated based on:

$$\Delta t = K_T / |V^* - V|. \qquad (2)$$

This time may be continuously updated, as changes in load, sources, and injection level of adjacent VAR unit may change the grid voltage. In various embodiments, the closer the voltage is to the reference value, the longer the time between the next interval until the limit of the above expression equals infinity when V is equal to V*.

Figure 24:
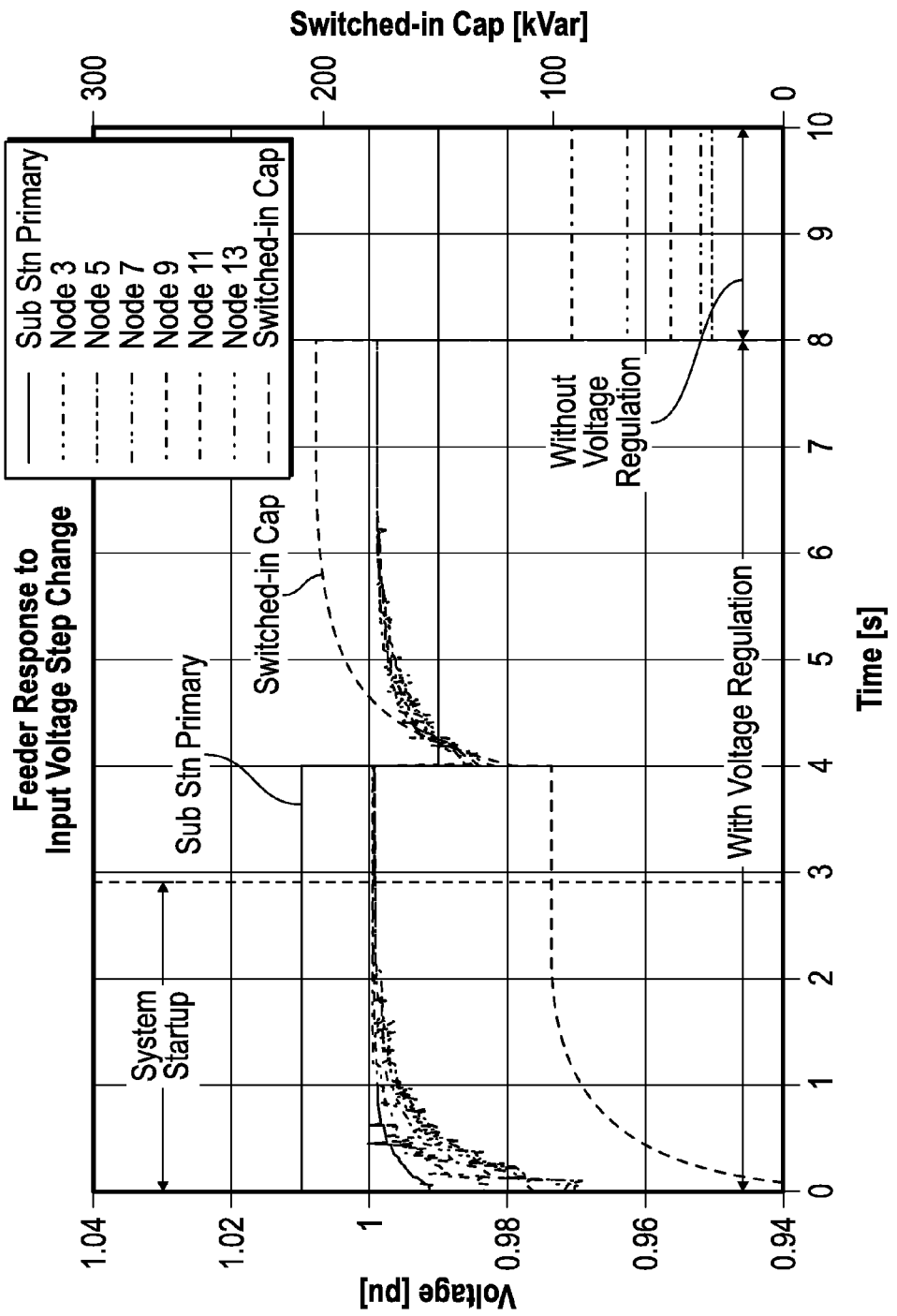
FIG. 24 depicts a simulation of a load voltage response to an input voltage step decrease in some embodiments.

FIG. 24 depicts a simulation of a load voltage response to an input voltage step decrease in some embodiments. In FIG. 24, the simulation begins at approximately 2.9 seconds and the input voltage of a substation drops from approximately 1.01 to 0.99 at approximately 4 seconds. At fractions of a second, one or more of the switch-controlled voltage sources respond to adjust network voltage with fixed Q at variable time intervals. In this example, the total voltage raises to approximately 0.9999 by approximately time 6.2 seconds and then is maintained. The simulation ends at approximately 8 seconds.

As discussed herein, the network voltage adjustment with the fixed Q at variable time intervals reduces large voltage swings and smoothes out the response curve of the multiple nodes. As a result, it may be longer (e.g., fractions of a second) before the desired voltage is reached.

Figure 25:
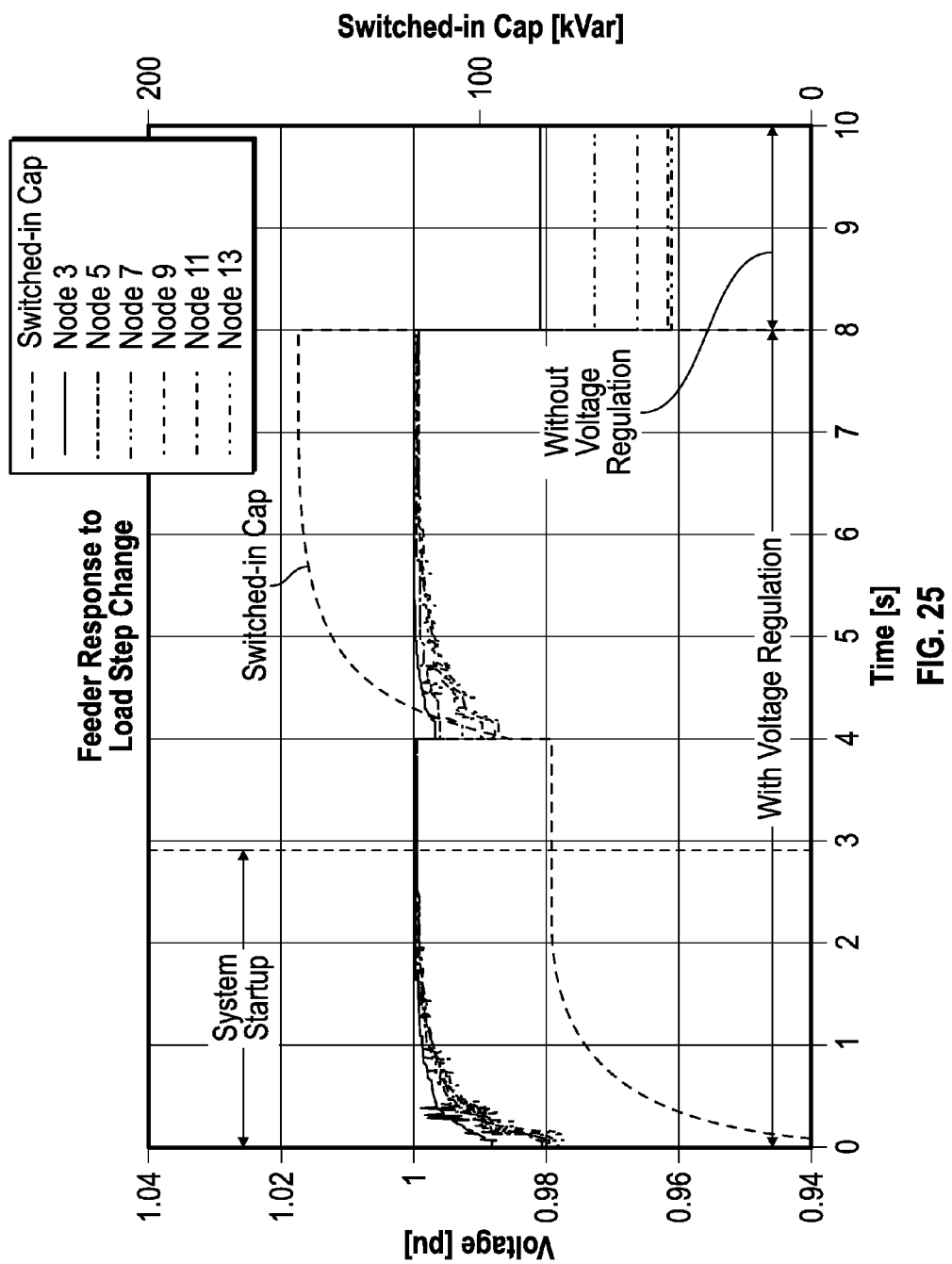
FIG. 25 depicts a simulation of a load voltage response to a load step increase in some embodiments.

FIG. 25 depicts a simulation of a load voltage response to a load step increase in some embodiments. In FIG. 25, simulation begins at approximately 2.4 seconds and the load step increases at approximately 4 seconds. At fractions of a second, one or more of the switch-controlled voltage sources respond to adjust network voltage with fixed Q at variable time intervals. In this example, the total voltage raises to approximately 0.9999 by approximately time 6.9 seconds and then is maintained. The simulation ends at approximately 8 seconds.

It may be noted between the two simulations of FIGS. 24 and 25 that the total switched-in capacity of the one or more nodes may be less when responding to a change in input voltage as opposed to responding to a load step increase.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

Various embodiments are described herein as examples. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A system comprising:
    a distribution power network;
    a first switch-controlled VAR source coupled to the distribution power network, the first switch-controlled VAR source comprising a processor, a voltage compensation component, and a switch, the first switch-controlled VAR source configured to
        obtain a first delay value that is different from another delay value of another switch-controlled VAR source coupled to the distribution power network,
        monitor a first proximate voltage of the distribution power network, the first proximate voltage being proximate to the first switch-controlled VAR source,
        initiate a first delay duration based on the comparison of the first proximate voltage to at least one set point, the first delay duration being based on the first delay value,
        determine, with the processor, after the first delay duration, whether to connect the voltage compensation component based on the monitored voltage, the monitored voltage being possibly changed by the other switch-controlled VAR source, and
        control, based on the determination, the switch to connect the voltage compensation component to adjust a network voltage or a network voltage component associated with the distribution power network.

2. The system of claim 1, wherein the first switch-controlled VAR source configured to obtain the first delay value comprises the switch-controlled VAR source configured to generate the first delay value.

3. The system of claim 1, wherein the switch-controlled VAR source configured to generate the first delay value comprises the switch-controlled VAR source configured to generate the first delay value with a randomizer.

4. The system of claim 1, wherein the first switch-controlled VAR source configured to obtain the first delay value comprises the first switch-controlled VAR source receiving, via a communication interface of the switch-controlled VAR source, the first delay value.

5. The system of claim 1, wherein the first switch-controlled VAR source configured to obtain the first delay value comprises a memory of the first switch-controlled VAR source configured to store the first delay value, the memory being accessible by the processor.

6. The system of claim 1, wherein the first switch-controlled VAR source configured to control, based on the determination, the switch to connect the voltage compensation component to adjust the network voltage or the network voltage component associated with the distribution power network comprises the first switch-controlled VAR source configured to control, based on the determination, the switch to connect the voltage compensation component to adjust real power, reactive power, or both real and reactive power.

7. The system of claim 1, further comprising a second switch-controlled VAR source coupled to the distribution power network, the second switch-controlled VAR source configured to obtain a second delay value that is different from the first delay value, monitor a second proximate voltage of the distribution power network, the second proximate voltage being proximate to the second switch-controlled VAR source, initiate a second delay duration based on the comparison of the second proximate voltage to at least one set point, the second delay duration being based on the second delay value, determine, by a processor of the second switch-controlled VAR source, after the second delay duration, whether to connect a voltage compensation component of the second switch-controlled VAR source based on the monitored second proximate voltage, the monitored second proximate voltage being changed by the first switch-controlled VAR source before the end of the second delay duration, and control, based on the determination, a switch of the second switch-controlled VAR source to connect the voltage compensation component of the second switch-controlled VAR source to adjust a network voltage or a network voltage component associated with the distribution power network.

8. The system of claim 1, further comprising a second switch-controlled VAR source coupled to the distribution power network, the second switch-controlled VAR source configured to obtain a second delay value that is different from the first delay value, monitor a second proximate voltage of the distribution power network, the second proximate voltage being proximate to the second switch-controlled VAR source, initiate a second delay duration based on the comparison of the second proximate voltage to at least one set point, the second delay duration being based on the second delay value, and determine, by a processor of the second switch-controlled VAR source, after the second delay duration, to not connect a voltage compensation component of the second switch-controlled VAR source based on the monitored second proximate voltage, the monitored second proximate voltage being changed by the first switch-controlled VAR source before the end of the second delay duration.

9. The system of claim 1, wherein the first switch-controlled VAR source is further configured to obtain a different delay value that is longer than the first delay value after control of the switch.

10. The system of claim 1, wherein the switch comprises a semiconductor switch in series with an NTC or resistor, and wherein the semiconductor switch in series with the NTC or resistor is in parallel with a relay.

11. A method comprising:
obtaining, by a first switch-controlled VAR source coupled to a distribution power network, a first delay value that is different from another delay value of another switch-controlled VAR source coupled to the distribution power network;
monitoring a first proximate voltage of the distribution power network, the first proximate voltage being proximate to the first switch-controlled VAR source;
initiating a first delay duration based on the comparison of the first proximate voltage to at least one set point, the first delay duration being based on the first delay value;
determining, with a processor of the first switch-controlled VAR source, after the first delay duration, whether to connect a voltage compensation component of the first switch-controlled VAR source based on the monitored voltage, the monitored voltage being possibly changed by the other switch-controlled VAR source; and
controlling, based on the determination, a switch of the first switch-controlled VAR source to connect the voltage compensation component to adjust a network voltage or a network voltage component associated with the distribution power network.

12. The method of claim 11, wherein obtaining the first delay value comprises generating the first delay value.

13. The method of claim 11, wherein obtaining the first delay value comprises generating the first delay value with a randomizer.

14. The method of claim 11, wherein obtaining the first delay value comprises receiving, via a communication interface of the first switch-controlled VAR source, the first delay value.

15. The method of claim 11, wherein obtaining the first delay value comprises a memory of the first switch-controlled VAR source receiving the first delay value, the memory being accessible by the processor.

16. The method of claim 11, wherein controlling, based on the determination, the switch of the first switch-controlled VAR source to connect the voltage compensation component to adjust the network voltage or the network voltage component associated with the distribution power network comprises controlling, based on the determination, the switch of the first switch-controlled VAR source to connect the voltage compensation component to adjust real power, reactive power, or both real and reactive power.

17. The method of claim 11, further comprising, obtaining, by a second switch-controlled VAR source coupled to the distribution power network, a second delay value that is different from the first delay value, monitoring a second proximate voltage of the distribution power network, the second proximate voltage being proximate to the second switch-controlled VAR source, initiating a second delay duration based on the comparison of the second proximate voltage to at least one set point, the second delay duration being based on the second delay value, determining, by a processor of the second switch-controlled VAR source, after the second delay duration, whether to connect a voltage compensation component of the second switch-controlled VAR source based on the monitored second proximate voltage, the monitored second proximate voltage being changed by the first switch-controlled VAR source before the end of the second delay duration, and controlling, based on the determination, a switch of the second switch-controlled VAR source to connect the voltage compensation component of the second switch-controlled VAR source to adjust a network voltage or a network voltage component associated with the distribution power network.

18. The method of claim 11, further comprising obtaining, by a second switch-controlled VAR source coupled to the distribution power network, a second delay value that is different from the first delay value, monitoring a second proximate voltage of the distribution power network, the second proximate voltage being proximate to the second switch-controlled VAR source, initiating a second delay duration based on the comparison of the second proximate voltage to at least one set point, the second delay duration being based on the second delay value, and determining, by a processor of the second switch-controlled VAR source, after the second delay duration, to not connect a voltage compensation component of the second switch-controlled VAR source based on the monitored second proximate voltage, the monitored second proximate voltage being changed by the first switch-controlled VAR source before the end of the second delay duration.

19. The method of claim 11, further comprising obtaining a different delay value that is longer than the first delay value after controlling the switch.

20. The method of claim 11, wherein the switch comprises a semiconductor switch in series with an NTC or resistor, and wherein the semiconductor switch in series with the NTC or resistor is in parallel with a relay.

21. A non-transitory computer readable medium comprising instructions executable by a processor for performing a method, the method comprising:
    obtaining, by a first switch-controlled VAR source coupled to a distribution power network, a first delay value that is different from another delay value of another switch-controlled VAR source coupled to the distribution power network;
monitoring a first proximate voltage of the distribution power network, the first proximate voltage being proximate to the first switch-controlled VAR source;
initiating a first delay duration based on the comparison of the first proximate voltage to at least one set point, the first delay duration being based on the first delay value;
determining, with a processor of the first switch-controlled VAR source, after the first delay duration, whether to connect a voltage compensation component of the first switch-controlled VAR source based on the monitored voltage, the monitored voltage being possibly changed by the other switch-controlled VAR source; and
controlling, based on the determination, a switch of the first switch-controlled VAR source to connect the voltage compensation component to adjust a network voltage or a network voltage component associated with the distribution power network.

* * * * *